US012398779B2

(12) United States Patent
Walkingshaw et al.

(10) Patent No.: US 12,398,779 B2
(45) Date of Patent: Aug. 26, 2025

(54) MECHANICAL-ENERGY STORAGE UNIT SYSTEM

(71) Applicant: Torus Inc., Sandy, UT (US)

(72) Inventors: Nathan Walkingshaw, Sandy, UT (US); Calab Nelson, Springville, UT (US); John Loveless, Layton, UT (US); Zahra Derafshi, Cambridge, MA (US); Cliff Lambarth, Portage, MI (US); Sean Peterson, Payson, UT (US)

(73) Assignee: Torus Inc., South Salt Lake, UT (US)

( * ) Notice: Subject to any disclaimer, the term of this patent is extended or adjusted under 35 U.S.C. 154(b) by 0 days.

(21) Appl. No.: 18/666,522

(22) Filed: May 16, 2024

(65) Prior Publication Data

US 2024/0388164 A1 Nov. 21, 2024

Related U.S. Application Data

(60) Provisional application No. 63/502,648, filed on May 16, 2023.

(51) Int. Cl.
*F16F 15/315* (2006.01)
*F03G 3/08* (2006.01)
(Continued)

(52) U.S. Cl.
CPC ............ *F16F 15/3156* (2013.01); *F03G 3/08* (2013.01); *F16C 17/02* (2013.01);
(Continued)

(58) Field of Classification Search
CPC ......... H02K 7/025; H02K 7/02; H02J 15/007; F16F 15/3156; F16F 15/315
(Continued)

(56) References Cited

U.S. PATENT DOCUMENTS 3,970,917 A * 7/1976 Diggs ..................... H02K 7/02
290/1 R
4,186,245 A 1/1980 Gilman
(Continued)

FOREIGN PATENT DOCUMENTS

CN 217676608 U 10/2022
CN 115626413 A 1/2023
(Continued)

OTHER PUBLICATIONS

"The energy transition demands more than renewables and battery-based energy storage," Amber Kinetics—Take Charge, retrieve from https://amberkinetics.com/, retrieved on Feb. 25, 2023, pp. 5.
(Continued)

*Primary Examiner* — Michael Andrews
(74) *Attorney, Agent, or Firm* — VLP Law Group LLP; Michel Bohn

(57) ABSTRACT

A system may include a massive flywheel including a rotatable mass component and one or more axles coupled with the rotatable mass component, the one or more axles extending from a top of the rotatable mass component and from a bottom of the rotatable mass component. A system may include a bottom bearing assembly coupled with the one or more axles at the bottom of the rotatable mass component. A system may include a top bearing assembly coupled with the one or more axles at the top of the rotatable mass component. A system may include a support structure coupled with the top bearing assembly and the bottom bearing assembly. A system may include a motor coupled with the one or more axles at the top bearing assembly.

20 Claims, 29 Drawing Sheets

(51) Int. Cl.
*F16C 17/02* (2006.01)
*H02K 7/09* (2006.01)
*H02K 7/02* (2006.01)

(52) U.S. Cl.
CPC ........... *F16F 15/3153* (2013.01); *H02K 7/09* (2013.01); *F05B 2230/608* (2013.01); *F05B 2240/40* (2013.01); *F05B 2260/421* (2013.01); *F16C 2361/55* (2013.01); *H02K 7/025* (2013.01)

(58) Field of Classification Search
USPC .......................................................... 310/74
See application file for complete search history.

(56) References Cited

U.S. PATENT DOCUMENTS

| | | |
|---|---|---|
| 4,538,079 A | 8/1985 | Nakayama et al. |
| 5,124,605 A | 6/1992 | Bitterly et al. |
| 5,726,516 A | 3/1998 | Randall |
| 6,029,538 A | 2/2000 | Little et al. |
| 6,614,142 B1 | 9/2003 | Bonnieman et al. |
| 6,679,634 B2 | 1/2004 | Plesh, Sr. |
| 7,977,837 B2 | 7/2011 | Oyama |
| 9,325,217 B2 | 4/2016 | Veltri |
| 11,362,558 B2 | 6/2022 | Sanders et al. |
| 11,824,355 B2 | 11/2023 | Walkingshaw et al. |
| D1,051,117 S | 11/2024 | Hennessey |
| 12,292,096 B2 | 5/2025 | Walkingshaw et al. |
| 2003/0029269 A1 | 2/2003 | Gabrys |
| 2004/0051507 A1* | 3/2004 | Gabrys .................. H02K 7/025 290/1 R |
| 2011/0031827 A1 | 2/2011 | Gennesseaux |
| 2012/0062154 A1* | 3/2012 | Chiao ..................... F16C 15/00 74/572.11 |
| 2012/0176074 A1* | 7/2012 | Dubois ................... H02J 9/066 318/540 |
| 2013/0015825 A1 | 1/2013 | Pullen |
| 2013/0261001 A1* | 10/2013 | Hull ....................... H02K 16/00 977/750 |
| 2014/0165777 A1 | 6/2014 | Andrews et al. |
| 2014/0346780 A1 | 11/2014 | Holder |
| 2014/0366683 A1 | 12/2014 | Pullen |
| 2016/0178031 A1* | 6/2016 | Pullen ..................... F16F 15/30 74/572.11 |
| 2016/0241106 A1 | 8/2016 | Veltri |
| 2016/0377147 A1* | 12/2016 | Sun ....................... F16F 15/315 74/572.1 |
| 2020/0112216 A1 | 4/2020 | Galmiche et al. |
| 2020/0212762 A1 | 7/2020 | Dharan |
| 2020/0259379 A1* | 8/2020 | Sanders ................. H02K 7/025 |
| 2022/0231572 A1 | 7/2022 | Kesler |
| 2022/0243784 A1 | 8/2022 | Pullen |
| 2023/0138936 A1 | 5/2023 | Walker, III et al. |
| 2023/0246481 A1 | 8/2023 | Walkingshaw et al. |
| 2024/0088706 A1 | 3/2024 | Walkingshaw et al. |
| 2024/0384708 A1 | 11/2024 | Walkingshaw et al. |
| 2024/0384776 A1 | 11/2024 | Walkingshaw et al. |
| 2024/0384777 A1 | 11/2024 | Walkingshaw et al. |
| 2024/0388165 A1 | 11/2024 | Walkingshaw et al. |

FOREIGN PATENT DOCUMENTS

| | | |
|---|---|---|
| GB | 2494783 A | 3/2013 |
| IL | 289441 A | 12/2022 |
| JP | 2007-056710 A | 3/2007 |
| WO | 93/07387 A1 | 4/1993 |
| WO | 2023/126923 A1 | 7/2023 |
| WO | 2024/238840 A1 | 11/2024 |
| WO | 2024/238842 A1 | 11/2024 |
| WO | 2024/238845 A1 | 11/2024 |
| WO | 2024/238855 A1 | 11/2024 |

OTHER PUBLICATIONS

Amiryar, M. E., et al., "Analysis of Standby Losses and Charging Cycles in Flywheel Energy Storage Systems", Energies, vol. 13, 2020, 22 pages.
Bianchini, C., et al., "Design of Motor/Generator for Flywheel Batteries", IEEE Transactions on Industrial Electronics, vol. 68, No. 1, Oct. 2021, pp. 9675-9684.
Ertz, Gabriel, Development, manufacturing, and testing of a multi-rim {hybrid} flywheel rotor, Diploma Thesis University of Alberta, Institute For Dynamics and Vibration, Jun. 10, 2014, 107 pages.
Groom, N. J., et al., "Fifth International Symposium on Magnetic Suspension Technology", NASA/CP-2000-210291, Jul. 2000, 746 pages.
Ha, Sung K., et al., Design and Manufacture of a Composite Flywheel Press-Fit Multi-Rim Rotor, Journal of Reinforced Plastics and Composites, 27, Feb. 25, 2008, SAGE Publications, pp. 953-965.
Ha, Sung K., et al., Design and Spin Test of Hybrid Composite Flywheel Rotor with Split Type Hub, Journal of Composite Materials, Jan. 9, 2006, SAGE Publications, pp. 1-18.
International Search Report and Written Opinion of Intl. Application No. PCT/US2023/061784, mailed Jun. 5, 2023 (12pages).
Kim, Seong J., et al., Design and fabrication of hybrid composite hub for multi-rim flywheel energy storage system, Composite Structures 107, 2014, pp. 19-29.
Machine translation of JP2007056710; Nakaseki et al. (Year: 2007).
International Preliminary Report on Patentability received for PCT Patent Application No. PCT/US23/61784, mailed on Aug. 15, 2024, 11 pages.
International Search Report and Written Opinion received for PCT Patent Application No. PCT/US2024/029771, mailed on Sep. 23, 2024, 16 pages.
International Search Report and Written Opinion received for PCT Patent Application No. PCT/US24/29773, mailed on Aug. 15, 2024, 12 pages.
International Search Report and Written Opinion received for PCT Patent Application No. PCT/US24/29779, mailed on Aug. 15, 2024, 13 pages.
International Search Report and Written Opinion received for PCT Patent Application No. PCT/US24/29793, mailed on Aug. 8, 2024, 7 pages.
Invitation to Pay Additional Fees received for PCT Patent Application No. PCT/US2024/029771, mailed on Jul. 30, 2024, 2 pages.
Globalspec, Flywheel Power Systems Selection Guide: Types, Features, Applications, Flywheel Power Systems Information, 5pp., obtained at https://www.globalspec.com/learnmore/electrical_electronic_components/power_generation_storage/alternative_power_generators/flywheel_power_systems.
Amber Kinetics, Inc. (2015). Final Technical Report: Smart Grid Demonstration Program—Flywheel Energy Storage Demonstration. U.S. Department of Energy, Contract ID: DE-OE0000232, Dec. 30, 2015, 16 pages, Version 1.0., https://www.energy.gov/sites/prod/files/2017/01/f34/Amber_Kinetics_Final_Technical_Report.pdf.
Groom, N. J., et al., "Fifth International Symposium on Magnetic Suspension Technology", NASA/CP-2000-210291, Jul. 2000, Introduction through the Table of Contents, Session 1 (pp. 1-48), a portion of Session 5 (pp. 239-247), Session 7 (pp. 285-307), Session 9 (pp. 355-381), Session 15 (pp. 593-610), and a portion of Session 17 (pp. 675-720).

* cited by examiner

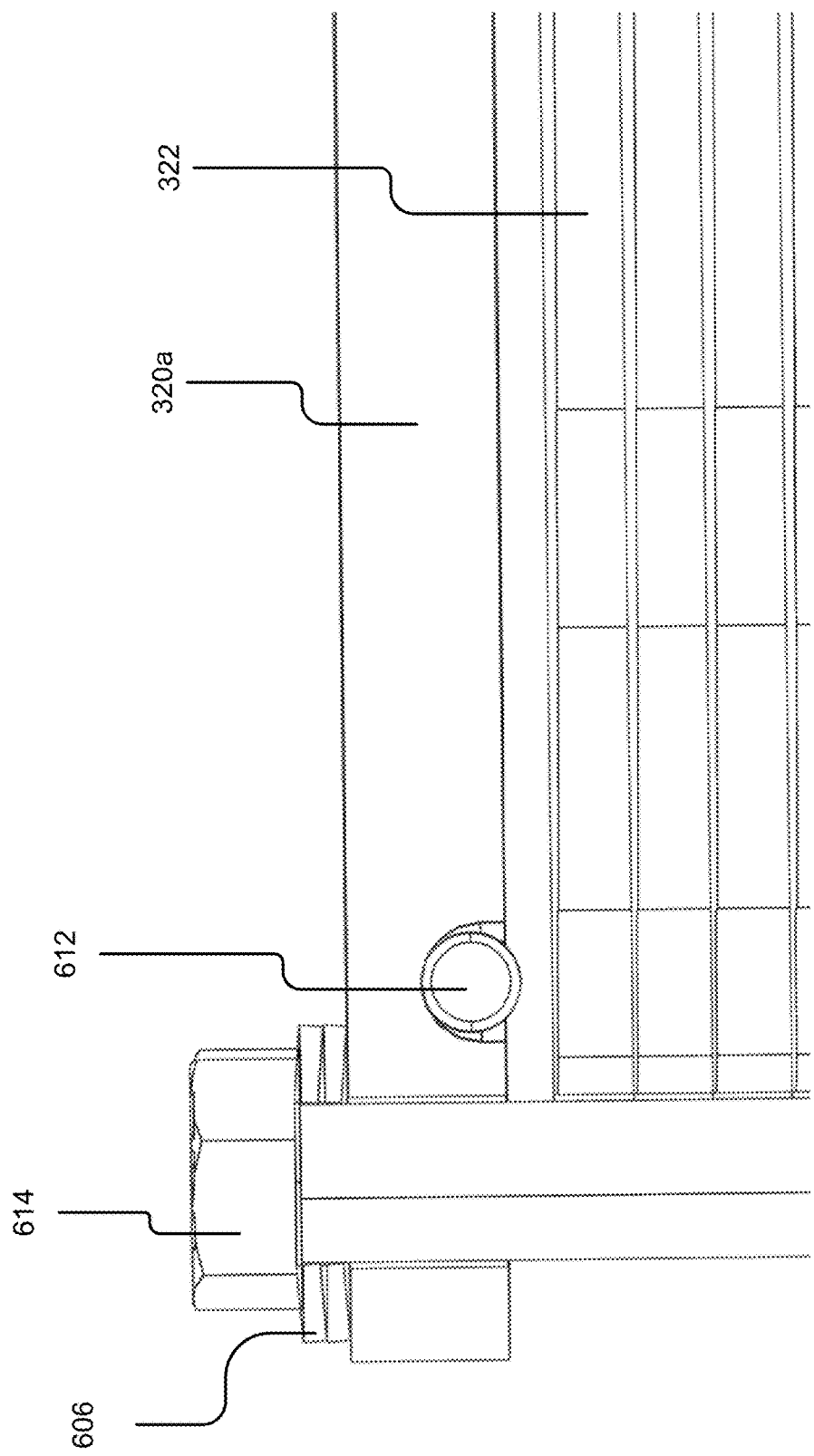

MECHANICAL-ENERGY STORAGE UNIT SYSTEM

CROSS-REFERENCE TO RELATED APPLICATION

This application claims priority to U.S. Provisional Patent Application No. 63/502,648 filed on May 16, 2023. The present application is related to U.S. application Ser. No. 18/666,542, titled "Flywheel Vacuum Enclosure and Adjustment System" filed on May 16, 2024; U.S. application Ser. No. 18/666,557, titled "Stacking Flywheel and Linkage" filed on May 16, 2024; U.S. application Ser. No. 18/666,573, titled "Flywheel Magnetic Lift and Bearing System" filed on May 16, 2024; and U.S. application Ser. No. 18/666,593, titled "Mechanical-Energy Storage Unit and Assembly Fixture" filed on May 16, 2024; as the present application by common inventors. All of these applications are incorporated herein by reference, including their specifications and drawings, which disclosure is not admitted to be prior art with respect to the present invention by its mention in the cross-reference section.

BACKGROUND

The present disclosure relates to mechanical energy storage units. Implementations relate to flywheel-based mechanical energy storage units.

Currently, residential electricity customers, as well as electrical utilities, use various sources of electrical energy storage to offset varying electrical power production and use, such as the duck curve associated with solar or other renewable energy production. The variation in power production and usage has been further exacerbated with the increasing popularity of renewable power sources. These issues cause significant cost and other issues to utilities, power outages, and other issues.

Commonly, excess or backup power is stored in chemical storage, such as large chemical batteries. Unfortunately, chemical batteries suffer from many issues that make them undesirable at both a residential level and at a utility level. For example, chemical batteries may be very expensive, complex, and require numerous safeguards against fires. Chemical batteries are also ecologically unfriendly, as their production uses toxic chemicals, creates significant greenhouse gases, and results in significant material waste. Furthermore, chemical batteries have short lifespans because the batteries have a limited number of years and recharge cycles before they must be disposed of.

Previous solutions for mechanical energy storage have been overly complex, too large to be implemented at a residential level, not scalable for an electrical utility, or have faced other issues.

SUMMARY

In some aspects, the techniques described herein relate to a system including: a massive flywheel including a rotatable mass component and one or more axles coupled with the rotatable mass component, the one or more axles extending from a top of the rotatable mass component and from a bottom of the rotatable mass component; a bottom bearing assembly coupled with the one or more axles at the bottom of the rotatable mass component; a top bearing assembly coupled with the one or more axles at the top of the rotatable mass component; a support structure coupled with the top bearing assembly and the bottom bearing assembly; and a motor coupled with the one or more axles at the top bearing assembly.

In some aspects, the techniques described herein relate to a system, wherein: the motor is mounted to the support structure via one or more braces, the one or more braces providing a space between the support structure and the motor, the space being large enough to fit a top bearing between the motor and the support structure.

In some aspects, the techniques described herein relate to a system, wherein the support structure includes an enclosure having a cylindrical shape, the motor being mounted to the enclosure in line with an axis of rotation of the one or more axles.

In some aspects, the techniques described herein relate to a system, wherein: the top bearing assembly coupled with the one or more axles, the top bearing assembly including a top bearing coupling with the one or more axles and a magnet that applies a pulling force to the rotatable mass component.

In some aspects, the techniques described herein relate to a system, wherein the bottom bearing assembly includes a positioning mechanism configured to raise and lower a bottom bearing, the bottom bearing coupling with the one or more axles.

In some aspects, the techniques described herein relate to a system, wherein the support structure includes: an enclosure tub having a bottom and one or more sides coupled with the bottom, the bottom including a perforation, the bottom bearing assembly being located inside the perforation in the bottom.

In some aspects, the techniques described herein relate to a system, further including: an enclosure lid coupled with the one or more sides to form a top of the enclosure tub, the enclosure lid providing vertical support to the top bearing assembly.

In some aspects, the techniques described herein relate to a system, wherein the top bearing assembly supports more than half of a weight of the rotatable mass component.

In some aspects, the techniques described herein relate to a system, wherein the rotatable mass component includes a plurality of stacked plates.

In some aspects, the techniques described herein relate to a system, wherein the plurality of stacked plates includes two clamping plates and two or more stacking plates located between the two clamping plates, the two clamping plates being pulled together by one or more fasteners to place a compressive force on the two or more stacking plates.

In some aspects, the techniques described herein relate to a system, wherein the one or more axles include a top axle and a bottom axle, the top axle being separated from the bottom axle by the two or more stacking plates.

In some aspects, the techniques described herein relate to a system, wherein: the support structure includes a base and a lid, the bottom bearing assembly being coupled with the base and the top bearing assembly being coupled with the lid; the motor is coupled with the lid via one or more braces; and the lid includes an accessory mounting plate holding one or more of a vacuum assembly, a supercapacitor, and a central processing unit.

In some aspects, the techniques described herein relate to a system, wherein the lid includes a plurality of ribs separating a body of the lid from the accessory mounting plate, the plurality of ribs merging at a ring at a center of the lid, at least a portion of the top bearing assembly being located within a radius of the ring.

In some aspects, the techniques described herein relate to a system, further including: a plurality of magnets mounted to a bottom surface of the lid, the plurality of magnets lifting the rotatable mass component to remove a vertical force from the bottom bearing assembly.

In some aspects, the techniques described herein relate to a system, wherein the support structure includes a plurality of feet around a peripheral edge of the support structure.

In some aspects, the techniques described herein relate to a system, wherein: the support structure includes a cylindrical enclosure, the rotatable mass component being located inside the cylindrical enclosure; the motor and a vacuum assembly are mounted on top of the support structure; and a plurality of feet are located around a peripheral edge of the cylindrical enclosure.

In some aspects, the techniques described herein relate to a mechanical-energy storage unit including: a massive flywheel including two clamping plates and two or more stacking plates located between the two clamping plates, the two clamping plates being pulled together by one or more fasteners to place a compressive force on the two or more stacking plates; a top axle coupled with a top clamping plate of the two clamping plates, a bottom axle coupled with a bottom clamping plate of the two clamping plates; a top bearing coupled with the top axle; a bottom bearing coupled with the bottom axle; and a support structure coupled with the top bearing and the bottom bearing.

In some aspects, the techniques described herein relate to a mechanical-energy storage unit, wherein: the top axle is separated from the bottom axle by the two or more stacking plates; the top axle is held at an axis of rotation by the top bearing; and the bottom axle is held at the axis of rotation by the bottom bearing.

In some aspects, the techniques described herein relate to a mechanical-energy storage unit, further including: a plurality of magnets mounted the support structure, the plurality of magnets lifting the massive flywheel toward the top bearing.

In some aspects, the techniques described herein relate to a flywheel assembly including: an enclosure having a top, a bottom, and an interior cavity; a massive flywheel located in the interior cavity of the enclosure; a bottom axle coupled with a bottom side of the massive flywheel; a top axle coupled with a top side of the massive flywheel, the top axle being a separate component than the bottom axle; a bottom bearing coupling the bottom axle with the bottom of the enclosure; and a top bearing coupling the top axle with the top of the enclosure.

Other implementations of one or more of these aspects or other aspects include corresponding systems, apparatus, and computer programs, configured to perform the various actions and/or store various data described in association with these aspects. These and other implementations, such as various data structures for controlling the mechanical energy storage unit, may be encoded on tangible computer storage devices. Numerous additional features may, in some cases, be included in these and various other implementations, as discussed throughout this disclosure. It should be understood that the language used in the present disclosure has been principally selected for readability and instructional purposes, and not to limit the scope of the subject matter disclosed herein.

BRIEF DESCRIPTION OF THE DRAWINGS

This disclosure is illustrated by way of example, and not by way of limitation in the figures of the accompanying drawings in which like reference numerals are used to refer to similar elements.

FIG. 6G illustrates cross section of an example bushing that applies pressure from a clamping plate on a stacking flywheel plate(s).

DETAILED DESCRIPTION

Figure 1:
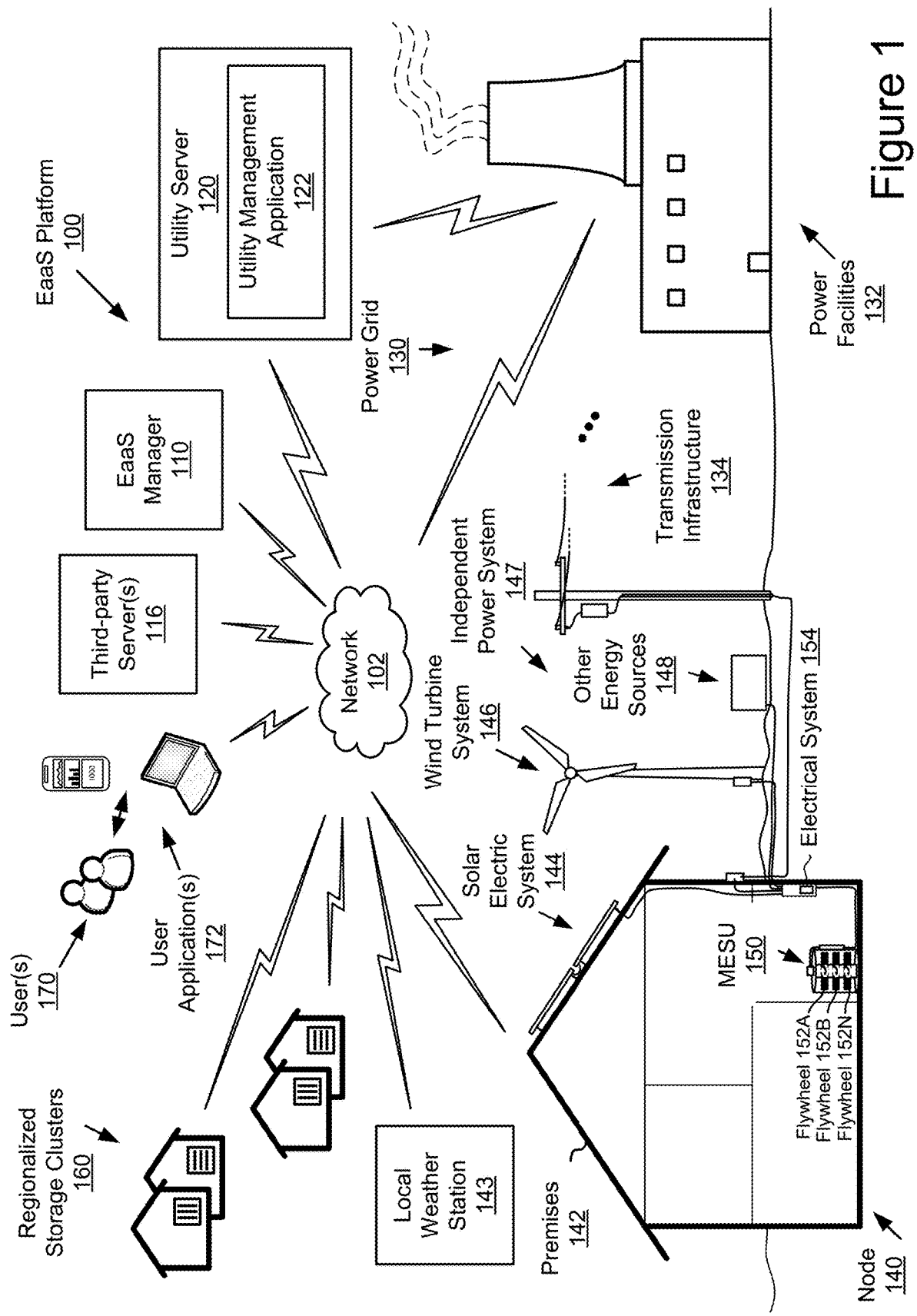
FIG. 1 depicts an example energy as a service platform.

This description includes several improvements over previous solutions, such as those described in reference to the Background. A mechanical-energy storage unit is described herein along with its assembly and an assembly fixture. Some aspects of the technology include components that reduce vertical force by a massive flywheel on bearings, such as an improved magnetic lift system. Other aspects include bearings, magnetic couplings, clamping plates, and/or other systems that may further improve the mechanical energy storage unit.

In some implementations, one or two mechanical-energy storage units 150 may be installed at a residence to provide backup power in case of a power outage, to store electricity generated using residential solar panels, or to offset unevenness of power production and usage (e.g., an electrical utility may control the mechanical-energy storage unit 150 at a residence to address the balance energy use/production at the residence, nearby residences, or across the power grid). A mechanical-energy storage unit 150 may be buried next to an electrical panel or placed in a shed outside a residence, placed in a garage or utility room, or stored offsite.

In some implementations, multiple mechanical-energy storage units 150 may be coupled together to scale energy backup at a larger facility, such as a business, or by an electrical utility. For instance, many mechanical-energy storage units 150 may be placed at a facility, buried, or otherwise used by an electrical utility. The multiple mechanical-energy storage units 150 may be communicatively linked to each other or to a central server to control storage and distribution of the stored energy (e.g., by controlling the rotational frequency of a flywheel 152 to keep various flywheels 152 at efficient speeds).

Various implementations and features of flywheel energy storage systems (FESS) are described herein. These provide improvements over previous energy storage units including other flywheels 152. For instance, the technology described herein provides an improved flywheel system or assembly, improved bearings, improved flywheel-motor couplings, improved flywheel housing, improved flywheel plates, improved assembly fixture, and method for assembly and use, among other improvements, features, and benefits.

For example, a flywheel 152 may include a rotatable mass component, which may comprise a plurality of stacking plates 322, cylinders, or other components, one or more bolt or clamping plates 320, one or more axle 608 members, and other features. For instance, the technologies described herein include a plurality of plates that may have contoured edges based on an associated support structure, which allows increased speeds while reducing failure modes. For instance, the support structure may include clamping plates 320 that apply pressure to stacking plates 322, thereby inducing friction between the plates to keep them in place and transfer rotational momentum between the plates and one or more axles 608. In some implementations, two clamping plates 320 may be clamped together by bolts or other fasteners, which thereby cause the clamping plates 320 to apply pressure on massive plates (e.g., in an axial direction), which may be referred to herein as stacking plates 322, and increase the friction among the stacking plates 322, which may, in some cases, allow the stacking plates 322 to be used without other fasteners, thereby improving safety and efficiency. Other features and benefits of the flywheel 152 are described below. Not only are the plates improved, but their support structure is improved, among other benefits. Further implementations and features allow the expansion, positioning, and use of the flywheel 152 thereby further improving its performance.

Among other improvements, the technologies described herein also include an improved support structure, such as an enclosure 304, and support system, which may include, among other things, a sealed enclosure 304, a lid-mounted vacuum assembly 308, a magnetic coupling 318, various bearings, and positioning mechanisms. The enclosure 304 may include a magnetic lift assist mechanism 352 that either entirely supports or partially supports the weight of the flywheel 152 (e.g., to reduce wear on bearings). The enclosure 304 may also include a transport surface and a lifting and adjustment mechanism that moves the position of the flywheel 152 internal to the enclosure 304 from a transport or storage position and adjusts it in an active position. The enclosure 304 may provide support for various components, such as a supercapacitor 306, vacuum assembly, processor/controller/central processing unit, a motor 310, and other components. The enclosure 304 may include various features for maintaining a vacuum, holding one or more bearings, positioning a flywheel 152 during use or transport, mitigating damage due to structural failures, and isolating vibration, among other features.

Other benefits and features are described throughout this disclosure, but it should be noted that other features and benefits are contemplated. Furthermore, while various implementations are described in reference to the figures, these are provided by way of example and their features may be expanded, modified, or removed. For instance, features described in reference to some implementations may additionally or be used with other implementations.

With reference to the figures, reference numbers may be used to refer to components found in any of the figures, regardless of whether those reference numbers are shown in the figure being described. Further, where a reference number includes a letter referring to one of multiple similar components (e.g., component 000a, 000b, and 000n), the reference number may be used without the letter to refer to one or all of the similar components. Further, it should be noted that while various example features and implementations are described throughout this disclosure and the figures, these examples are not exhaustive of every contemplated implementation, feature or permutation. For instance, while a certain feature may be described in reference to a first implementation, the feature may be used with a second implementation or the features, operations, etc., may otherwise be exchanged between the implementations.

The innovative technology disclosed in this document also provides novel advantages including the ability to integrate modern technology with conventional power infrastructure; enable rapid transition to renewable energy sources; use the power grid as a backup; store power locally in nodes and regionalized storage clusters of nodes; isolate and minimize the impact of power outages; whether caused by natural disasters, infrastructure failure, or other factors; provide affordable alternatives to expensive and environmentally unfriendly electrochemical batteries; provide consumers the option to be independent from carbon-based power sources; and decentralize electric power production.

As depicted in FIG. 1, the innovative energy technology described herein may comprise an energy as a service platform (EaaS platform) 100. The EaaS platform 100 may include an EaaS manager 110, third-party server(s) 116, user application(s) 172 operable on computing devices accessible to and interactable by user(s) 170 of the EaaS platform 100 and configured to send or receive data to the EaaS manager 110, regionalized storage clusters 160 comprised of one or more nodes 140, and the power grid 130 that comprises one or more power facilities 132 that are connected to a power transmission infrastructure 134.

A node 140 may be comprised of a power consuming entity and at least one ESU (e.g., an ESU 150 is provided as an example). A node 140 may be an entity that either consumers power itself or is coupled to entities that consumer power. In FIG. 1, a node 140 is depicted as a premises 142, such as a residential home, but it should be understood that any entity that consumes power is applicable, such as one or more appliances, a commercial structure such as a warehouse or office building, an electronic device or system (whether configured to move or static), a transportation system and/or vehicle, a transportation charging system, a power supply, a power substation, a power substation backup, etc. A regionalized storage cluster includes two or more nodes 140 in a given geographical region. A storage cluster may provide power banking functionality, as discussed further herein. The elements of the node 140 including the ESU(s) 150, the independent power system 147, the power grid 130, and/or any appliances and/or other entities, may be electrically coupled via an electrical system 154 including wiring, junctions, switches, plugs, breakers, transformers, inverters, controllers, and any other suitable electrical componentry.

In the depicted example, a node 140 is equipped with or coupled to power generating technology, such as an independent power system 147 and/or the power grid 130. The independent power system 147 may comprise power generating technology that is localized and that allows for independent power generation, such as renewable power generating technology. Non-limiting examples include a solar electric system 144 (comprising a solar array, controllers, inverters, etc.), a wind turbine system 146 (comprising turbine(s), controllers, inverters, etc.), and/or other energy sources 148, such as hydropower, geothermal, nuclear, systems and their constituent components, etc. The power generating technology may additionally or alternatively be conventional carbon-based power generating technology such as the depicted power grid 130, although for carbon negative or neutral implementation, a greener power generating technology may be preferred.

The node 140 may include or be coupled to an energy storage unit that is capable of storing excess power that is produced by the power generating technology. In some implementations, the energy storage unit may comprise a mechanical energy storage unit (ESU) 150. Although the ESU 150 is illustrated and described herein as including one or more flywheels 152A, 152B . . . 152N (also simply referred to individually or collectively as 152), they may alternatively or additionally include chemical batteries, capacitors, or other energy storage devices. The ESU's 150 may convert the electricity received from the power generating technology to kinetic energy by spinning up (increasing the spin rate) of the flywheels 152 and/or by using one or more inverters that convert between direct current and alternating current, depending on the implementation.

Each battery or flywheel 152 or may be configured to store up to a certain maximum amount of energy. By way of non-limiting example, a motor 310 coupled to the flywheel 152 may be configured to spin the flywheel 152 up to between 15,000 rotations per minute (RPM) and 25,000 RPM, such that the flywheel 152 may store between 18 kilowatt hours (kWh) and 28 kWh of electricity. Combined, multiple flywheels 152 could store between 54 kWh and 84 kWh of power. During hours in which the power generation technology, such as the solar cells, produce less power than what is consumed by the electrical apparatuses (e.g., appliances) of the premises 142, the motor 310 may be operated as a generator that converts the kinetic (mechanical) energy stored in the flywheel 152 to electricity, thereby pulling power from the flywheel 152 to meet the local power needs of the node 140 (e.g., power the electrical apparatuses of the premises 142). In this example, advantageously the node 140 may use an average of 15 kWh of power daily and the ESU 150 is capable of powering the node 140 fully for about 4-6 days should the local power generating cease to produce any power.

In some implementations, a premises 142 or node 140 may include or be coupled (physically or communicatively) with a local weather station 143 that measures light, precipitation, wind speed and direction, barometric pressure, or other weather data. For instance, where the premises 142 includes a residence, a local weather station 143 may be placed on a roof or in a yard of the residence. The local weather station 143 may be communicatively coupled directly with a controller 254 or central nervous system of a node 140 or ESU 150 or may be coupled with an EaaS manager 110, third-party server(s) 116, or another device via the network 102, for instance. Accordingly, weather and other context data may be used, as described below, to train one or more machine-learning models that predict power consumption and/or production. The weather data may also be input into a trained model in order to predict future behavior (e.g. power consumption or production), as described elsewhere herein.

In another example, as discussed further elsewhere herein, a utility may be integrated with the EaaS manager 110 and its utility management application 122 signal the power management application 111 via the storage cluster APIs 112 that it is experiencing a surge in demand for power, and the power management application 111 may signal a node 140 or cluster of nodes 140 (e.g., storage cluster 160) to spin off power from the flywheels 152 and provide the energy back to the grid through the transmission infrastructure 134, which may be connected to the node(s) 140 through connection points (e.g., two or three phase electrical service drops or buried power lines connected to a service panel, which typically includes power meter(s)). Conversely, the utility may be producing excess power and may wish to bank/store the power. The utility management application 122 may signal the power management application 111 via the storage cluster APIs 112 that it needs to store a given amount of power, and the power management application 111 may in turn signal a node 140 or cluster(s) of node(s) 140, such as one or more regionalized storage clusters 160 to inform them of the storage need, and node(s) 140 in those storage cluster(s) 160 that have excess capacity and are configured to receive power from the grid may receive the power through the transmission infrastructure 134 and store it as mechanical energy in the ESUs for later retrieval. The EaaS platform 100 may charge the utility for the power banking service, as discussed further elsewhere herein.

It should be understood that the RPMs and kWh figures provided in the prior paragraph are meant as non-limiting examples and that the ESU's 150 may be configured with flywheels 152 that are capable of storing more or less power depending on the implementation. For example, the weight of the flywheels 152, the materials used for the flywheels 152, the size and configuration of the flywheels 152, the efficiency of the motor 310 and bearings, and so forth, may all be adjusted based on the use case to provide a desired about of back-up power for the node 140. By way of further example, a flywheel 152 may be made of steel, aluminum, carbon fiber, titanium, any suitable alloy, and/or any other material that is capable of handling the cycles, vibration, radial and sheer stress and strain, and other conditions to which such a flywheel 152 would be subjected.

The power transmission infrastructure 134 comprises a power network that couples power-consuming entities, such as homes, offices, appliances, etc., to power facilities that generate power from carbon, nuclear, and/or natural sources. The transmission infrastructure 134 may include intervening elements, such as step-up transformers, substations, transmission lines, and so forth, which are interconnected to provide power widely to different geographical regions.

A power utility (also simply referred to as a utility), which may own and operate one or more power facilities and portions of the transmission infrastructure 134, may operate a utility server configured to execute a utility management application 122. The utility management application 122 may perform various functions such as load balancing, load managing, and grid energy storage, to manage the supply of electricity based on real-time demand. However, given the limitations of existing grid technologies, power outages, brownouts, and expensive peak power costs are still the norm.

A user may use an instance of a user application 172 executing on a computing device, such as the user's mobile phone or personal computer, to configure and interact with the ESU(s) 150 that they are authorized to control, such as an ESU 150 installed at their home or business, as discussed further elsewhere herein.

As shown in FIG. 1, the EaaS manager 110, the utility server 120, the power facilities 132, elements of the power grid 130, the wind turbine system 146, the solar electric system 144, the other sources 148, the node(s) 140, the regionalized storage clusters 160, the user applications 172 and associated computing devices, etc., may be coupled for communication and connected to the network 102 via wireless or wired connections (using network interfaces associated with the computing devices of the foregoing elements). The network 102 may include any number of networks and/or network types. For example, the network 150 may include one or more local area networks (LANs), wide area networks (WANs) (e.g., the Internet), virtual private networks (VPNs), wireless wide area network (WWANs), WiMAX® networks, personal area networks (PANs) (e.g., Bluetooth® communication networks), various combinations thereof, etc. These private and/or public networks may have any number of configurations and/or topologies, and data may be transmitted via the networks using a variety of different communication protocols including, for example, various Internet layer, transport layer, or application layer protocols. For example, data may be transmitted via the networks using TCP/IP, UDP, TCP, HTTP, HTTPS, DASH, RTSP, RTP, RTCP, VOIP, FTP, WS, WAP, SMS, MMS, XMS, IMAP, SMTP, POP, WebDAV, or other known protocols.

The EaaS manager 110, the third-party server(s) 116, the utility server 120, the node(s) 140, the power facilities, and the user devices may have computer processors, memory, and other elements providing them with non-transitory data processing, storing, and communication capabilities. For example, each of the foregoing elements may include one or more hardware servers, server arrays, storage devices, network interfaces, and/or other computing elements, etc. In some implementations, one or more of the foregoing elements may include one or more virtual servers, which operate in a host server environment. Other variations are also possible and contemplated.

Figure 2:
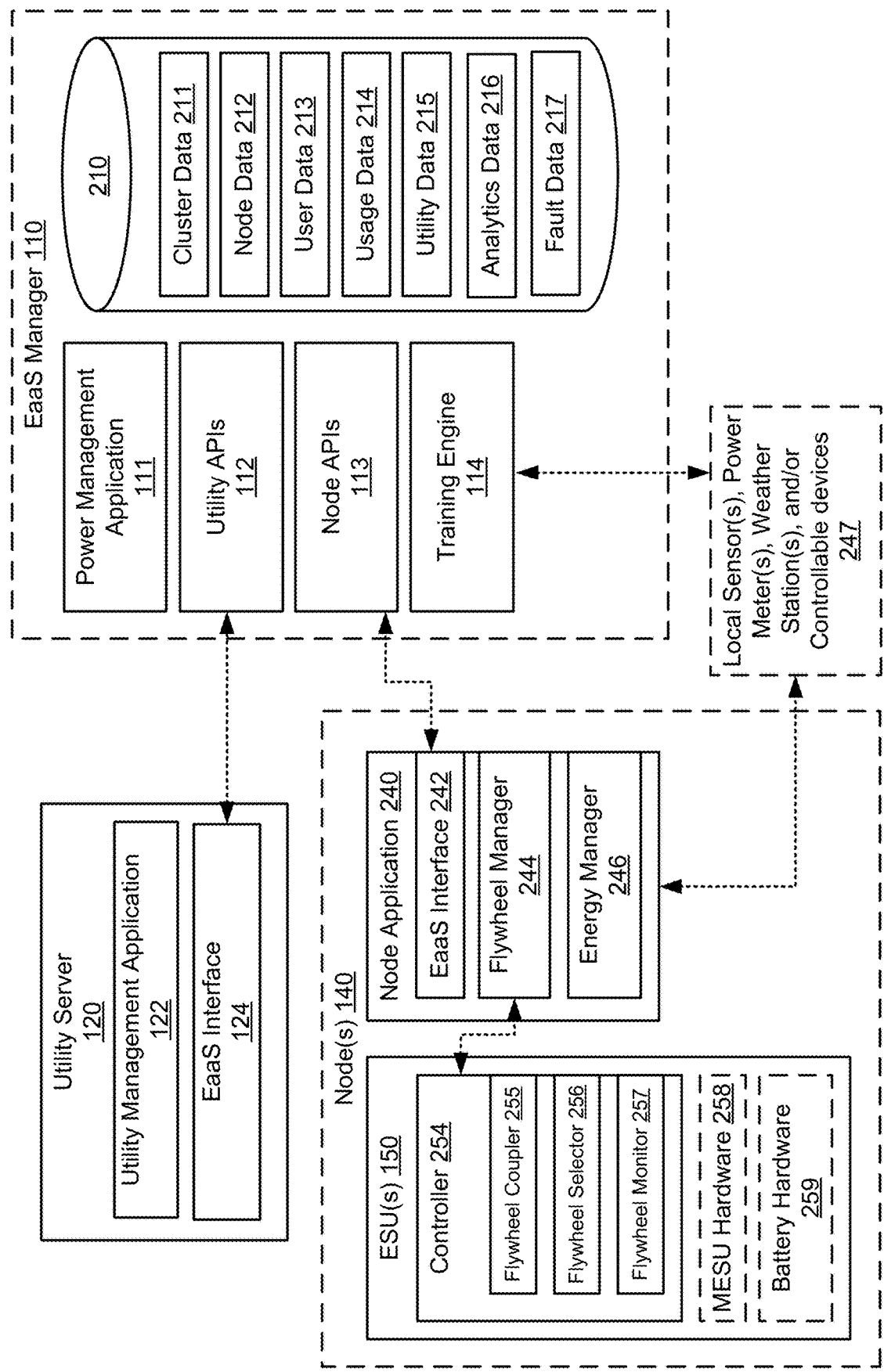
FIG. 2 depicts a block diagram showing example components of, and the interaction between, the utility server, a node, and an energy as a service manager.

It should be understood that the EaaS platform 100 illustrated in FIG. 1 and the diagram illustrated in FIG. 2 are representative of example systems and that a variety of different system environments and configurations are contemplated and are within the scope of the present disclosure. For example, various acts and/or functionality may be moved between entities (e.g., from a server to a client, or vice versa, between servers, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc., without departing from the scope of this disclosure.

The third-party server(s) 116 one or more servers or services that provide additional or outside information. For example, a third-party server 116 may associated with and/or provide interaction with the National Weather Service™, an electric vehicle, a smart EV charger, a smart thermostat, a home automation system, a smart power meter (e.g., an Acrel™ meter), a solar power production service, or various other servers or services. For instance, the EaaS manager 110 and/or a node 140 (e.g., a controller 254 or central nervous system thereof) may communicate with one or more third-party servers 116 to receive power consumption data, power production data, contextual data, or otherwise. In some instances, the one or more third-party servers 116 may additionally or alternatively allow control of various power production devices or power loads.

FIG. 2 depicts a block diagram showing example components of, and the interaction between, the utility server 120, the node(s) 140, and the EaaS manager 110. The utility server includes an instance of the utility management application 122 and an EaaS interface 124. The EaaS manager 110 includes a power management application 111, utility APIs 112, node 140 APIs 113, and a data store 210. The data store 210 may store and provide access to data related to the EaaS platform 100, such as cluster data 211, node 140 data 212, user data 213, usage data 214, utility data 214, analytics data 216, and fault data 217.

In some implementations, the EaaS manager 110 may include a training engine 114 that receives various data and trains one or more machine-learning models that may be used by a node 140, EaaS manager 110, or utility server 120 to estimate future behavior, such as consumption or production of power, as described in further detail below. It should also be noted that, although the training engine 114 is illustrated as being included on the EaaS manager 110, it may be executed on a node 140, utility server 120, third-party server 116, another device, or distributed among multiple devices.

A node 140 of the EaaS platform 100 may include one or more ESU(s) 150, although chemical or other forms of electrical storage are possible and contemplated herein. An ESU 150 may include an instance of a controller 254. The controller 254 may include a flywheel coupler 255, a flywheel selector 256, and flywheel monitor 257. The MESU (mechanical energy storage unit) hardware 258 may comprise a chassis, one or more flywheels 152, magnets and/or bearings, a flywheel coupler 255, and/or a motor-generator 310. The motor-generator 310 may be coupled to each flywheel 152 via a flywheel coupler 255. The flywheel coupler 255 may engage and disengage the motor-generator 310 from the flywheel 152, such that each flywheel 152 may spin freely when disengaged and may be coupled to the motor-generator 310 when engaged such that the motor-generator 310 may increase the speed of the flywheel 152 (spin up the flywheel 152), or the flywheel 152 may spin the generator to produce power. Each flywheel 152 may be levitated using magnets to minimize the friction caused by the rotation of flywheel 152. As an example, a maglev unit may be used to suspend and retain the flywheel 152 while spinning.

In some implementations, the ESU 150 may additionally or alternatively include battery hardware 259, for example, for various other energy storage unit types, such as a chemical battery. For instance, one or more chemical battery cells, controllers, housings, or other configurations may be used.

Additionally, or alternatively, bearings, such as but not limited to ceramic bearings, may be used to support and retain the flywheel 152 while spinning. The chassis may house and support the flywheels 152. Flywheels 152 may be arranged horizontally or vertically. In horizontal orientation, flywheels 152 may have a wheel-like shape and may be stackable one on another in the same chassis, but still configured to spin independently of one another. In such a configuration, the coupler couple to each flywheel 152 independently, or more than one coupler and motor 310 may be used, depending on the implementation. In a vertical orientation, the flywheels 152 may have a roll like shape, and may be positioned parallel to one another in the chassis. In either orientation, in some implementations, the chassis may include a housing that encloses the ESU 150 and provides a vacuum environment in which the components of the ESU 150 may operate. This is advantageous as it may seal out dirt, debris, and corrosion causing elements, and allow for the flywheels 152 and other components to optimally operate.

In some implementations, a node 140 may include one or more ESU(s) 150 and may act as a manager of the ESU(s), may receive and process information from the EaaS manager 110 for the two or more ESU(s) 150, and may send signals to the ESU(s) 150 (e.g., via the controller 254, MESU hardware 258, and/or battery hardware 259) and receive and process signals from the ESU(s) 150 (e.g., via the controller 254, MESU hardware 258, and/or battery hardware 259), to control the functionality and operations of the ESU(s) 150. In some further implementations, the structure, acts, and/or functionality of the controller 254 and the node 140 application 240 and their constituent components may be combined, and the node 140 may represent an ESU(s) 150 itself, to which one or more appliances that consume power may be coupled to receive power. Other variations are also possible and contemplated.

The utility management application 122, the controller 254, the node 140 application, the node 140 management application, the utility APIs, the node 140 APIs, and the ESU APIs may each include hardware and/or software executable to provide the acts and functionality disclosed herein.

Specifically, the utility management application 122 may be executable by the utility server 120 to monitor power generation and distribution by one or more power facilities and a transmission infrastructure 134. The utility management application 122 may receive signals from various entities of the EaaS platform, such as the EaaS manager 110, the nodes 140, the transmission infrastructure 134, other utility management applications associated with other providers, and so forth. The utility management application 122 may communicate via the EaaS interface 124 with the EaaS manager 110 to access the services provided by the EaaS manager 110. In particular, the EaaS interface 124 may interact with the utility APIs of the EaaS manager 110 to request power banking, request the provision of supplemental power, to provide usage, performance, and/or demand data, and so forth. In some implementations, the EaaS interface 124 may generate and transmit a secure request via the network to the utility APIs. The power management application 111 may receive the request via the utility APIs and process it accordingly.

In some implementations, a node 140 or premises 142 may include one or more local sensors, power meters, weather stations, and/or controllable devices, which, for example, may be electrically and/or communicatively coupled with the ESU 150 or other components of the node 140. For instance, these sensors and devices may communicate directly with the controller 254 or with an EaaS manager 110 (directly or via one or more servers, networks, APIs, etc.). Accordingly, in some implementations, the training engine 114 may receive data from the devices 247 or other components of the node 140 (and/or other sources, such as third-party server(s) 116) to train models. The training engine 114 may store the models in the node 140 data 212, for example, if they are trained for a specific node 140, cluster data 211 if they were trained for a cluster of nodes 140, etc. Accordingly, the power management application 111 may receive or access the models to generate predictions, as described below, for example.

The power management application 111 may be coupled to the data store 210 to store and retrieve data. The data stored by the data store 210 may be organized and queried using any type of data stored in the data store (e.g., cluster ID, user ID, utility ID, node 140 ID, ESU ID, configuration data, etc.). The data store 210 may include file systems, databases, data tables, documents, or other organized collections of data.

Cluster data 211 may comprise information about a cluster of two or more nodes 140 (e.g., regionalized storage cluster), such as the identity of the node(s) 140, the storage capacity of the storage cluster 160, the availability of the storage cluster 160, the operational health of the storage cluster 160 and/or constituent ESU(s) 150, the historical performance of the storage cluster 160, etc.). The cluster data 211 may include various consumption data, production data, weather data, context data, algorithms, equations, cluster attributes, machine learning models trained for the cluster, or other data.

Node 140 data 212 may comprise information about a node 140, such as the number of ESUs installed at the node 140, the type of node 140, the operational health of the ESU(s) 150, any restrictions or operation parameters of the ESU(s) 150, configuration data for the ESU(s) 150, identifiers of the ESU(s) 150, who the ESU(s) 150 belong to, whether the ESU(s) 150 can be used for banking grid power, whether the ESU(s) 150 have been inactivated, and so forth.

The node 140 data 212 may include various consumption data, production data, weather data, context data, algorithms, equations, node 140 attributes, machine learning models trained for the node 140, or other data, for example, as described in further detail elsewhere herein.

User data 213 may comprise information about the user associated with a storage cluster 160, node 140 or ESU 150, including user account information, login information, user preferences governing the ESUs (e.g., schedule data, activation/inactivation data, etc.).

Usage data 214 may comprise information about the usage of the clusters and/or ESU(s) 150, such as spin rates of the flywheels 152, power output levels, maintenance periods, downtime, inactive periods, third-party use (e.g., use by utilities or neighboring nodes 140), etc.

Utility data 215 may comprise information about utilities that have partnered with the EaaS platform 100, such as utility account information, utility capability information, power banking requirements, contractual parameters, performance requirements, power grid 130 specifications, etc.

Analytics data 216 may comprise insights about the EaaS platform 100, such as local vs. grid power generation, aggregate usage data, aggregate performance data, etc. It should be understood that any other data that would be suitable and applicable to the EaaS platform 100 may be stored and processed by the EaaS manager 110. In some instances, the analytics data 216 may describe performance of machine learning models, predictions, or other data, as described in further detail elsewhere herein.

Fault data 217 may comprise sensor and other data, such as is described throughout this disclosure, including faults, alerts, thresholds against which data is compared to detect faults, and other data. For instance, fault data 217 may include any of the data described below in reference to the methods and graphical user interfaces, such as sensor data, voltages, state of charge, etc.

The node 140 application 240 and the controller 254 may communicate with the EaaS manager 110 via the EaaS interface 242, which is configured to interact with the node 140 APIs 113 surfaced by the EaaS manager 110. The node 140 APIs 113 provide methods for accessing data relevant to the node 140 and the ESU(s) 150 associated with the node 140, and executing various functionality, such as signaling unavailability/availability for banking power, requesting a functional upgrade, such as a higher spin rate for one or more flywheels 152 or deactivating/activating a previously active/inactive flywheel 152, reporting usage data and/or state information, and so forth.

In some implementations, the node 140 application 240 may executed on or in communication with a controller 254, which may be a computing device that controls components of a node 140, such as a mechanical battery (e.g., a flywheel), chemical battery, or various other components. For instance, the controller 254 may include a central nervous system (CNS) or computer that receives sensor data, provides instructions to inverters, motors, or other components, or performs other operations. For instance, the node 140 application 240 may be executed on the controller 254 or CNS to communicate with node 140 components and/or an EaaS manager 110 or another external component.

The flywheel manager 244 of the node application 240 may be configured to communicate with the controller 254 to provide operational control signals, such as power banking signals, power extraction signals, spin rate adjustment signals, flywheel enablement/disablement signals, and so forth. The energy manager 246 is configured to communicate with the flywheel manager 244 and provides controls signals to the flywheel manager depending on the energy requirements (produce energy for local use, produce energy for utility use, bank local energy, bank utility-provided energy, etc.).

The flywheel coupler 255 may be configured to control the mechanical coupling of the flywheels 152 with the motor-generator 310, the flywheel selector 256 is configured to select which flywheels 152 to control based on the received control signals, and the flywheel monitor 257 monitors the state of each flywheel 152 for safe operation and performance within defined operational parameters, and can take control of the functionality of the MESU hardware 258 and shut down, slow, suspend, adjust, optimize, or other control the MESU hardware 258 depending on the monitored state.

Figure 3A:
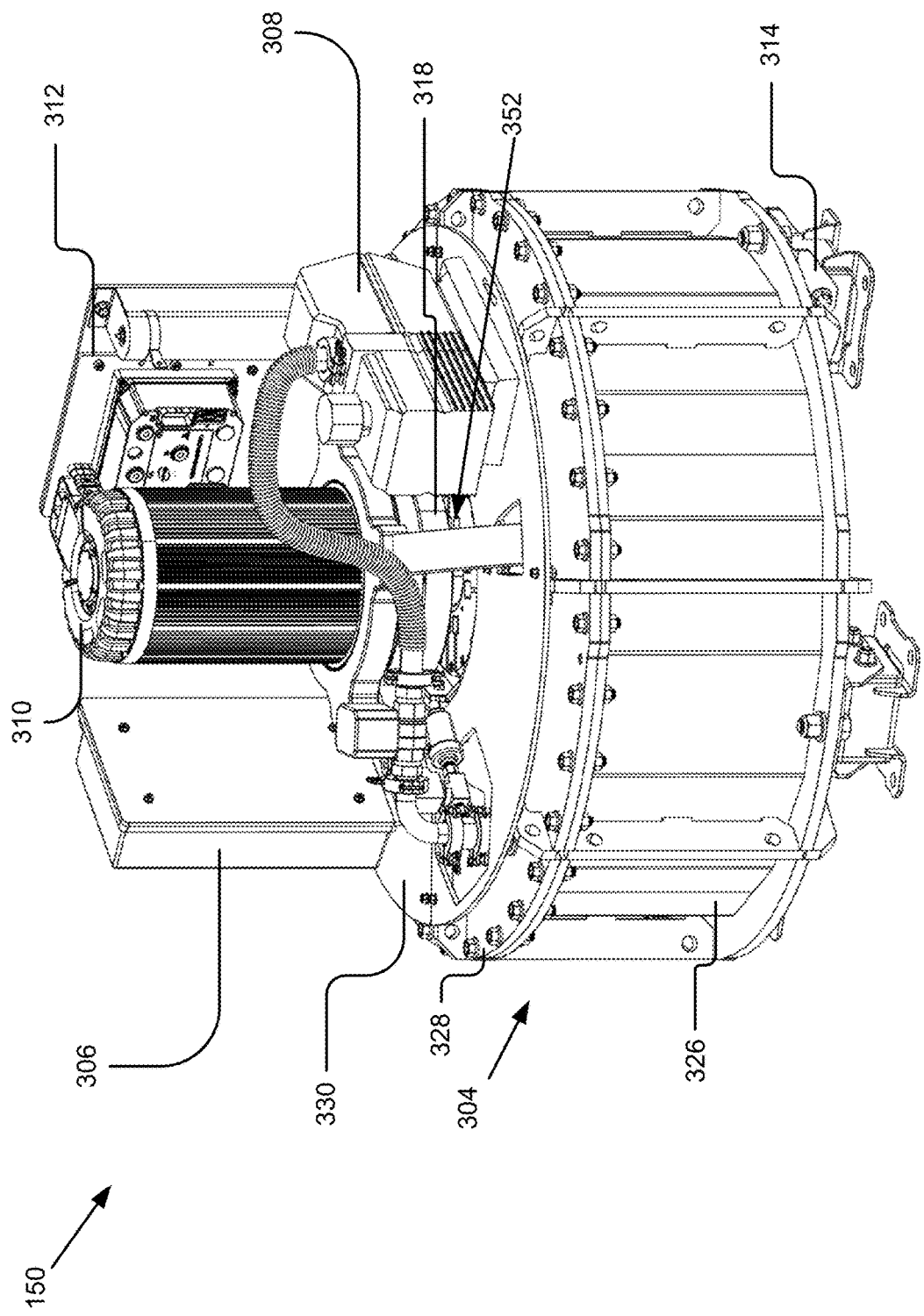
FIGS. 3A-3D illustrate example mechanical-energy storage units from various angles and views.
Figure 3B:
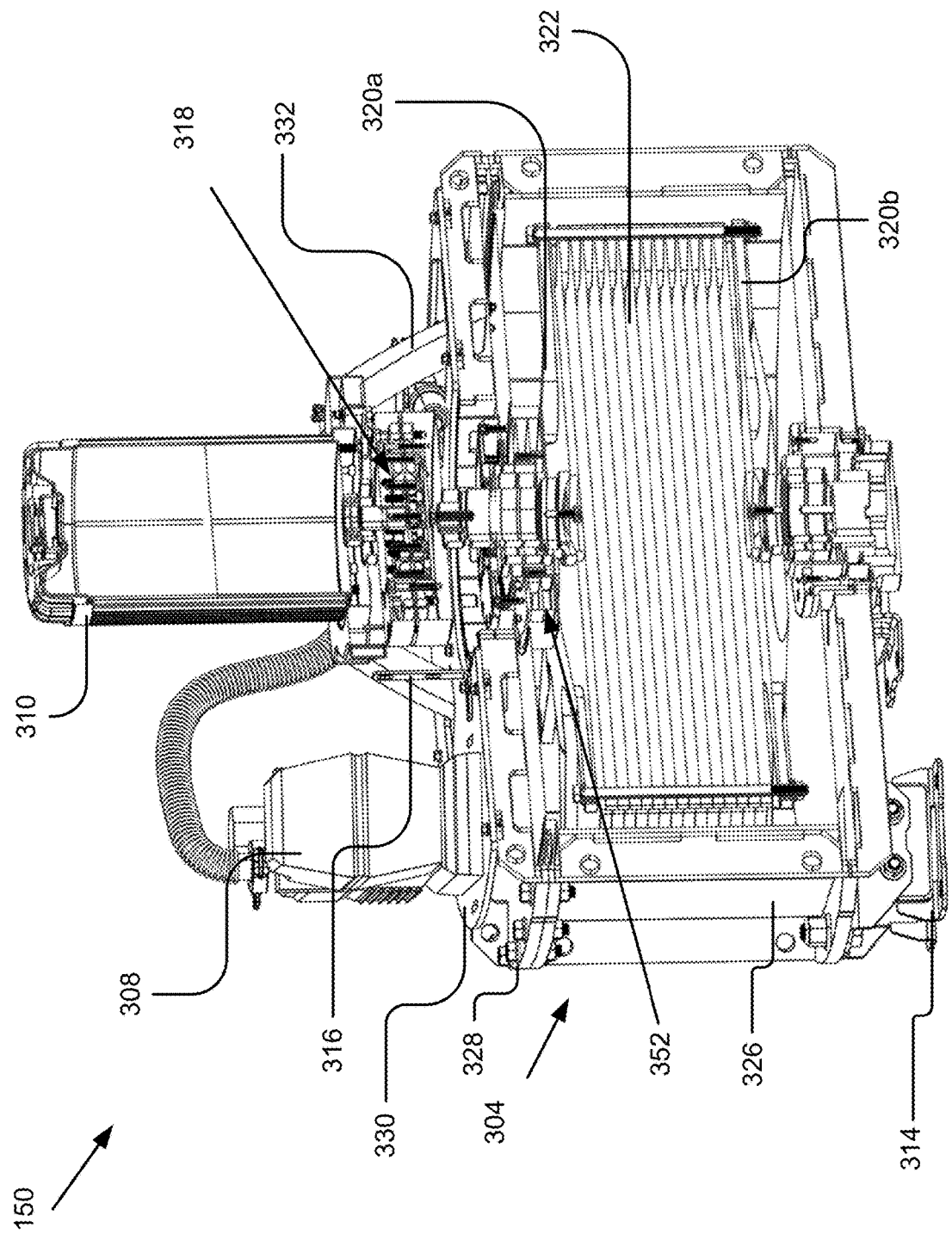
Figure 3C:
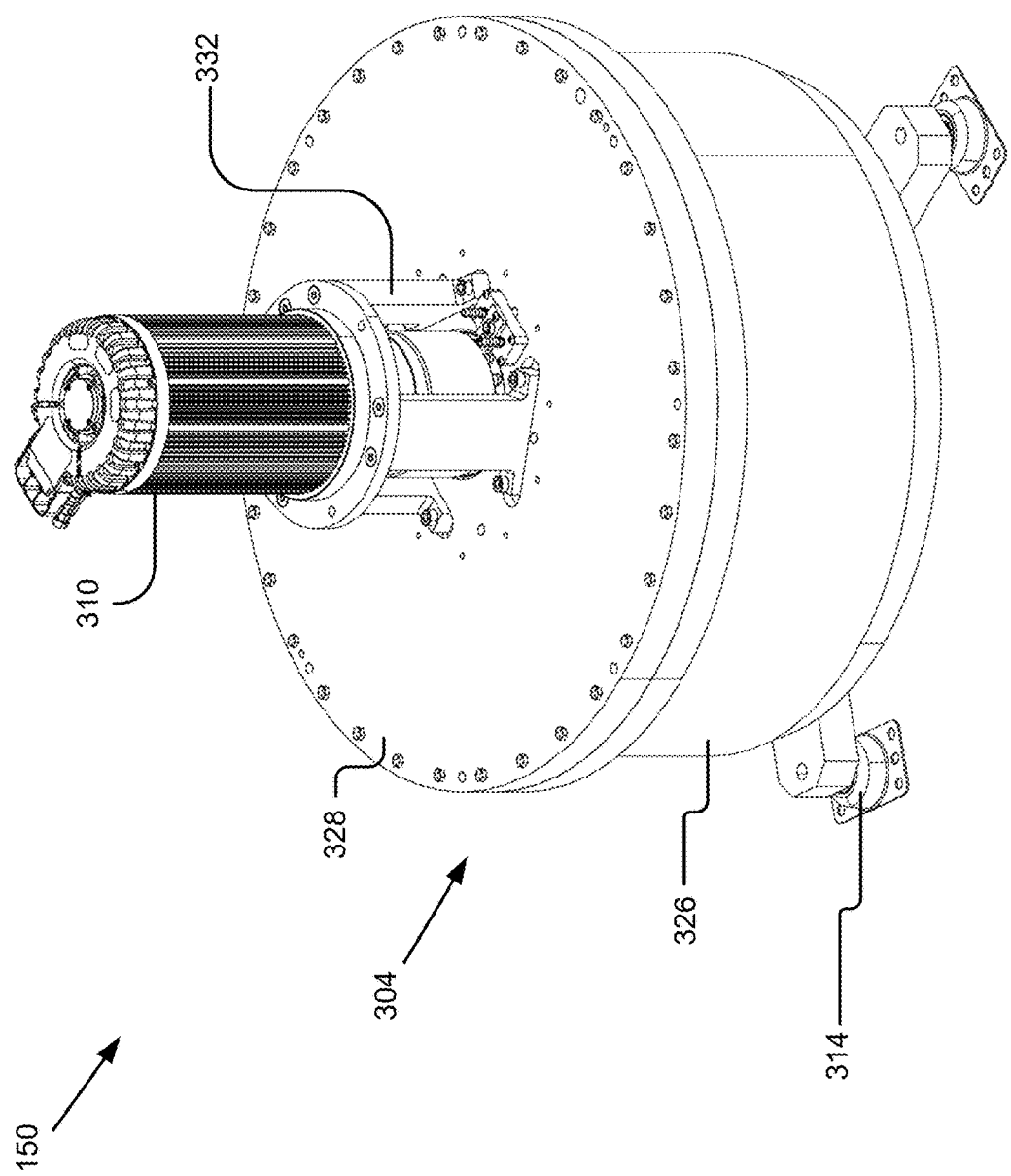
Figure 3D:
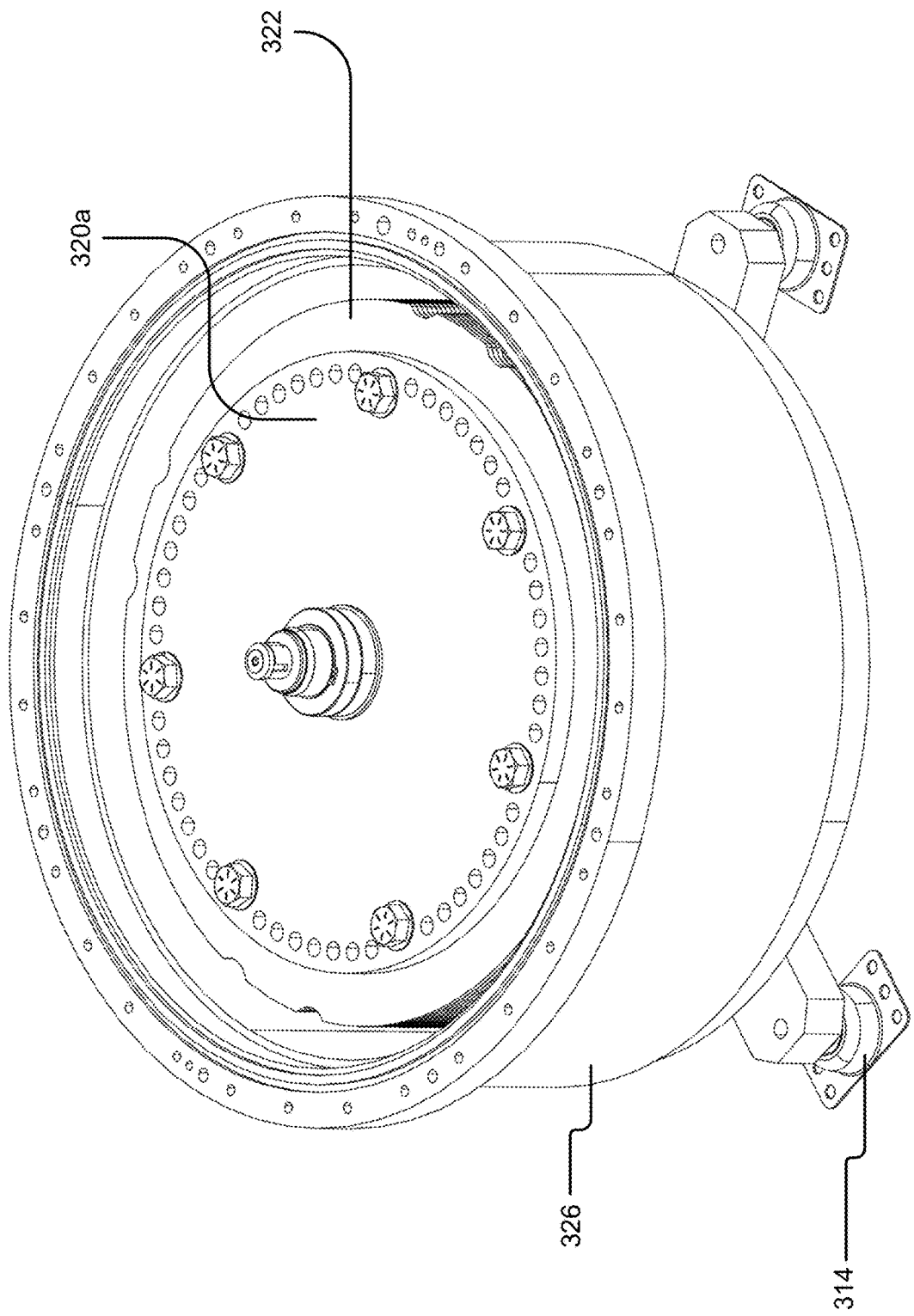

FIGS. 3A-3D illustrate an example mechanical-energy storage unit 150 (MESU 150) or flywheel assembly 150 from various angles and views. For example, FIG. 3A illustrates a front-top view, FIG. 3B illustrates a cross section view, FIG. 3C illustrates a front-top view of another example MESU 150 or flywheel assembly 150, and FIG. 3D illustrates a front-top view with an enclosure lid 328 removed to show a flywheel 152 inside a flywheel enclosure 304 of an example MESU 150 assembly.

The improved flywheel assembly 150 may be a mechanical-energy storage unit 150 with configurations and features that improve manufacturability while also providing redundancy, safety, and reliability that allow the flywheel assembly 150 to provide years of safe and relatively maintenance free operation in ways that were not previously possible, for example, as may be noted in the Background and elsewhere herein. Although various configurations are possible and contemplated, the illustrated example flywheel assembly 150 may include a vacuum enclosure 304 and support structure, a massive rotating flywheel 152 (not visible in FIG. 3A) internal to the enclosure 304, a motor-generator 310 that may be fully or partially external to the enclosure 304 and coupled with the flywheel 152, a supercapacitor 306, driver(s) and/or CPUs, inverter(s), circuit breakers, magnetic lift member(s) 352 (also referred to as magnetic lift components or mechanisms herein), bearings, physical or magnetic couplings 318, a vacuum pump 308, and various other components, as described below, although other implementations are possible and contemplated herein.

The enclosure 304 is an example of a support structure that supports various components of a flywheel assembly 150. While example enclosures 304 are shown completely enclosed, in some implementations, an enclosure or other support structure may be open, such as a cage, frame, or other configuration.

The example flywheel assembly 150 may include, among other things, an enclosure 304 that is scalable to provide a vacuum, support to the flywheel 152 (not visible in FIG. 3A), a mounting structure for various components of the assembly, and protection against mechanical failure, among other things. The example enclosure 304 for the flywheel 152 may be configured as a vacuum assembly case with reinforcement including features for coupling the flywheel 152 with the case, an improved shape, and an ability to adjust the flywheel 152 through the case. In some instances, a connection for creating and/or maintaining a vacuum may also be included with the case. Example implementations and features of the enclosure 304 may be described elsewhere herein, although other implementations are possible and contemplated.

The flywheel enclosure 304 may be mounted and/or isolated from a mounting structure by one or more feet 314 or legs that couple the enclosure 304 with an external structure while isolating vibrations, as noted below, and may include mounting structures for accommodating various components of the assembly. For example, a supercapacitor 306 may be mounted to a support structure of or attached to the enclosure 304, which supercapacitor 306 may buffer energy entering/exiting the flywheel 152, for instance, by assisting the motor 310 to spin the flywheel 152 up or receive energy therefrom.

Also, as described below, the enclosure 304 may provide mounting points or structures (e.g., a mounting brace 332) for mounting a motor-generator 310 in line with the axis of rotation of the flywheel 152, although, in other implementations, gears may be used to couple the motor-generator 310 with the flywheel 152. The motor-generator 310 may be coupled with the flywheel 152 via one or more axle 608 components and, in some instances, a magnetic coupling 318 that allows a flywheel axle(s) 608 to remain physically decoupled from a motor-generator 310 rotor while still providing force to pass between them, although a physical coupling may also or alternatively be used, as described below. The motor-generator 310 may have an electrical connection to a supercapacitor 306, inverter, driver, CPU, external grid connection or otherwise, which allows electrical current to flow into the motor-generator 310 to spin up the flywheel 152 or out of the motor-generator 310 to receive stored potential energy from the flywheel 152.

The motor-generator 310 may have various configurations, as noted in further detail elsewhere herein. In some implementations, the motor-generator 310 may be an electrical-vehicle motor or other motor (e.g., a Hyper 9™ motor), such as a brushless alternating current motor (e.g., a 3 phase AC synchronous reluctance internal permanent magnet motor) that can free-wheel in order to allow the flywheel 152 to store power for a longer period of time. The motor size and configuration may vary depending on peak output/input and flywheel 152 size/speed requirements. For instance, a smaller, residential MESU 150 may include a smaller size flywheel 152 with a 30-40 KW motor while a larger, commercial (e.g., for a store, electrical utility, subdivision, etc.) may have a 300-500 KW motor, although other implementations are possible. The motor controller and/or CPU may be the same for various sizes of flywheels 152 or may vary depending on the implementation.

The motor-generator 310 may be coupled with the flywheel 152 using an axle 608 and bearing of the flywheel 152/flywheel enclosure 304. Similarly, in some implementations, the flywheel axle 608 and motor-generator 310 may be coupled using a flywheel motor coupling, which may include a direct connection, magnetic coupling 318, friction clutch, torque converter, gearbox, or otherwise, as described in further detail below.

An example flywheel 152 (not visible in FIG. 3A) may be housed in and/or supported by the enclosure 304 and components thereof. Example flywheels 152 and features thereof are described throughout this disclosure. For example, a flywheel 152 may include a plurality of stacking plates 322 held together by a support structure, such as clamping plates 320 (e.g., using compression and friction). The support structure may include one or more axles 608 that attach thereto and provide support to the flywheel 152. As described in further detail elsewhere herein, the configuration of the support structure and axles 608 may allow flywheel plates to be used without the axle 608 perforating the plates. Depending on the implementation, the axle(s) 608 may be vertically and/or horizontally supported by other components or the flywheel enclosure 304 and may couple with a motor-generator 310 (e.g., as noted above).

For example, an axle 608 may interact with one or more bearings, whether magnetic, metal, ceramic, hybrid ceramic, etc., of the enclosure 304, to allow the flywheel 152 to spin about an axis formed by the axle 608. The enclosure 304 may include or couple with one or more bearings that support the flywheel 152 horizontally to keep it spinning with little-to-no vibration, as described below. In some cases, the bearings may be ceramic to avoid interaction with a magnetic field of a magnetic lift member 352 or other magnetic component.

The axle(s) 608 may interact with the bearing(s) to provide vertical or horizontal support to the flywheel 152, for example, by keeping the axles at a defined location and balanced at a defined axis of rotation.

For instance, a bottom bearing may interact with the bottom of the flywheel 152 and/or a top bearing may interact with the top of the flywheel 152, for example, inside the enclosure 304. In some implementations, a magnetic levitation device or magnetic lift assistance member 352 may be used to reduce the friction or pressure, for example, on one or more of the bearings. For instance, a magnetic levitation device may be disposed at a bottom of the flywheel 152 to apply upward force thereon thereby limiting the force due to gravity on a bottom bearing and/or balancing force between a top and bottom bearing. In some implementations, a magnetic lift assistance member (also referred to as magnetic lift member) 352 may be positioned at a top of the flywheel 152/enclosure 304 to pull the enclosure 304 upward, thereby decreasing the force due to gravity on a bottom bearing(s). As noted in further detail elsewhere herein, the magnetic lift assistance member 352 may lift less then, exactly, or greater than the weight of the flywheel 152 so that there is some, little, or no weight on the bottom and/or top bearing(s).

The amount of weight held by magnets of the magnetic lift assistance member 352 may be adjusted based on a distance from the magnets, as described elsewhere herein. For instance, the flywheel 152 may be manually adjusted by an installer or, in some implementations, the enclosure 304 may include or may be coupled with one or more flywheel positioning components that may adjust the position of the flywheel 152, for example, to ensure that a correct distance between the flywheel 152 and magnetic lift assist mechanism 352, top bearing, bottom bearing, or other component of the assembly 150. For instance, a flywheel positioning component may move the flywheel 152 (e.g., inside the enclosure 304) from a shipping position to an engaged position where it is in a correct position relative to the bearing(s) to minimize bearing wear and friction.

It should be noted that although the enclosure 304 is illustrated as fully enclosed, including reinforcements, welds, seals/O-rings, etc., that allow a vacuum to be maintained inside the enclosure 304 with the flywheel 152; however, it should be noted that other implementations are possible and contemplated herein, such as where the enclosure 304 is fully or partially open.

In some implementations, the flywheel assembly 150 may include various components mounted to the enclosure 304 (e.g., via a lid 328 assembly mounting plate or bracket) that support the operation of the flywheel 152. For instance, the flywheel assembly 150 may include a supercapacitor 306, motor-generator 310 (and associated mounting hardware), driver and CPU/controller 312, vacuum pump 308, various inverters, wiring harnesses, circuit breakers, and other equipment, although other implementations are possible and contemplated herein.

As illustrated in the examples of FIGS. 3A-3D, a flywheel enclosure 304 may be round with a flat bottom and top and various reinforcing ridges, which configuration may provide strength to the enclosure 304 to prevent buckling due to an internal vacuum while also preventing external damage in case of a mechanical failure of the flywheel 152. It should be noted that the enclosure 304 may be square, hexagonal, etc. It may have rounded (e.g., as illustrated in FIG. 3D) or flat sides (e.g., as illustrated in FIG. 3A). As illustrated in FIG. 3A, a mounting plate may be positioned on top of the enclosure 304 components mounted thereto, as described in further detail below.

In some implementations, as illustrated in the examples, the flywheel assembly 150 may include one or more (e.g., 3 and 4 arms are illustrated) motor mount braces 332 that couple with a lid 328 of the flywheel enclosure 304 and extend upward to support a motor mount, which may comprise a ring that holds the motor-generator 310 in alignment with an axis of rotation of the flywheel 152. In some instances, the motor mount braces 332 may include linear actuators that lift the motor-generator 310 vertically in order to decouple the motor-flywheel 152 coupling, such as the magnetic coupling 318 described in further detail below. The flywheel assembly 150 may include a component mounting plate or lid assembly mounting plate(s) 330 that couple with top ribs or other structures of the enclosure 304 and provide mounting points for the various accessory components of the flywheel assembly 150. In some instances, the lid 328 or lid assembly mounting plate(s) 330 may have various perforations that allow the motor mount braces 332, axles 608, motor-flywheel 152 coupling, vacuum pump 308 connection and other components to pass therethrough. Accordingly, the components may be securely mounted to mounting plate 330, lid 328, enclosure 304, or otherwise (e.g., as illustrated in the example figure) in order to speed assembly and improve stability.

As shown in the example of FIG. 3A, the enclosure 304 may have a plurality of reinforcing structures, such as ribs, rings, etc.

The enclosure 304 may also include one or more feet 314 or other supports that provide support to the ribs (e.g., the side or bottom ribs) or other structures (e.g., a bottom plate) of the enclosure 304 to secure the flywheel assembly 150, support the weight of the flywheel 152, and/or isolate the flywheel 152's movement/vibration; although, it should be noted that vibration is ideally limited by balancing the flywheel 152 and acceleration, temperature, or other sensors may be located in the bearings, axles 608, enclosure 304, or other components.

FIG. 3B illustrates an example cross section view of a flywheel assembly 150. For instance, as shown in the figure, a flywheel 152 having a number of stacking plates 322 and a top and bottom axle 608b is located inside an enclosure 304. The bottom axle 608b of the flywheel 152 is shown interacting with bottom bearings that support the flywheel 152 horizontally and/or vertically. The top axle 608a of the flywheel 152 is shown passing through a magnetic lift member 352 and into a magnetic coupling 318, which couples the axle 608 with a stator (directly or via other components, axles 608, drive shafts, gears, etc.) with the motor-generator 310, which is held vertically above the axle 608 using the motor braces 332. Additionally, as noted elsewhere herein, various sensors may be located throughout the assembly, such as the RPM sensor mount 316 that is located adjacent to the magnetic coupling 318, as well as various temperature, acceleration, etc., sensors that may be positioned adjacent to the motor 310, bearings, and other components of the assembly. These and other implementations and features are described in further detail below.

FIG. 3C illustrates another example MESU 150 or flywheel assembly 150 with a different implementation of the enclosure 304. As illustrated, an enclosure 304 may be a cylindrical enclosure with an enclosure base, such as a tub 326 and a lid 328. The enclosure 304 may also include one or more feet 314 (e.g., three are illustrated in FIG. 3C) or legs support the flywheel assembly 150. A foot 314 may include a bushing or other component that isolates vibrations, bolt holes to bolt the flywheel assembly 150 to a floor or other location.

In the depicted example, the motor-generator 310 may be mounted higher on motor mount braces 332 and/or base than the example of FIG. 3A, for example, to allow access to mount or remove the motor-generator 310, magnetic coupling 318, bearings, or other components. Additionally, while the other components illustrated in FIG. 3A are not shown in FIG. 3C, they may also be mounted to the lid 328 or another location of the flywheel assembly 150. For instance, a vacuum pump 308, supercapacitor 306, chemical battery, driver, CPU, etc., may be mounted to the lid 328, tub 326, other portion of the flywheel assembly 150, or otherwise.

FIG. 3D illustrates the example flywheel assembly 150 of FIG. 3C with the lid 328 and other components omitted to show an example massive flywheel 152 inside the enclosure 304. As shown, the flywheel 152 may be positioned at a center of the enclosure 304, although other implementations are possible. As illustrated in the example of FIG. 3D, a flywheel 152 may include one or more clamping plates 320 (the top clamping plate 320a is shown), one or more stacking plates 322, one or more bolts holding the clamping plates 320 together and/or to the stacking plates 322, and one or more axles 608. These and other features and implementations are described in further detail elsewhere herein.

Figure 4A:
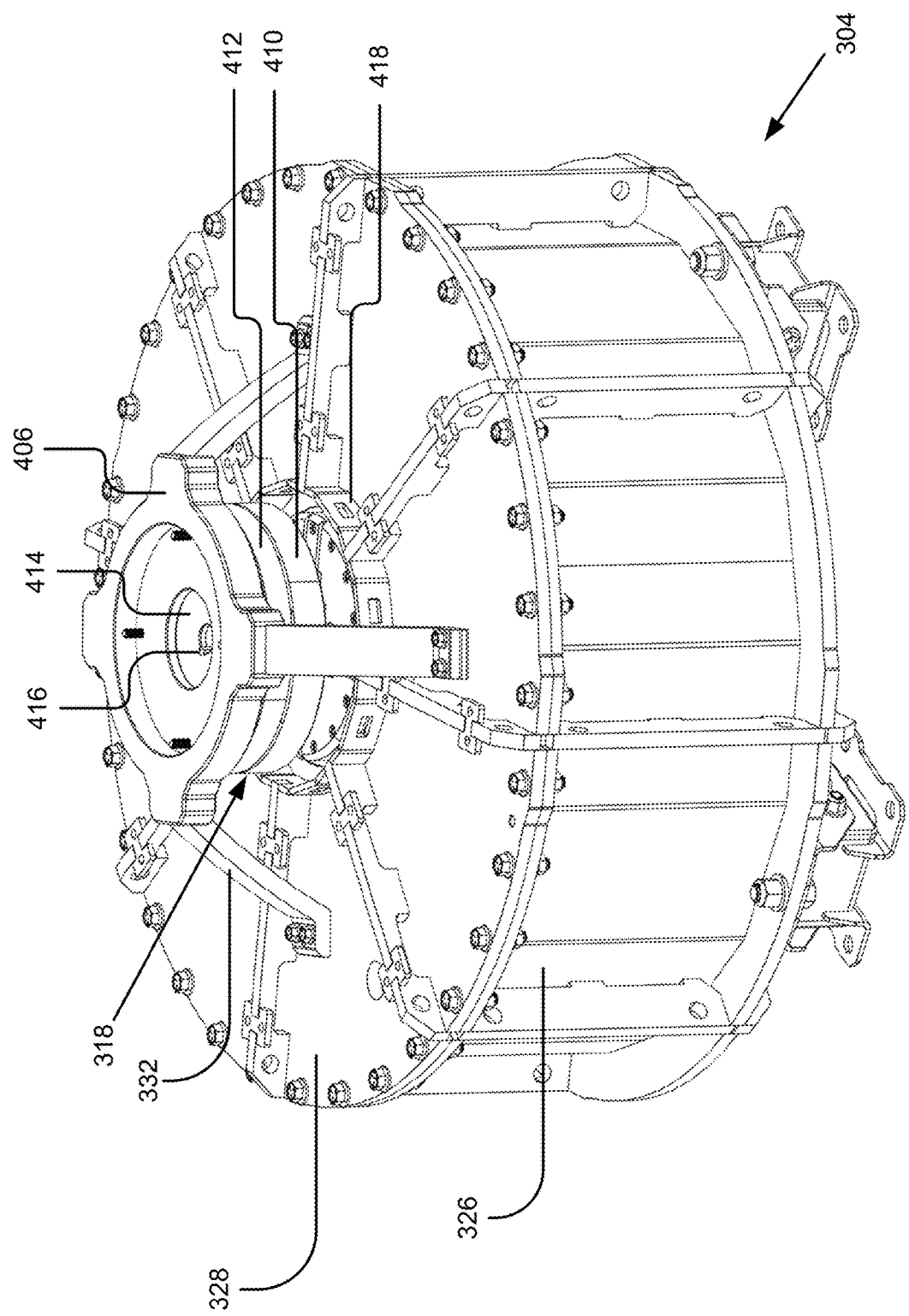
FIG. 4A illustrates an example flywheel enclosure with a motor mount, magnetic coupling, and other features coupled therewith.

FIGS. 4A-5B illustrate an example flywheel enclosure 304 and various components, views, and constructions thereof. FIG. 4A illustrates an example flywheel enclosure 304 with a motor mount, magnetic coupling 318, and other features coupled therewith. For instance, various components, such as the motor-generator 310, CPU, vacuum 308, and mounting plates 330 are removed to expose the underlying structure. As illustrated in the example, four motor mount braces 332 are coupled to a top plate (e.g., part of a lid 328) of an enclosure 304 and extend upward to provide rigid support to a motor mount base 406. The motor mount base 406 may be round or any other shape to accommodate various components, such as the motor-generator 310, magnetic coupling 318, bearing(s), axle(s) 608, etc. For instance, the motor mount base 406 may be rounded at a top to receive and mount (e.g., using fasteners, such as bolts) the motor-generator 310, have a perforation through which a flywheel axle 608 and/or motor axle, etc., may pass, and or may allow various other components to be coupled or mounted thereto. For instance, a magnetic coupling 318 may be mounted to or integrated with the motor mount base 406, so that it can easily be attached to the enclosure 304.

As depicted in the example, the motor mount braces 332 and base 406 may be configured to be lifted above, accommodate, and/or hold other components. For instance, a motor coupling, such as the illustrated example magnetic coupling 318 may be coupled to a bottom side of the motor mount base 406 to interact with both a top axle 608a and a motor-generator 310. Similarly, this positioning may allow top bearing(s) to be installed or maintained under the braces/base. Similarly, as noted elsewhere herein, reinforcing components or structures of the flywheel assembly 150 may support the motor 310, prevent undesired twisting of components, and hold a bearing and/or magnetic lift member 352.

FIG. 4A also illustrates various assembled structures of the flywheel enclosure 304, which may include a lid 328 and a tub 326, for example. The lid 328, as described in further detail below, may include a top plate, top rib(s), motor mount brace(s) 332, mounting plates, and various other structures. For instance, a top ring 418 may include a ring of material (e.g., a steel ring or set of bends in steel plates) may be disposed surrounding an axle 608a/axis of rotation to provide torsional rigidity to the enclosure 304 and/or to top ribs, which may radiate outward from (e.g., merge at/into) the top ring 418 and provide strength to the lid 328, which may support motor mount brace(s) 332, mounting plate(s), a vacuum 308, etc., and may prevent the top plate from buckling when force is placed thereon. The top ring, top rib(s), top plate, and/or other structures may work together to support air pressure due to an internal vacuum and/or the weight of the flywheel 152. For instance, a magnetic lift mechanism 352 may be coupled to the lid 328 (e.g., at a center near the axle 608a) to lift some or all of the weight of the flywheel 152, so the strength of the lid 328 is particularly beneficial. Depending on the implementation, the lid 328 may be constructed of one quarter to one half inch steel plate, or a thicker construction (e.g., as in the example of FIG. 3C), which may be flat, welded together, and/or have various bends to further increase rigidity. For instance, the top ring 418 and top ribs may include one or more longitudinal bends to increase their strength and the ability to mount components thereto.

The enclosure tub 326, as described in further detail below, may include one or more side walls that encircle the flywheel 152, which may be a continuous ring of material or bent metal (e.g., steel) or other plates that are welded together. The side walls 432 may provide vertical strength to the enclosure 304 while also mitigating mechanical failure of the flywheel 152. Side ribs 434 (e.g., steel plates welded to the side walls 432, such as the top ribs 524) may also be attached around the side wall 432, as illustrated, to provide further strength and avoid buckling inward or outward. The side ribs 434 and/or side walls 432 may be coupled (e.g., welded, glued, bolted, etc.) with a ring 430 to which a lid 328 may be bolted, as described below, and with a bottom plate 436 (which may have structures, such as bottom ribs 428, as described below).

For instance, a magnetic coupling 318 is shown in the example of FIG. 4A. The magnetic coupling 318 may couple the flywheel axle 608 (e.g., 608a) with an axle or rotor of the motor-generator 310. The magnetic coupling 318 may be supported by a motor mount base 406, top ring 418, or other components of the flywheel assembly 150 to hold it above an axle 608. The magnetic coupling 318 may include an external rotor bottom 410 and external rotor top 412, which may house an internal arrangement of magnets and/or bearings, etc., as described in further detail below. The magnetic coupling 318 may include an internal rotor top 414 with a rounded machine key 416 that interacts with a corresponding slot in an axle and/or rotor of the motor-generator 310 to improve the strength of the mechanical connection between these components. A similar structure may additionally or alternatively be used with an axle 608a. The magnetic coupling 318 is described in further detail below.

Figure 4B:
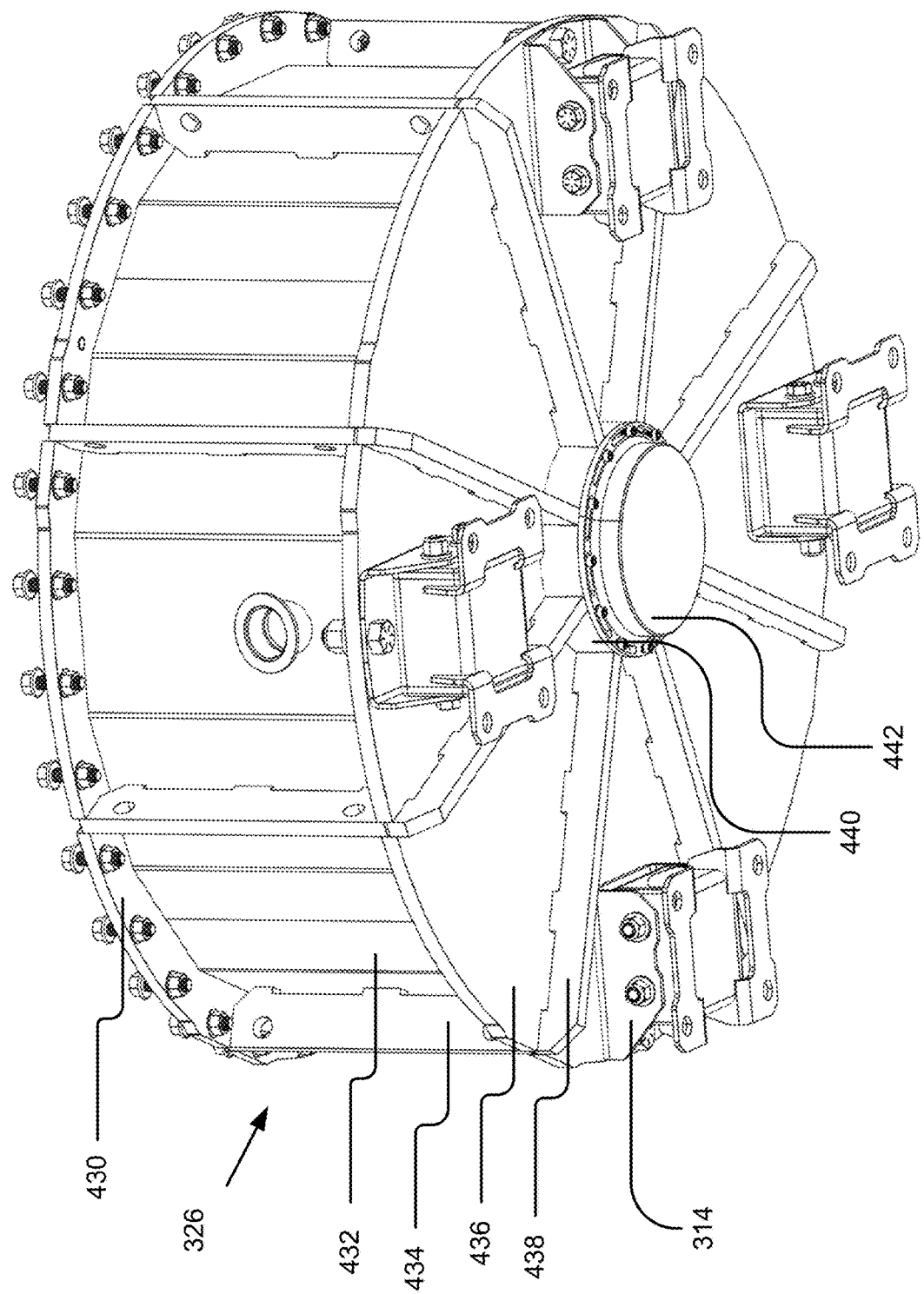
FIGS. 4B and 4C illustrate an example enclosure tub.

FIG. 4B illustrates an example enclosure tub 326 shown from the bottom. As illustrated, a lid 328 has been omitted while the bolts for the lid 328 are shown in place in a top ring 430. As described in further detail above, the enclosure tub 326 may include side wall(s) 432, side rib(s) 434, a bottom plate 436, bottom rib(s) 438, feet 314, and other components. For instance, a bottom reinforcement ring 440 may be located at a center of the bottom plate 436 and bottom ribs 438 may radiate outward therefrom in order to provide strength and rigidity. The ribs and other structure illustrated, as noted with the top 328, may provide support to the flywheel 152, for example, via bearings, magnetic lift, and/or axle(s) 608.

Four example feet 314 are illustrated coupled with the bottom plate 436 of the tub 326 in the example of FIG. 4B. The feet 314 may allow the flywheel assembly 150 to be bolted directly to an external structure and, in some instances, may allow some leveling of the enclosure. Example implementations of feet 314 are described in further detail below.

FIG. 4B also illustrates a retaining cap 442 that may couple with the enclosure tub 326 (e.g., by bolting it to a bottom reinforcement ring 440 or other structure) to allow various components, such as a bottom/lower bearing assembly of the flywheel 152 to be accessed. The retaining cap 442 may also include seals/O-rings that seal the vacuum of the enclosure 304. As described in further detail below, the bottom or lower bearing assembly may include one or more horizontal and/or vertical bearings, a shipment support area or ring 462, a bearing height adjustment mechanism (e.g., the nut bearing holder 464 described below), and adjustment locking mechanism.

Figure 4C:
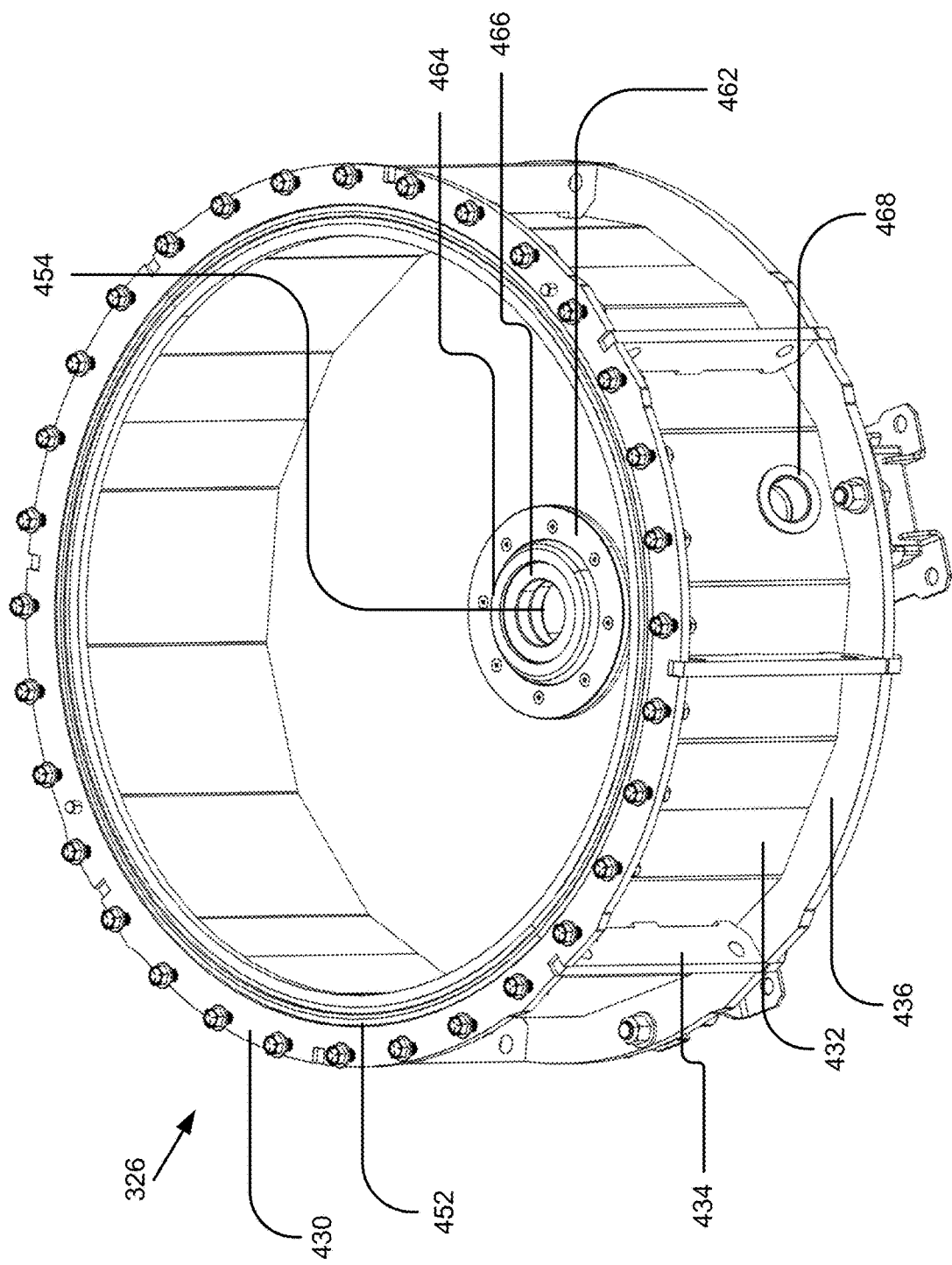

For example, FIG. 4B illustrates an example enclosure tub 326. As illustrated, in the example implementations, various configurations and constructions are possible. For instance, the enclosure 304 and its components may be made of plate metal (e.g., steel, aluminum, etc.) that is attached together to form the enclosure 304. For instance, the plate metal may be coupled or bent at various angles or continuously to create side walls 432, a bottom plate 436, top lid 328 (not shown in FIG. 4B), etc., and ribs (e.g., 434) positioned at a normal angle to the plates may be attached thereto to provide increased strength. The walls, ribs, top/bottom plates, and other components may be attached together using various techniques, such as welds, glue, or fasteners. For instance, where metal plates are used, they may be welded together to not only provide strength against an internal vacuum but also mitigate against mechanical failures of the flywheel 152. For example, a bottom plate 436 may be welded to a side wall 432 (which may comprise one or multiple coupled segments), which may be welded to a top ring 430, as shown in FIG. 4C. Side 434 and bottom ribs 438 may be welded to the walls, plates, and/or reinforcing rings, as illustrated in the examples.

Other implementations of an enclosure tub 326 or other components are described and illustrated elsewhere herein.

In some implementations, the top ring 430 (and/or the lid 328) may include grooves 452 for accepting one or more seals or O-rings, so that top ring 430 may be sealed against the lid 328, although other implementations are possible. In some instances, multiple (e.g., two) seals/O-rings may be used to provide redundancy.

In some implementations, a side wall 432 may include one or more holes or perforations through which the internal cavity may be accessed, such as for adjustment, sensors, for receiving a vacuum hose or fitting, or for other purposes. These perforations may be sealed using gaskets, caps, or other components during operation of the flywheel 152.

As illustrated in FIG. 4C, in some implementations, the enclosure tub 326 may include a hole 454 or perforation at a bottom center at which the bottom/lower bearing assembly may be located. For instance, the hole 454 in the bottom of the tub 326 may allow the flywheel 152 to be adjusted, mounted, or otherwise, as described elsewhere herein. It should be noted that in other implementations, such as where a solid bottom of the enclosure 304 supports bearings and/or other components of the flywheel 152, are possible. For instance, the enclosure may have a cylindrical shape, as illustrated herein, although other implementations are possible. Similarly, in some implementations, the flywheel 152 may be entirely supported by a lid 328 of the flywheel enclosure 304 and the bottom of the flywheel enclosure 304 may be solid.

FIG. 4C illustrates an example enclosure tub 326 with a shipping ring 462, nut bearing holder 464, and bearing(s) 466, which may be mounted at the hole or perforation in the bottom of the enclosure 304. As described in further detail below, one or more bearings 466 that support the flywheel 152 (e.g., via a bottom/lower axle 608b of the flywheel 152) may be held by a nut bearing holder 464, which may be vertically adjustable to move the bearings up or down. Accordingly, by adjusting the bearing holder 464, the flywheel 152 can be moved up or down to move it between a storage position and adjust it in the enclosure 304 to provide an appropriate amount of force on the top and/or bottom bearings 466.

For example, a shipping ring 462 may be located at the bottom of the enclosure tub 326, so that a portion of the bottom axle 608b (not shown in FIG. 4C) and/or bottom clamping plate 320b (e.g., a flat bottom portion thereof, as illustrated in other figures herein) may rest thereon when in a shipping position. For instance, when a nut bearing holder 464 is adjusted into a shipping position (e.g., completely downwards), a bottom bearing 466 and/or top bearing may be fully disengaged (e.g., vertically) from the flywheel 152 to avoid damage to the bearings during shipping, for example, where the weight of the flywheel 152 is supported on the shipping ring 462. As described in further detail below, the bottom bearing 466/bearing holder 464 may be adjusted to move the flywheel 152 (e.g., vertically upward) to engage a top and/or bottom bearing. Additionally, or alternatively (e.g., where a top bearing has a variable position), the flywheel 152 position may be adjusted to vary a distance to a magnet of the magnetic lift member 352 using the nut bearing holder 464, for instance.

In some implementations, the nut bearing holder 464 may be un-adjustable, fixed, or omitted (e.g., replaced by another bearing holder). Additionally, or alternatively, a shipping ring 462 may be omitted or may be removable. For instance, a shipping ring 462 or other structure may be installed during assembly and then removed during installation, for example, as a flywheel 152 is manually adjusted by an installer.

FIG. 4C also illustrates an angled flange 468 in a side wall 432 of the enclosure 304, which may allow access to an internal cavity, such as by a sensor, vacuum assembly 308, or other components of the flywheel assembly 150.

In some implementations, a nut bearing holder 464 may be positioned within the base ring 440 and shipping ring 462/bolt plate may move upwards and downward therein in order to move the bearing(s) 466. The bearings 466 may move upward and/or downward with the nut bearing holder 464, for example, to lift or lower the lower/bottom axle 608b and change the position of the flywheel 152, as described above. A bottom axle 608b of the flywheel 152 may extend into the nut bearing holder 464 to interact with the bearings 466 held thereby.

FIG. 4C illustrates an example enclosure tub 326 with a shipping ring 462 and bearing(s) 466, which may be mounted at the hole or perforation in the bottom of the enclosure 304. In the depicted example, a nut bearing holder 464 may be omitted or permanent, for example, where it is not adjustable, although other implementations or combinations are possible. In some implementations (e.g., as in FIG. 3C, a side wall 432 may be a circular wall, for example, with or without ribs. For instance, a thicker side wall 432 may be continuous or a strip welded at the ends to form the side wall 432. The tub 326 may include a bottom plate 436 welded or integrated with the side wall 432.

Figure 5A:
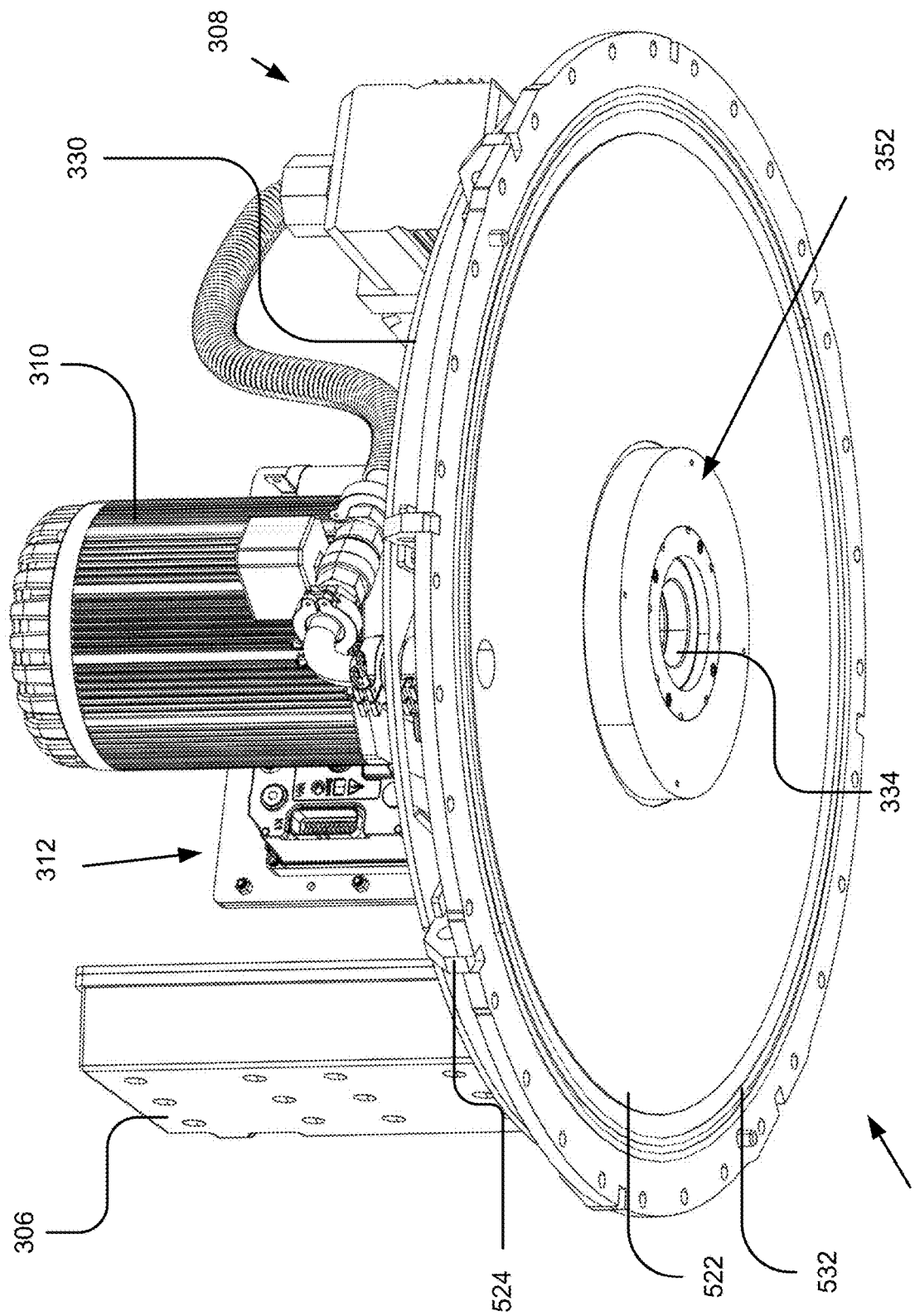
FIG. 5A illustrates an example enclosure lid with various components attached thereto.

FIG. 5A illustrates an example enclosure lid 328 with various components attached thereto. For instance, the enclosure lid 328 may be placed onto an enclosure tub 326 (not shown in FIG. 5A) to form an enclosure 304, which may be vacuum sealed, depending on the implementation. As illustrated in the example, a lid 328 may include a top plate 522 with reinforcing top ribs 524 that extend radially from an axle 608a (e.g., from a top reinforcing ring 418) to an outer edge of the plate 522. In some instances, the top ribs 524 may extend beyond the top plate 522 or into cuts in the top plate 522. For example, the top rib(s) 524 may extend partially (e.g., at an end) into slots formed in the top plate 522 to further enhance rigidity and case manufacturability.

Other configurations of a lid 328 are also possible, such as the example implementation of FIG. 3C. For example, a lid 328 may not have reinforcing ribs mounting plates (e.g., 330) or other components, such as where the top plate 522 is thick enough to support the flywheel 152, a magnetic lift component 352, or other component. In some instances, the top plate 522 may include a recess or other area to accommodate, receive, or couple with the magnetic lift member 352.

The lid 328 may also include O-rings, O-ring grooves/channels 532, or other seal locations around a periphery of the top plate 522, center perforation (e.g., in association with a top bearing assembly or other components), and other features for sealing the enclosure 304 when the lid 328 is attached to the enclosure tub 326 (e.g., by bolts around the peripheral edge). In some instances, the lid 328 or other components may include a hole, seal, valve, etc., through which a vacuum assembly 308 may be attached in order to actively establish or maintain a vacuum. For example, as noted above, a vacuum assembly 308 may be mounted to a lid 328 assembly mounting plate 330 or otherwise, depending on the implementation.

In some implementations, the lid 328 may also include a motor 310 mounted thereto, along with other components, such as a driver, controller/CPU 312, supercapacitor 306, etc. As these and other components may be previously assembled on the lid 328 and then placed onto the enclosure tub 326 (e.g., where a flywheel 152 is already positioned in the tub 326), which may improve the speed and case of assembly.

In some implementations, the lid 328 may include a perforation at an axis of rotation of the flywheel for receiving a top axle 608a of the flywheel 152, although other implementations are possible, such as where a top axle 608a interacts with a magnetic coupling 318 integrated or coupled with the lid 328. For instance, the magnetic coupling 318 may be sealed and/or placed at a center of the lid 328 and may interact with the top clamping plate 320a to provide interaction between the flywheel 152 and the motor 310.

In some implementations, the axle 608a may pass through the perforation, which may include or be coupled with one or more bearing(s) 334 that support the axle 608a horizontally and/or vertically (e.g., holding the flywheel downward from contacting magnets in the magnetic lift member 352). One or more magnets, such as in a magnetic lift assist member/mechanism 352 may be attached to the lid 328.

A magnetic lift member 352 may extend downward from the bearing(s) 334 or other components to bring it into proximity with the top clamping plate 320a and/or stacking plates 322 of the flywheel 152, which may increase the efficiency of the magnets. Although the magnetic lift member 352 is illustrated as being a continuous ring, multiple individual magnets may be included (e.g., in a balanced manner) around the axis of rotation of the flywheel 152 (e.g., inside a housing of the magnetic lift member 352). In some implementations, the height of the magnetic lift member 352 and/or its magnets may be adjustable by tightening or loosening bolts coupling the magnetic lift member 352 to the lid 328, for example, from underneath the lid 328 or on top of the lid 328 (e.g., when the lid 328 is on top of the enclosure tub 326). Accordingly, a position (and, by extension, strength) of the magnets may be adjustable to further balance the system and force on the bearings 334.

Figure 5B:
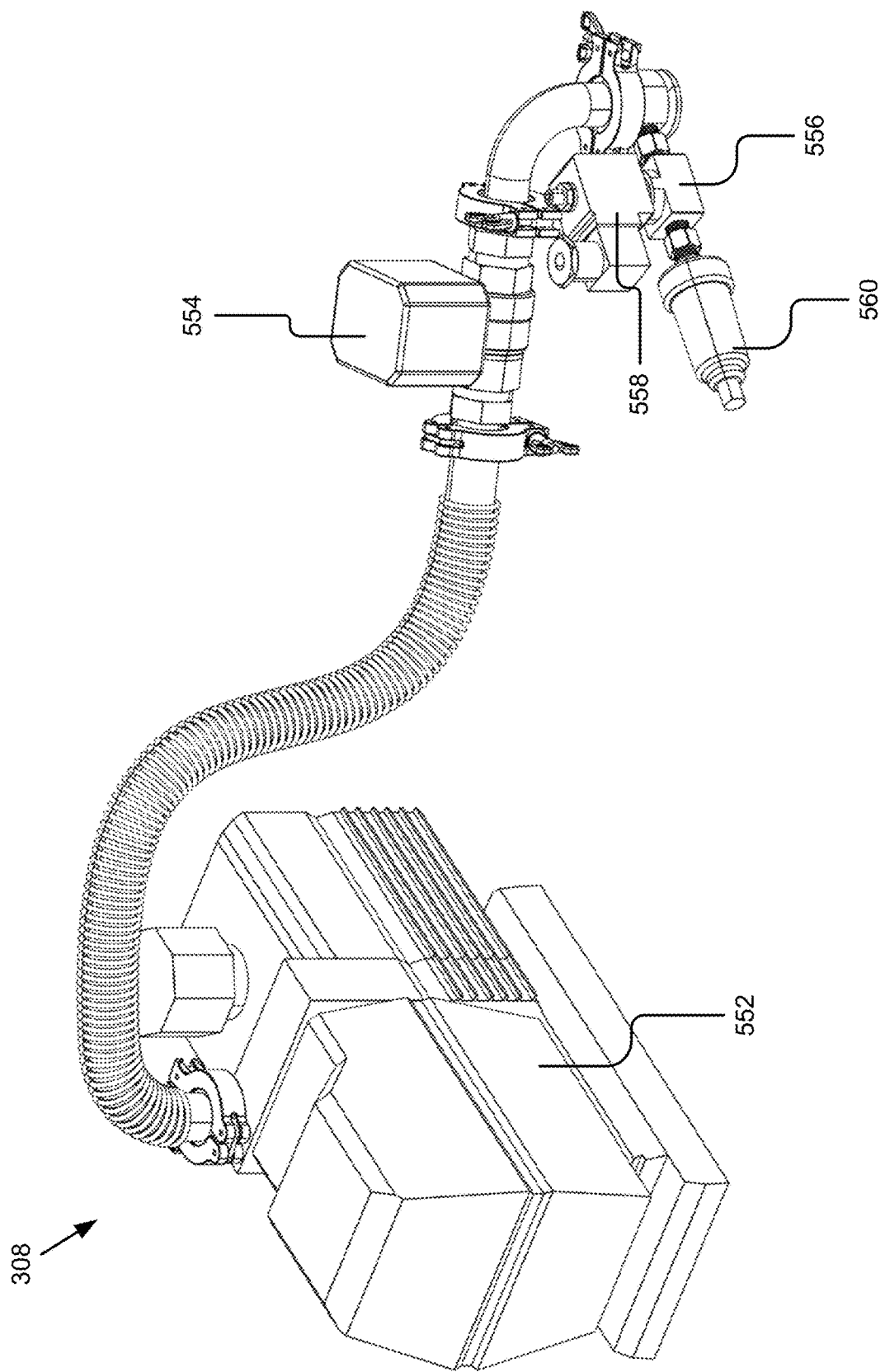
FIG. 5B illustrates an example vacuum assembly.

FIG. 5B illustrates an example vacuum assembly 308 that may actively maintain or initially established a vacuum in the enclosure 304 (e.g., via a perforation in the lid 328 or tub 326). The vacuum assembly 308 may be mounted to the enclosure 304, as illustrated in FIG. 3A, and it may be triggered using a pressure sensor that senses pressure inside the enclosure 304. The vacuum assembly 308 may include a vacuum pump 552 that is powered by the flywheel 152 itself, supercapacitor 306, a chemical battery, or grid power. The vacuum pump 552 may be coupled with a motorized on/off valve 554 that opens or closes the vacuum to avoid leakage, a solenoid valve 556 and solenoid valve coil housing 558 that may allow air to enter the enclosure 304, desiccant filter 560 that prevents dust or debris from entering the enclosure 304 while also reducing buildup of moisture (e.g., due to the operation of the vacuum pump 552), and other components that maintain the vacuum and limit humidity in the system.

The vacuum assembly 308 may include additional, fewer, or different components. It may be used to reduce a pressure and therefore an air resistance of a spinning flywheel 152. In some implementations, when a technician is performing maintenance or repairs on the flywheel assembly 150, the vacuum may be released (e.g., where air enters the enclosure 304 through a filter) to allow the maintenance to be performed. In some implementations, the vacuum pump 552 may create a positive pressure inside the flywheel enclosure 304. By providing a positive pressure, dust or other debris may be prevented from entering the enclosure 304, for example, because it may be difficult to clean out.

FIGS. 6A-6G illustrate an example flywheel 152 and various components, views, and constructions thereof. There are a number of innovative features in the flywheel 152. For example, the flywheel 152 may include flywheel plates that are coupled together using friction, which may be performed in addition to or in lieu of other connections, such as adhesive, welding, or otherwise. Some implementations of the flywheel 152 include bolts through components while others do not include bolts through components. Similarly, some implementations of the flywheel 152 include two separate axles 608-a top axle 608a and a bottom axle 608b. For instance, while previous flywheels 152 may include bolts attaching each of their components together, some implementations of the flywheel 152 herein may separate the axle 608 and/or use a clamping force from clamping plates 320 (and/or axles 608) to increase friction between the stacking plates 322 themselves, which may improve manufacturing and reduce points of failure when the flywheel 152 is spinning at high speeds.

In some implementations, clamping plates 320 may be used on the top and bottom of the flywheel 152 to support the flywheel 152, for example, by coupling the stacking flywheel plates together and/or to axles 608. A top clamping plate 320a and a bottom clamping plate 320b may be drawn together by bolts at or near its peripheral edge, which applies pressure inward on the stacking plates 322 in an axial direction thereby increasing friction. The friction allows rotational force to be transferred through the stacking plates 322 while also preventing them from moving out of alignment, which may throw the balance of the flywheel 152 off.

Depending on the implementation, the clamping force from the clamping plates 320 may be applied to the stacking plates 322 directly (e.g., by direct contact between the clamping plates 320 or stacking plates 322) or via other components, such as a portion of an axle 608 or other contact points. For example, a clamping plate 320 may apply force to a center of the stacking plates 322 via a top and bottom axle 608b (and/or washer(s), bushings at a peripheral edge, or otherwise).

In some implementations, the clamping plates 320 may be less massive than the stacking plates 322, so each type of plate may expand (and, potentially, become thinner) differently, especially at the peripheral edge. Accordingly, in some instances, bushings or other components may allow the stacking plates 322 to move relative to the clamping plates 320 while the clamping force is continuously applied.

The clamping plates 320 may have various contours and configurations to allow them to provide clamping force and other functionality. In some implementations, the stacking plates 322 may be configured differently from the clamping plates 320 and their function is primarily to add rotational mass to the flywheel 152 in order to store energy. The stacking plates 322 may be massive plates that are substantially round or may include various contours based on interaction with the clamping plates 320 or an assembly fixture, as described in further detail elsewhere herein.

Figure 6A:
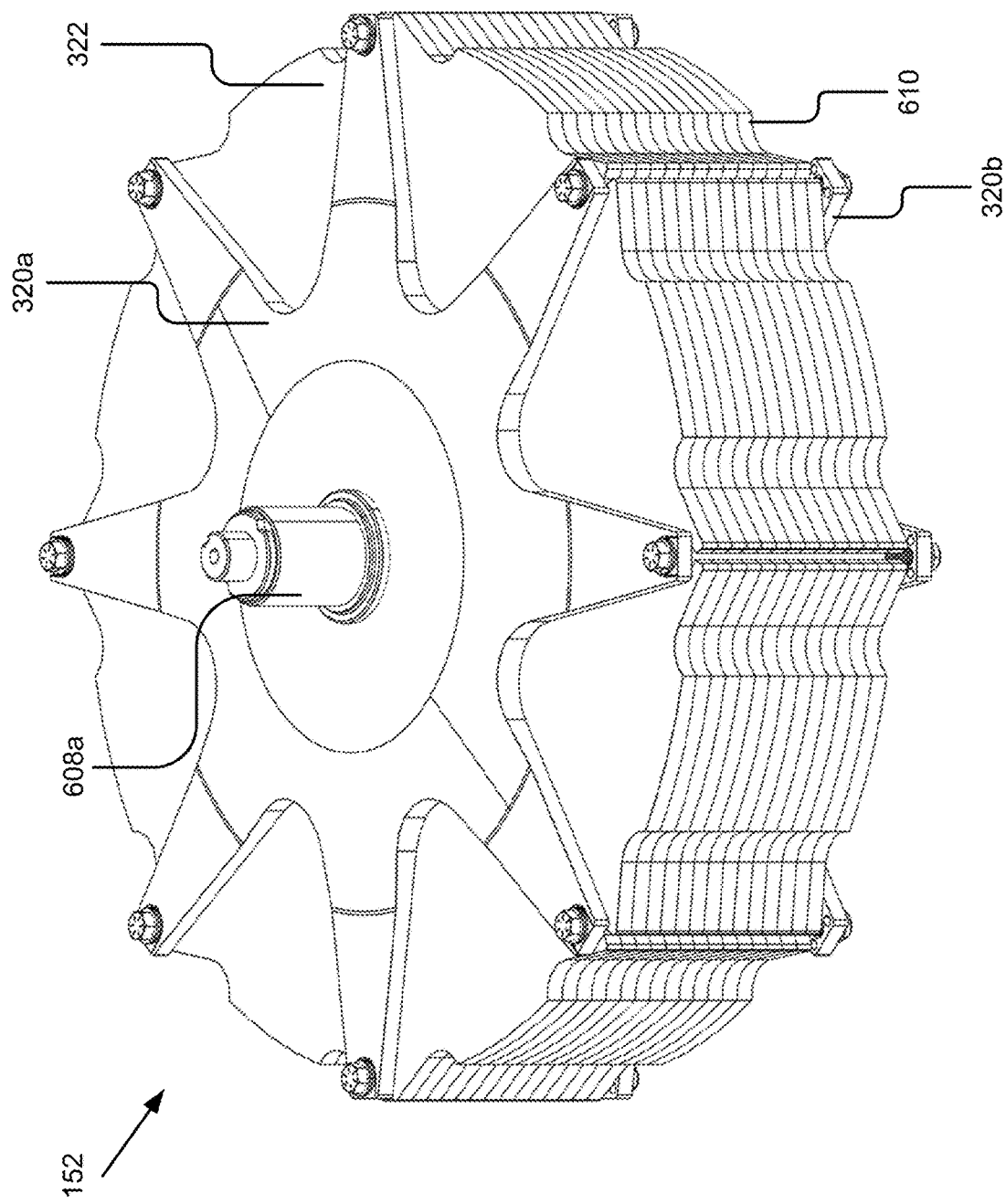
FIGS. 6A-6E illustrate various example flywheels and views thereof.
Figure 6B:
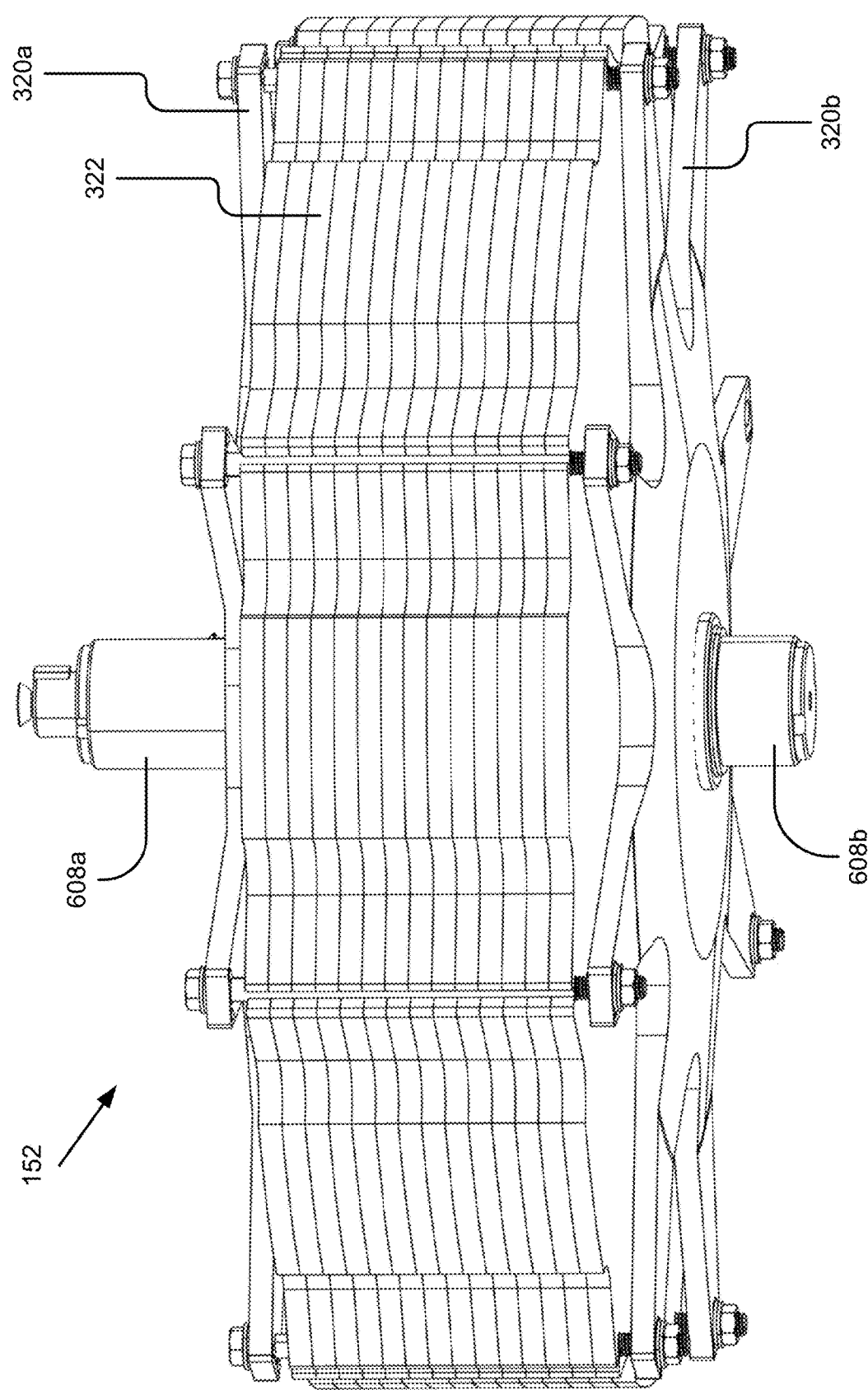

FIG. 6A illustrates a side-top view of the example flywheel 152 and FIG. 6B illustrates a side-bottom view of the example flywheel 152. As illustrated, the stacking plates 322 may be continuously stacked with their faces touching each other to minimize space consumed and flex while increasing friction. Fourteen stacking plates 322 are illustrated, although other implementations are possible and contemplated herein. As illustrated, there may be a space between one or both of the clamping plates 320 and the stacking plates 322. Although this space is illustrated as being relatively large and uniform, it may be smaller. For instance, there may be only a few millimeters between the bottom clamping plate 320b and the bottom-most stacking plate 322, which space may vary based on clamping force applied and flex of the clamping plate 320.

As illustrated in the example flywheel 152 of FIG. 6B, a bottom axle 608b may be coupled with a bottom clamping plate 320b. The bottom clamping plate 320b then interacts with a bottom flywheel stacking plate 322 (e.g., via bushings, an axle washer, a portion of the axle 608, etc.). Various quantities of stacking flywheel plates may be stacked together depending on desired energy capacity, as noted elsewhere herein. Similarly, a top clamping plate 320a may interact with a top-most flywheel stacking plate 322 (e.g., via bushings, axle washer, etc.). The top clamping plate 320a may be coupled with a top axle 608a. In other implementations, a bottom face of the top clamping plate 320a may rest directly against the top face of the top-most stacking plate 322.

In some implementations, each of the stacking plates 322 may be identical, and each of the clamping plates 320 may be identical, although other implementations (e.g., sizes, configurations, etc.) are possible and contemplated, as noted below. Similarly, the top and bottom axle 608b may be the same or different (e.g., having a different length, interacting with different bearings or configurations, as illustrated herein.

As illustrated, when assembled, the clamping plates 320 of the flywheel 152 may align with the stacking plates 322. In some implementations, a clamping plate 320 may have a star shape (e.g., as illustrated in FIGS. 6A and 6B) where the tip of each arm or branch of the clamping plate 320 has a bolt hole that receives a bolt for clamping the clamping plates 320 together. In some implementations, a clamping plate 320 may have another shape (e.g., as illustrated in FIGS. 6D and 6E) including one or more perforations proximate to a peripheral edge.

Similarly, the configuration of the stacking plates 322 may be based on the shape (e.g., the position and quantity of branches of the clamping plate 320), as described in further detail below. For instance, bolt points of the stacking plates 322 may correspond to bolt points of the clamping plates 320 whether or not, as illustrated in the example of FIGS. 6A-6C, the stacking plates 322 do not contact the bolts.

Although not visible in FIGS. 6A and 6B, in some implementations, various mechanisms may be used at the axle-to-clamping-plate interface to keep the axle 608 and clamping plate 320 mechanically connected, so that rotational force may be transferred between them. For instance, the hole in the clamping plate 320 that accepts a portion of the axle 608 may have an oval shape or a flat area (e.g., to be shaped like a D, whether the flat area is large or small), which may prevent them from twisting relative to one another. For instance, a small flat area is provided or there is an oval shape at the interface, stress risers may be reduced in the plates, which may be particularly beneficial at higher rotations per minute. For example, in some implementations, rather than being bolted through or having a square or other shape with large protrusions, which may increase stress in the flywheel 152, especially where the flywheel 152 is massive or spinning at a high rate, the clamping plate 320 to axle 608 interface may be shaped to induce very little stress into the axle 608 or clamping plate 320 while allowing torque to be transferred.

Figure 6C:
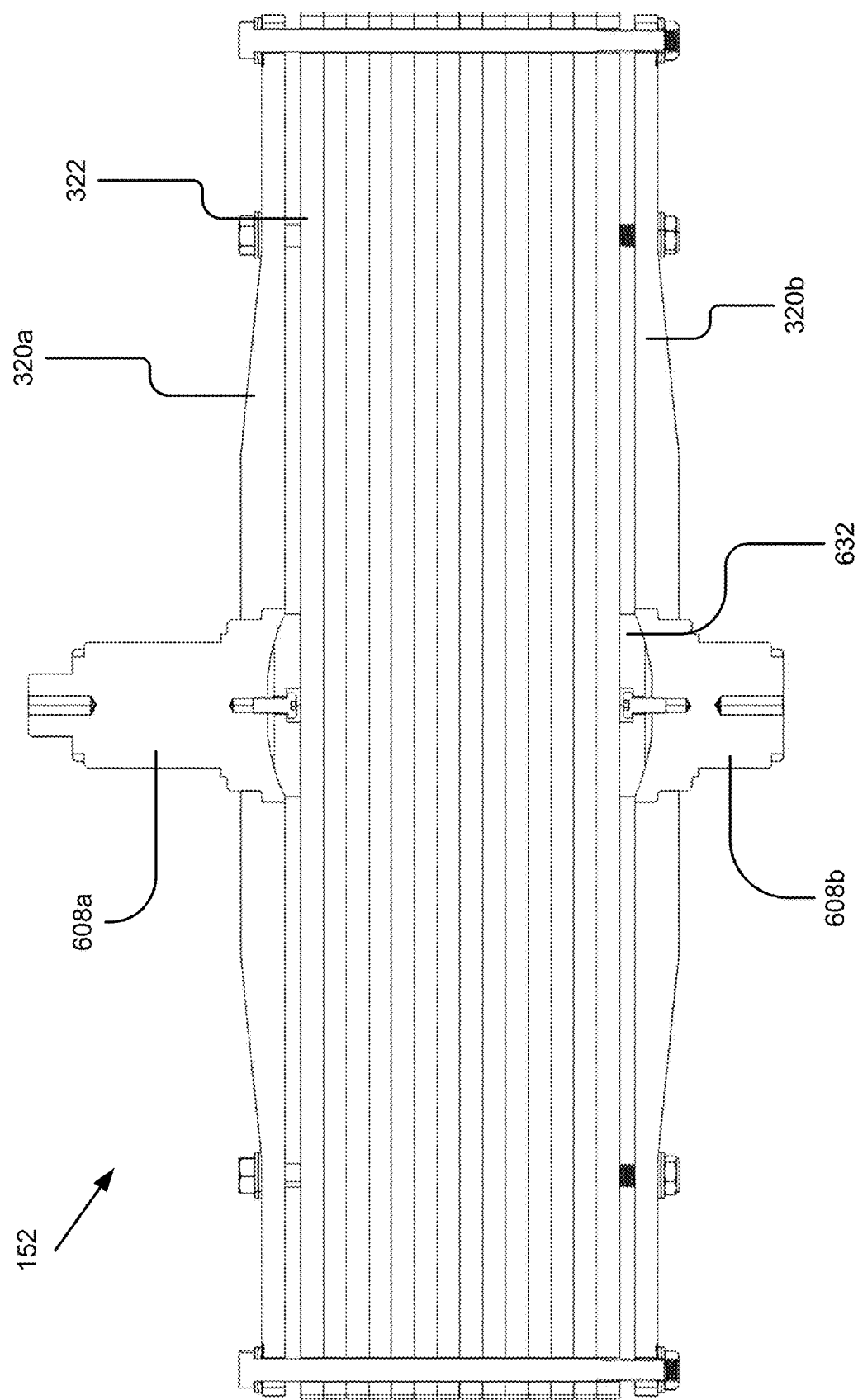
Figure 6D:
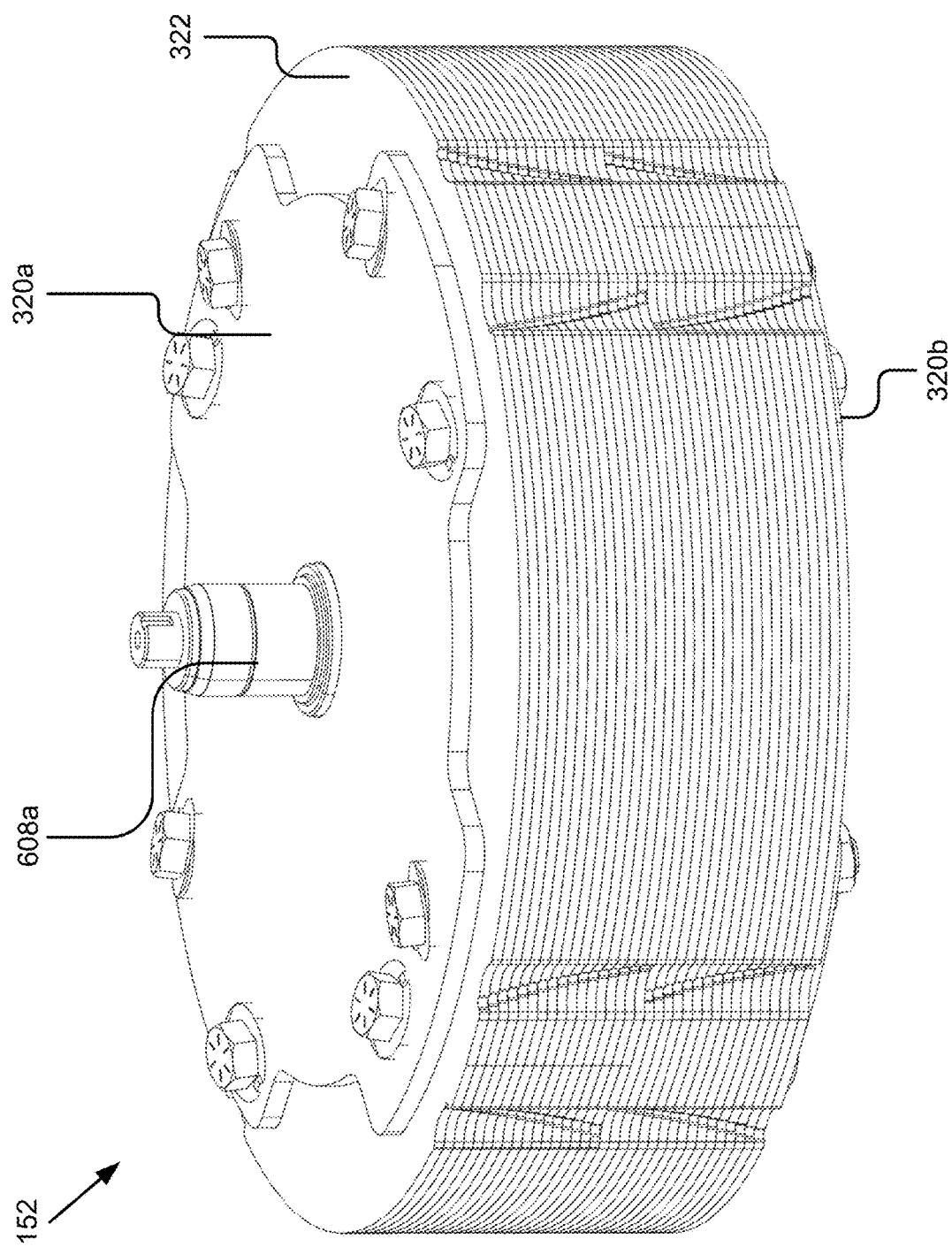
Figure 6E:
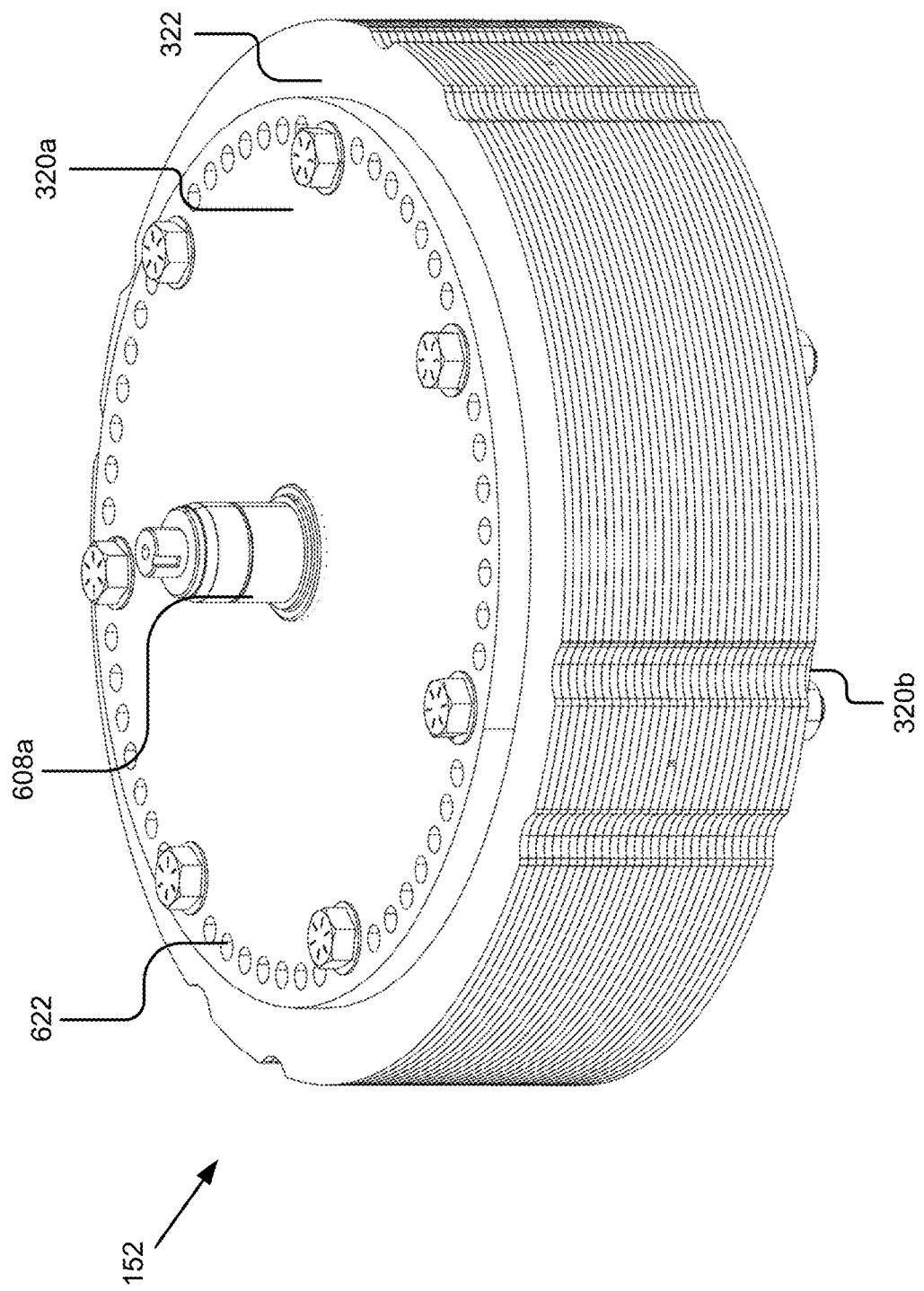

FIG. 6C illustrates a cross sectional view of an example multi-part flywheel 152. As illustrated in the example implementation, a top clamping plate 320*a* may be connected with a top axle 608*a*. For instance, a top axle 608*a* may pass through the top clamping plate 320*a* so that the top clamping plate 320*a* may apply downward force on the axle 608. In some implementations, the axle 608 may include multiple parts, such as an axle 608 portion and a washer (e.g., an axle ball washer 632), where the washer (or a bottom portion of the top axle 608*a*) contacts a top-most stacking plate 322. Accordingly, via the axle 608, the top clamping plate 320*a* may apply force to the stacking plate(s) 322. It should be noted that other configurations, such as direct contact or contact through another device are possible without departing from the scope of this disclosure. Accordingly, the clamping plate 320 may apply pressure at a center of the stacking plate(s) 322 via the washer and/or axle 608.

Similar to the description of the top axle 608*a* above, a bottom axle 608*b* may be coupled to a bottom clamping plate 320*b* and may apply force to a bottom-most stacking plate 322. It should be noted that other configurations are possible, such as where the contact is direct, where the axles 608 are integrated with the clamping plates 320, where the axles 608 are integrated with one or more stacking plates 322, or otherwise.

Additionally, force may be applied to a periphery (e.g., in an axial direction) or other area of the stacking plate(s) 322. For example, bolts may be tightened down on the clamping plate(s) 320, which apply force to an outer edge of the stacking plates 322. The force may be applied via direct contact between the clamping plates 320 and the stacking plates 322 or via an intermediary device, such as a bushing or washer. In some instances, the clamping plates 320 may flex between the axle(s) 608 and the bolt(s) to provide the pressure. Accordingly, friction can be increased between the stacking plates 322. In some implementations, the stacking plates 322 may be simple, solid plates rather than having perforations for fasteners in the plates, which may reduce strength and introduce stress risers due to centrifugal force, which may lead to increased complexity and failure modes. In other implementations, the stacking plates 322 may have perforations through which bolts may pass, which may increase a radius of the plates, provide simplicity in manufacturing, or increase an inter-plate (e.g., due to friction) force.

As described below, the bolts may be tensioned to varying levels of tension to cause the friction force. Although different configurations are possible and contemplated, the flywheel 152 may include 8 bolts located around or proximate to a peripheral edge. Each bolt may be tightened to provide a defined torque or based on an applied force before the bolts are torqued (e.g., to apply a force of 2600 pounds per bolt), which may cumulatively provide a relatively even clamping and friction force across the stacking plates 322 (e.g., 16,000-21,000 pounds of clamping force).

In addition to their roles in clamping together the clamping plates 320, the bolts may include other features, such as the ability to mitigate failure of one or more stacking plates 322 (e.g., by catching a stacking plate 322 or portion thereof that slips or breaks). In some instances, the bolts may be replaced with other bolts of varying weights to assist in balancing the flywheel 152. Other details and implementations are possible and/or described elsewhere herein.

It should also be noted that the top axle 608*a* and the bottom axle 608*b* should be aligned as perfectly as possible to reduce vibrations and improve alignment with bearings, etc. An assembly fixture and assembly procedure may be used to align the axles 608. Although other implementations are possible, ball washers may be used with the axles 608 to allow some adjustability during assembly to improve alignment. It should be noted that flat washers or no washers (e.g., the axles 608 may be single components instead of broken into an axle body and axle washer) may be used.

In some implementations, an axle-connection region of a clamping plate 320 may connect to an axle 608 in order to transfer force between the clamping plate 320 and the axle 608. The connection may include a step that allows the clamping plate 320 to apply clamping force on the axle 608 (e.g., on a corresponding lip or step thereof), although the axle 608 may be integrated with the clamping plate 320 or the force may simply be applied onto the axle 608 by a bottom edge of the clamping plate 320 (e.g., where no step is included in the implementation). For instance, the axle-connection region of a clamping plate 320 may include a perforation in the clamping plate 320 through which the axle 608, or a portion thereof, may pass. For example, an axle washer may be coupled with the axle 608 at the step, or a portion of the axle 608 itself may interact with the step.

In some implementations, the axle 608 connection may include various shapes to the pass through that interact with corresponding shapes of the axle 608. The perforation or a portion thereof may be oval shaped or have a flat or "D" shaped area, key, or other shape that allows torque to be transferred between the stacking plate 322 and the axle 608 (e.g., in addition to the torque that may be applied to the axle 608 by its contact with the top/bottom-most stacking plate 322) without significantly increasing material stress at the connection point. In some implementations, this shape may be applied to the entirety of the perforation or only to a portion or step thereof (e.g., as in the illustrated step). This shape may be small, such as a $\frac{1}{8}^{th}$ inch deviation in diameter or a flat section.

Although other implementations are possible, the axle 608 and perforation diameter may be 3-5 inches. For example, a first (e.g., illustrated at a top of the figure) perforation/axle 608 diameter may be 3.75 inches. A second (e.g., illustrated downward from the first) perforation (e.g., step in the perforation)/axle 608 diameter may be 4.25 inches to allow force to be applied from the first diameter onto the axle 608 and then onto the stacking plates 322. In implementations where the second step/perforation/axle 608 portion are oval shaped, the oval may vary from 4.375 inches to 4.250 inches, for example, although other implementations are possible and contemplated herein.

The top axle 608*a* may couple with and/or extend through a top clamping plate 320*a* and a bottom axle 608*b* may couple with and/or extend through a bottom clamping plate

320*b*. As a clamping plate 320 may induce friction and transfer force to/from the stacking plates 322. Accordingly, the clamping plates 320 may be designed to apply axial force to the plates without having high stress areas at the periphery where the clamping plates 320 may fail at high speeds. Accordingly, the clamping pressure may be increased and risk due to structural/material failure decreased. Example configurations of the clamping plates 320 are described elsewhere herein.

Additionally, the clamping plate(s) 320 may include a connection area for coupling with the axle(s) 608, which allows the rotational force to be transferred between the plates and the axles 608. For instance, an axle 608 may extend through a clamping plate 320 and have or more shapes or structures that allow rotational, as well as clamping force, to be applied onto the staking plates (e.g., via the axle 608). In some implementations, the axles 608 may have portions, washers, or ball washers that extend beyond an inner edge of the stacking plate 322 to apply force the stacking plates 322. Although the washers are illustrated as being approximately the size of the passthrough in the clamping plates 320, it should be noted that they may be omitted, combined with the axle body, be smaller radius than the passthrough, or be larger than the pass through (e.g., to apply force to the staking plates over a larger area).

As the axles 608 or axle washers contact the stacking plates 322, the application of clamping force by the bolts may cause the arms of the bend slightly and increase the force at the center that is applied by the axles 608/axle washers. The thickness of the axle washer (or similar component) and the configuration of the clamping arms may be such that the distance between the ends of the arms (e.g., to the stacking plates 322) may be minimized when the plates are clamped. In some implementations, in addition or alternative to the clamping force at the center of the stacking plates 322, the clamping plates 320 may apply clamping force along a peripheral edge of the stacking plates 322.

The clamping plates 320 may be constructed from aluminum, steel, or another material. For instance, the plates may be constructed from a ferromagnetic steel (e.g., AR500 steel plate) and may be stamped, formed, or machined into the desired shapes. Example masses of the clamping plates 320 may be 66-68 pounds when constructed from steel, although other implementations are possible.

FIG. 6D illustrates a side-top view of another example flywheel 152, according to some implementations. In the example of FIG. 6D, the shape of the clamping plates 320 has an X shape with two bolt holes proximate to the radial edge of each arm thereof. In the depicted example, the bolts may be angled as they pass from the top clamping plate 320*a*, through the stacking plates 322, and to the bottom clamping plate 320*b*. By angling the bolts, rotational forces across the clamping plates 320, stacking plates 322, and axles 608 may be reinforced, which reduces the odds that the plates will move out of alignment when the flywheel 152 is spun up or down though the axle(s) 608.

In the depicted example, the bolts may be angled toward each other or away from each other on alternating clamping plate arms, which improves uniformity of force (e.g., circumferentially and axially) and rotational balance. For instance, in a first arm, the bolts are angled away from each other at the top plate, while, at a second arm 90 degrees from the first arm, the bolts are angled toward each other at the top plate, which pattern may repeat, as illustrated. Where the top clamping plate 320*a* and the bottom clamping plate 320*b* are the same, they may be rotated 90 degrees, so that the holes on each match the angles of the bolts. For example, a bolt may be perpendicular to a radial direction of the flywheel 152 and angled around the periphery, for example, at an angle to the axial direction of the flywheel 152.

In the depicted example of FIG. 6D, the bolts extend through the top and bottom clamping plates 320*b* and through perforations in the stacking plates 322. In the example implementation where the bolts are angled, the bolts may use wedge shaped washers that allow the force from the bolts to be applied to the clamping plates 320. In some implementations whether with angled or straight (e.g., axial) bolts, the bolts and associated nuts may be tapered to allow them to extend partially into countersunk holes in the clamping plate(s) 320.

In the depicted example of FIG. 6D, the top clamping plate 320*a* (and potentially the bottom clamping plate 320*b*) may be substantially flat on its top (partially as in 6A or fully as in 6D) and bottom surfaces, which allows the it to contact the stacking plates 322 and/or interact with a magnetic lifting component 352. For example, a very flat top surface of the top clamping plate 320*a* that interacts with a magnetic lifting component may reduce eddy currents in the top clamping plates 320*a* caused by rotation relative to the magnetic lifting member 352.

FIG. 6E illustrates a side-top view of another example flywheel 152, according to some implementations. In the depicted example, the bolts extend axially through perforations 622 in the top clamping plate 320*a*, the stacking plates 322, and the bottom clamping plate 320*b*. Depending on the implementation, the stacking plates 322 may have an equal quantity of perforations 622 as the quantity of bolts clamping the clamping plates 320, the clamping plate(s) 320 may include additional perforations 622 proximate to their peripheral edge(s). These additional perforations 622 may be used in balancing the flywheel 152, for instance, by drilling out the holes 622 or adding plugs to the holes. As noted elsewhere herein, there may be a space between one or both of the clamping plates 320 and the stacking plates 322. For instance, the top clamping plate 320*a* and top stacking plate 322 may lack a space (e.g., as at 442), which may prevent the top clamping plate 320*a* from flexing, thereby improving its flatness and interaction with a magnetic lift member. In some implementations, there may be a small gap/space between the bottom clamping plate 320*b* and a bottom-most stacking plate 322, which allows some flex in clamping (e.g., to increase a force at the center/axles 608). For instance, a portion of the bottom axle 608*b* and/or an axle washer (whether a ball washer or flat) may be used to provide a space between a center of the bottom clamping plate 320*b* and the bottom-most stacking plate 322.

In some implementations, the stacking plates 322 may include contours or scallops 610 around a peripheral edge, which may reduce failure points due to radial stress around bolt holes and/or assist with aligning the plates. For instance, a scallop 610 may be a scalloped shape or contour removed or omitted from a peripheral edge of a stacking plate 322.

The clamping plates 320 may be constructed from aluminum, steel, or another material. For instance, the plates 320 may be constructed from a ferromagnetic steel (e.g., AR500 steel plate) and may be stamped, formed, or machined into the desired shapes. Example masses of the clamping plates 320 may be 66-68 pounds when constructed from steel, although other implementations are possible.

Figure 6F:
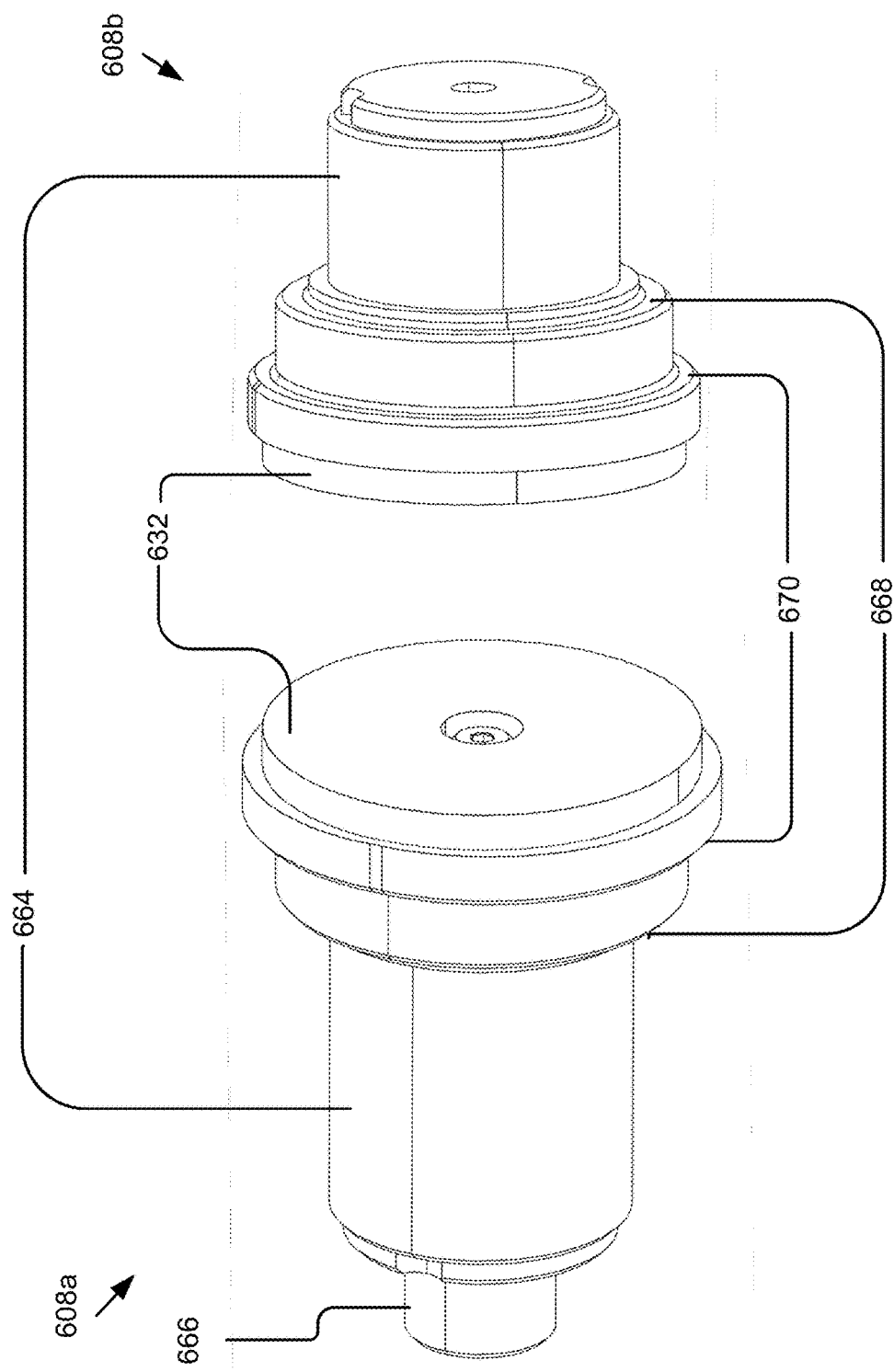
FIG. 6F illustrates example flywheel axles.

FIG. 6F illustrates example flywheel axles 608*a* and 608*b*. Although other sizes and configurations are possible, FIG. 6F illustrates a top and bottom axle 608*b* with axle washers 632 (e.g., ball washers). Depending on the implementation, the top and bottom axles 608*b* may be identical or have variations, such as their length, whether or not they include washers or axle washers 632, whether they include a motor connection 666. Some features of the axle 608 are described in reference to a single one of the top and bottom axle 608b, but they may be present on both or the other axle 608.

Depending on the implementation, an axle 608 may include a smooth shaft 664 (e.g., a 50-70 mm diameter shaft 664) portion that interacts horizontally with one or more bearings to keep the flywheel 152 aligned. The shaft 664 may contact one or more seals to maintain the vacuum and may be polished to avoid friction with the seals.

An axle 608 may include one or more bearing shelf (ves)/step(s) 668 that interact with bearings to provide vertical support to the flywheel 152 (e.g., to lift, lower, or hold it vertically).

In some implementations, an axle 608 may include one or more clamping shelf (ves)/step(s) 670 that interact with a clamping plate 320. For instance, the clamping step 670 could be a wider area than the shaft 664 so that the clamping plate 320 applies pressure on the clamping step 670 to hold the axle 608. In some implementations, the axle 608 extends beyond the clamping step 670 and flywheel step 668, so that the axle 608 applies pressure to a stacking plate 322, as noted above. The contact with a stacking plate 322 may be via a washer, such as an axle washer 632 (which may be a flat or ball washer). The clamping step 670 may interact with an edge or corresponding step(s) on a clamping plate 320.

In some implementations, the clamping step 670, an axle washer 632, or another part of the axle 608 may be shaped to interact with a corresponding shape or structure in a clamping plate 320. For instance, it may include a flat side, oval shape, protrusion, waves or ridges, teeth, or other structure that allows torque to be transferred between the axle 608 and the clamping plate 320 and/or stacking plates 322 (e.g., where a top or bottom stacking plate 322 includes a shape to match this structure). For example, as noted in further detail above, an oval or small flat side may be used to avoid stress risers in the material (e.g., of the clamping plate 320).

In some implementations, one or both of the axles 608 may include a motor connection 666 that may be a portion or extension of the shaft 664. The motor connection 666 may include a flat, oval, D-shaped, or other structure/shape (e.g., a key or slot) that allows torque to be transferred between the axle 608 and another structure, such as a motor-generator 310 (e.g., via a magnetic coupling 318, as described elsewhere herein). The motor connection 666 may additionally or alternatively include keys or other protrusions that improve the connection between the axle 608 and another structure (e.g., the magnetic coupling 318, motor-generator 310, etc.).

Although a ball washer (at 632) is illustrated on both the top and bottom axle 608a and 608b in FIG. 6F, other implementations are possible and contemplated. For example, a ball washer may be used to provide a small amount of adjustability to the axle 608 alignment when top axle 608a, bottom axle 608b, stacking plates 322, and clamping plates 320 are aligned. As illustrated in the example, two axles 608 may be used where the axles 608 are physically disconnected from each other. One or both of the axles 608a and 608b may lack a washer, may have a flat washer, and/or may have a ball washer.

In some implementations, a ball washer may be flat on its bottom where it contacts a stacking plate 322 while it is rounded on a top where it contacts a corresponding curve in the axle body. Accordingly, the position of the axles 608 could be shifted slightly during assembly to allow the axles 608 to be positioned. As illustrated, in some implementations, a bolt may couple the axle washer 632 to the axle body in order to hold it in place during assembly.

It should be noted that, in some implementations, flat washers or no washers are used with an axle 608.

FIG. 6G illustrates cross section of an example bolt 614, an example clamping plate 320, several stacking flywheel plates 322, and a bearing or bushing 612 that applies pressure from the clamping plate 320 on the stacking flywheel plate(s) 322 (e.g., at a peripheral edge, as noted above). In the depicted example, where the flywheel 152 uses stacking plates 322 and separate clamping plates 320, various issues may be caused when the flywheel 152 spins at very high speeds. For example, at high RPMs (rotations per minute), the mass of the stacking plates 322 may cause them to stretch radially while thinning axially. Because some implementations of the clamping plates 320 have less mass at higher radiuses or a lower mass-to-cross section ratio, they may change shape less than the stacking plates 322 at high RPMs. Accordingly, to avoid structural problems, maintain friction among the stacking plates 322, and reduce friction between components that change shaped differently, various mechanisms, such as Belleville™ washers 606, bearings or bushings 612 between clamping and stacking plates, and/or other features. For instance, the bushings may be wear-resistant balls or cylinders.

As noted above, in some implementations, the bolt shaft may contact the stacking plates 322 around the bolt 614, may not contact the stacking plates 322, or may contact at defined points (e.g., on a radially inward side, a radially outward side, etc.).

As noted elsewhere herein, a bolt 614 may be positioned so that 2,000 to 3,000 pounds of force is on each bolt to create friction on the plates. As noted in reference to FIG. 6G, a bolt 614 may contact the clamping plate(s) 320 via Belleville™ washers, dish springs, or other washers 606, which may provide some spring in order to continue to apply pressure to the plates when they elongate or become thinner.

For instance, a bolt 614 may not contact the stacking plates 322 unless there is a mechanical failure in the bolt 614 or the stacking plates 322. Where a bolt 614 fails, the contour of the clamping location around the bolt 614 may catch the bolt 614 or fragments thereof. Similarly, where a stacking plate 322 fails, the bolt 614 may catch a stacking plate 322 or portions thereof to mitigate a more catastrophic failure or external damage.

It should be noted that there may be a space between the clamping plate 320 and the top stacking plate 322 and the stacking plates 322 may each contact one another, which space may be larger during assembly, but the space may shrink as one or more of the clamping plates 320 are tensioned. In the depicted example of FIG. 6G, the clamping plates 320 are in an unstressed position, so that the bearings or bushings 612 are shown unconnected from a top-most stacking plate 322. It should be noted that this space is provided for visibility and that the clamping plate 320 may flex and/or be positioned differently, so that the bearing or bushing 612 contacts the stacking plate 322 and/or there is compression on the Belleville™ washers 606.

Depending on the implementation, an arm of the clamping plate 320 may directly or indirectly (e.g., via a bearing or bushing 612) contact a top/bottom most stacking plate 322. Because the bolts 614 may not allow the clamping plates 320 to move inward as the stacking plates 322 become thinner (although this effect is very small) at high RPMs, spring members, such as Belleville™ or cone washers 606 may be used to provide some flexibility and spring, which feature helps maintain the spacing and/or force between the clamping plate(s) 320 and the stacking plate(s) 322.

Accordingly, the Belleville™ washers 606 may keep a continual force on the plates even while shrinking while spinning. For example, the Belleville™ washers may provide a $1/100,000^{th}$ or $1/10,000^{th}$ flex that accommodates for thinning of the stacking plates 322. Different spring members or washers may be used to increase the flex where thinning is greater at the clamping location, such as where a greater number of stacking plates 322 are used.

Additionally, because the stacking plates 322 may stretch a greater amount than the clamping plates 320 at high RPMs, bearing or bushings 612 or other devices may be used to reduce radial friction between the clamping plates 320 and stacking plates 322 while maintaining clamping force and therefore friction between the stacking plates 322. In some instances, the bearings or bushings 612 may be configured so that rotational friction between the stacking plates 322 and the clamping plates 320 is maintained. It should be noted that although "bushings" are referred to herein, other pivoting or movable structures may be used to allow the plates to expand relative to each other. For example, any device that allows contact while providing the ability to expand differently radially may be used. For example, a small amount (e.g., 5, 8, or 10 thousandths of an inch) of movement may be allowed by the bearing or bushing 612. The movement may be due to rocking, rolling, pivoting, etc.

For example, a bearing or bushing 612 may be a ball, cylinder, wheel, roller, or other piece that allows the stacking plates 322 to move relative to the clamping plates 320. As illustrated in the example of FIG. 6G, the bearing or bushing 612 may be a cylindrical piece of metal; although, it should be noted that other movable pieces that, such as those that roll or pivot back and forth are possible and contemplated herein. For example, a wear resistant metal ball or cylinder may be used.

In some implementations, a bearing or bushing 612 may be partially recessed or otherwise held by a clamping plate 320, such as in a recess, as illustrated in the cross section of FIG. 6G. As example dimensions, the recess may be 0.3 inches in diameter and 0.2 inches deep, so that a ball may extend slightly; although the recess may be rectangular or another shape.

Various quantities, configurations, sizes, or positions of bearings or bushings 612 and bushing holders may be used. For example, as illustrated in the example cross section of FIG. 6G, a single cylindrical bearing or bushing 612 is shown radially inward from the bolt 614. In other implementations, multiple bearings or bushings 612 may be used on each arm and, for instance, located to the sides (e.g., circumferentially) relative to the bolt 614. For example, a single spherical bearing or bushing 612 may be located on each side of a bolt 614 at the clamping area of the clamping plate 320.

It should be noted that other implementations are possible and contemplated herein, such as where no bushings are used, where they are positioned or configured differently, or different mechanisms are used.

Figure 7A:
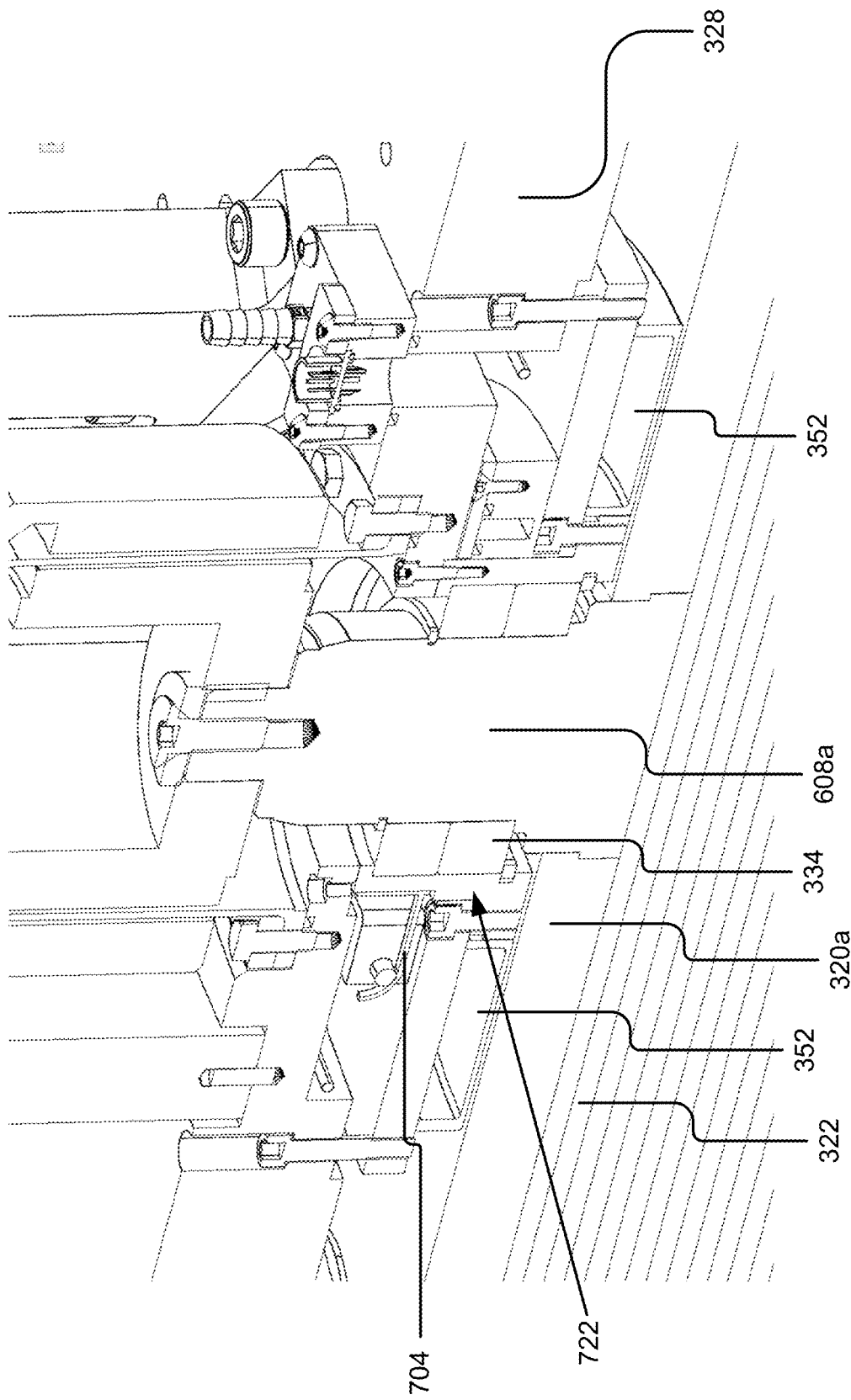
FIG. 7A illustrates a cross-sectional view of an example upper axle disposed within an upper bearing assembly of a flywheel enclosure.

FIG. 7A illustrates a cross-sectional view of an example upper axle 608a disposed within an upper bearing assembly of a flywheel enclosure 304. In the illustrated example, some components may be omitted for visibility. As illustrated, a top axle 608a may interact with a plurality of bearings 334 and/or seals (e.g., in a housing 722) to provide vertical and/or horizontal support. For instance, multiple (e.g., 2) bearings 334 may be used on an axle 608 to increase redundancy and safety. In some instances, a temperature sensor 704 or accelerometer may be located in or adjacent to the bearing housing 722, which allows the flywheel 152 to detect a failure of one or more bearings 334 thereby increasing a safety margin. Other features, such as cooling loops (e.g., through which coolant may be circulated), vacuum connections, etc., may also be used.

As illustrated, one or multiple seals may be located in or adjacent to the shaft of the axle. For instance, the seals may be housed within a bearing/O-ring housing 722 and contact the smooth sides of the axle shaft to seal a vacuum. In some instances, where the vacuum is actively established or maintained, the seals may change their shape by flexing inward to improve the seal. Similarly, the seals may be multiplied (e.g., doubled) for redundancy. Other structures, such as retaining clips may be located on one or both sides of the bearings 334, so that they can be installed or replaced separately or with a housing 722.

In some implementations, the bearings and/or seals/shaft may be lubricated, for example, using a high durability and/or vacuum specific lubricant. In some implementations, a special material may be used for the seals to allow them to be used in a vacuum and/or without a separate lubricant. Depending on the implementation, the bearings may be dry bearings, such as a ceramic hybrid bearing, which beneficially reduces eddy currents and other issues due to moving in a magnetic field. Additionally, or alternatively, a dry film lubricant may be used for these components.

In some implementations, as illustrated, an example magnetic lift member 352 may interact with (e.g., to attract) a flywheel 152, such as a top clamping plate 320a (and/or stacking plates 322). For instance, as illustrated, the magnet(s) of a magnetic lift member 352 may be located above, below, or next to the center of the axle 608a. For example, the magnets may be positioned by the magnetic lift member 352 (also referred to as the magnetic lift assist member/mechanism 352) to closely interact with the flat area (e.g., 444) of the top clamping plate 320a. For instance, the top bearing 334 may hold the top clamping plate 320a/flywheel 152 at a defined distance from the magnetic lift member 352, so that a defined magnetic force is applied, which lifts the flywheel 152 wholly or partially. For instance, as described elsewhere herein, the magnetic lift may be less than (e.g., so that weight remains on a bottom bearing), equal to (e.g., so that weight is roughly balanced between the top and bottom bearings), or greater than (e.g., so that the top bearing is holding the flywheel 152 from being pulled closer to the magnet(s)) the weight of the flywheel 152 at the set distance.

As illustrated and described in further detail below, the magnetic lift member 352 may be positioned close to the clamping plate 320a, which may be ferromagnetic (e.g., a magnetic steel) flat (or matching the shape of the magnetic lift member) shape. As shown, the flywheel 152 may be positioned at a center of the enclosure 304, although other implementations are possible. As noted elsewhere herein, the magnets of the magnetic lift mechanism 352/member may be stationary and coupled with the enclosure because magnets tend to be made out of weaker material that would not hold up well to rapid spinning (e.g., because rare-earth magnets, for instance, are mechanically weak). In the depicted example in FIG. 7A, a cavity is shown in the magnetic lift member 352, but this cavity may include one or more magnets, as described below. The magnetic lift member 352 may be assembled as a unit and then bolted or otherwise attached to a lid 328 of the flywheel assembly 150.

In the depicted example, an upper axle 608a may be coupled to a motor directly or via a magnetic coupling 318, as described elsewhere herein.

Figure 7B:
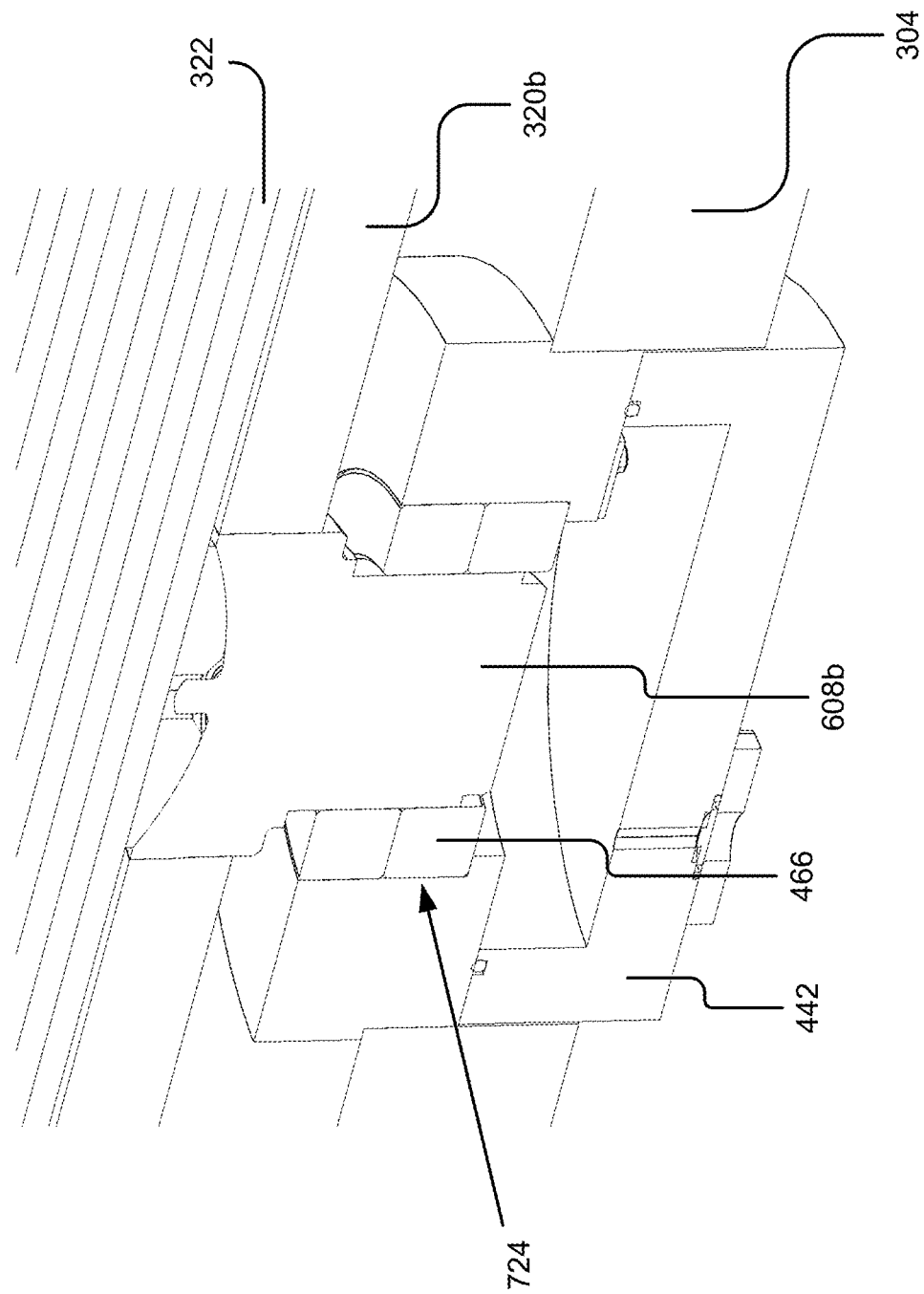
FIG. 7B illustrates a cross-sectional view of an example lower axle disposed within a lower bearing assembly of a flywheel enclosure.

FIG. 7B illustrates a cross-sectional view of an example lower axle 608b disposed within a lower bearing assembly 724 of a flywheel enclosure 304. In the illustrated example, some components may be omitted for visibility. Similar to FIG. 5A, as illustrated, a bottom axle 608b may interact with a plurality of bearings 466 and/or seals or structures to provide vertical and/or horizontal support. For instance, multiple (e.g., 2) bearing assemblies may be used on an axle 608b to increase redundancy and safety. In some instances, a temperature sensor or accelerometer may be located in or adjacent to the bearing housing 724, which allows the flywheel 152 to detect a failure of a bearing thereby increasing a safety margin, improving efficiency, etc. Stacking plates 322 are also shown.

As shown in the example of FIG. 7B, a cap 442 is also shown. The cap 442 may seal (e.g., using gaskets and bolts) an interior cavity of the enclosure 304. The cap 442 may provide access to move the flywheel 152 within the enclosure 304; install, maintain, or adjust bearings 466 and seals; and perform other actions.

In some implementations, the cap 442 and/or another component may be threaded, so that it may be twisted up/down, which adjusts the position of the bearings 466 and/or seals; or it may lift the flywheel 152 itself to set its position in the enclosure 304. In other implementations, the flywheel 152 may be manually adjusted (e.g., to be at a defined distance from the magnetic lift member 352) and then the bearings inserted or locked in position.

Figure 7C:
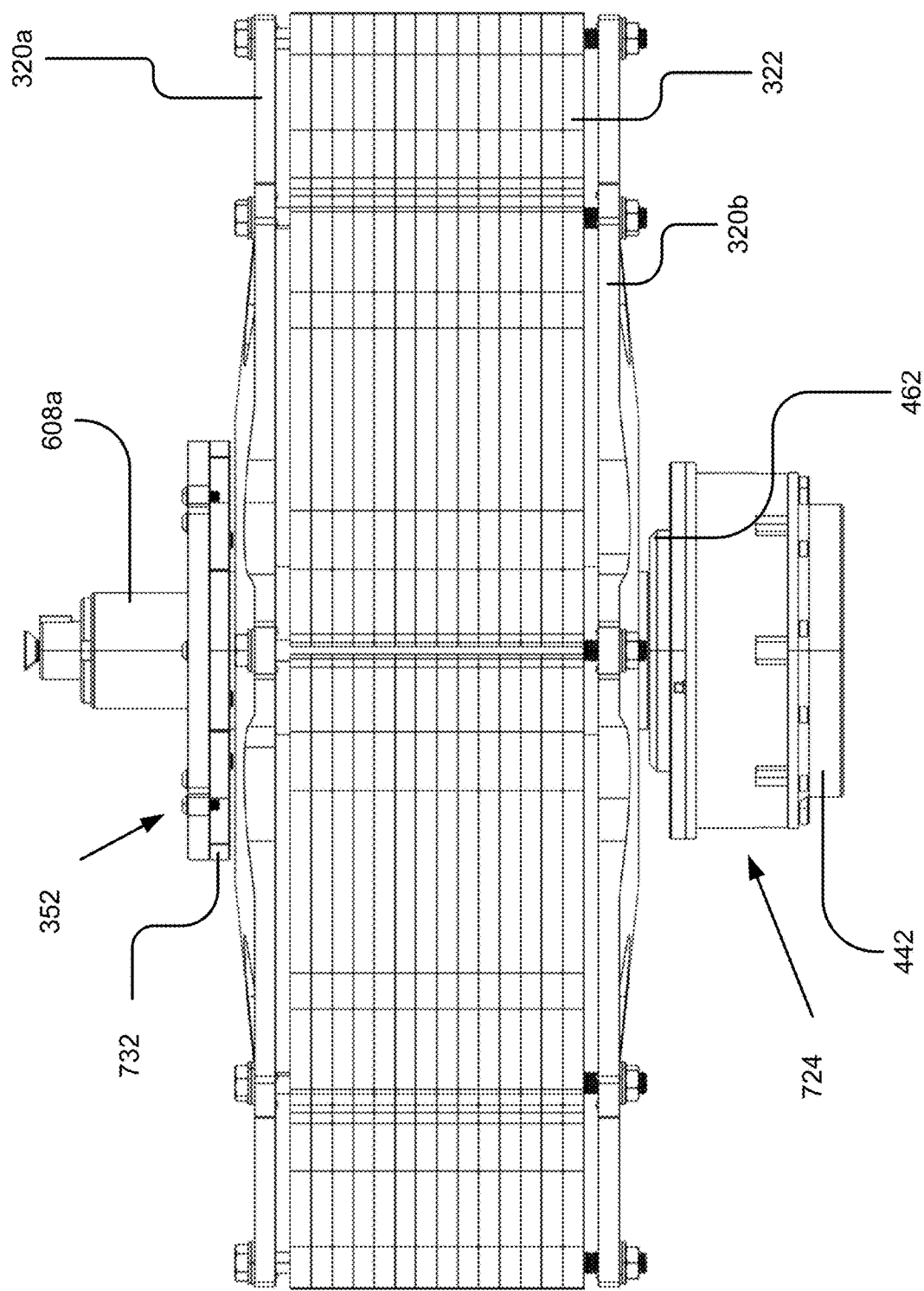
FIG. 7C illustrates an example flywheel coupled with a portion of a magnetic lift member and a lower bearing assembly outside of a flywheel enclosure.

FIG. 7C illustrates an example flywheel 152 coupled with a portion of a magnetic lift member 352 and a lower bearing assembly outside of a flywheel enclosure 304, for example, for purposes of illustration.

As illustrated in the example of FIG. 7C, an exterior of the magnetic lift member 352 has been omitted to show magnets 732, which may be wedge magnets, and an example relative proximity to the top clamping plate 320a. For instance, the wedge magnets 732 may, when in an active configuration, pull on the flat area (e.g., 444) of the clamping plate 320a, although other implementations are possible and contemplated. It should be noted that although the magnets 732 and other components of the magnetic lift member 352 are illustrated floating above the top clamping plate 320a (e.g., instead of attached to an enclosure 304/lid 328) for purposes of illustration.

The example of FIG. 7C also illustrates a lower bearing assembly 724 that holds one or more bearings at the bottom of the flywheel enclosure 304. For instance, a lower bearing assembly 724 may be welded, integrated with, or bolted to an enclosure tub 326. The lower bearing 724 may support none, a portion, or all of the weight of the flywheel 152. In some implementations, the lower bearing 724 may merely be present to keep the flywheel 152 horizontally aligned.

The lower bearing 724 may include a shipping support area 462, such as a shipping ring, on which the weight of the flywheel 152 may rest during shipping, storage, or when not in use. The shipping support area 462 may be any device that may support the flywheel 152, such as a plastic or metal ring in the enclosure tub 326.

The height and/or relative positioning of the bearings may also be adjusted because a quantity (e.g., 10, 14, 18, 28, or other quantities) of stacking plates 322 may vary, and thicknesses of each plate may vary (e.g., by a thousandth of an inch), the overall thickness of the flywheel 152 may vary enough to affect the functioning or longevity of the bearings unless there is flexibility in the design, as illustrated, to accommodate different heights.

As described elsewhere herein, a retaining cap 442 or another mechanism may seal the enclosure and/or capture an adjustment nut so that it does not accidentally move in order to lock the Z/vertical axis of the flywheel 152.

FIGS. 8A-8D illustrate various views, components, and constructions of an example flywheel positioning system. The flywheel positioning system may be configured to position the flywheel 152 within the enclosure 304, as described elsewhere herein. Although a certain implementation is described, other implementations and features are contemplated, and the provided examples should be understood as examples.

In some implementations, the flywheel positioning system may adjust the position of the flywheel 152 between the top and bottom bearings 466 so that a distance between the bearings 466 may be adjusted to match a size of the flywheel 152 and thereby to minimize wear on the bearings 466 while using their functionality. For instance, as noted elsewhere herein, the flywheel positioning system may lift the bottom bearing 466 upward, in turn lifting the flywheel 152 upward, until the flywheel 152 contacts the top bearing and/or is correctly distanced from the magnetic lift member/mechanism. In some implementations, as the flywheel 152 is lifted up, it may contact a surface, such as a top bearing (e.g., at the top of an enclosure 304, magnetic lift member 352, or bumper. Once it contacts the surface, it may be backed down by a defined amount to correctly position the flywheel 152. In some implementations, the positioning system (e.g., a nut bearing holder 464) may include one or more marks that may be used to determine correct positioning.

In some implementations, the flywheel positioning system may be used to move the flywheel 152 or components of the flywheel assembly 150 between modes. As noted above, the flywheel positioning system may move the flywheel 152 (e.g., via a bottom bearing 466) or a shipping surface/ring 462 in order to move the flywheel 152 between a shipping position and an active position.

For example, as noted in further detail elsewhere herein, a flywheel 152 may rest on a shipping ring 462 during shipping or storage. The flywheel positioning system may be adjusted to lift the flywheel 152 off the shipping ring 462 and into an active position, for instance, by engaging a bottom bearing 466 (e.g., by moving the bearing 466 and/or flywheel 152) and/or the top bearing (e.g., by moving the bearing and/or flywheel 152).

Figure 8A:
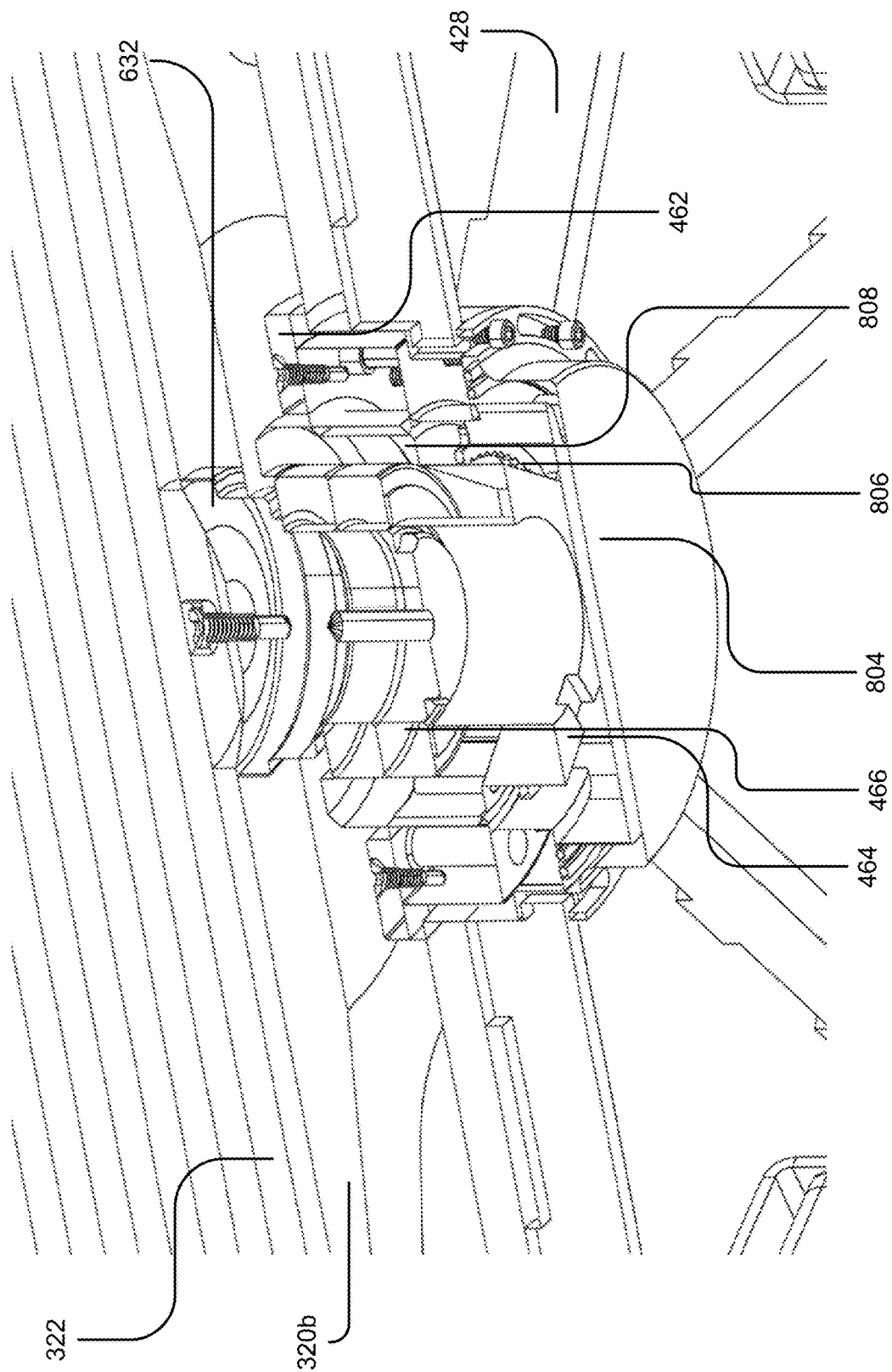
FIG. 8A illustrates a cross sectional view of an example flywheel positioning system.

FIG. 8A illustrates a cross sectional view of an example flywheel positioning system, which may include a retaining cap 804 that couples with a positioning nut/nut bearing holder 464 and a flywheel enclosure 304. For example, the base ring 440 may be integrated or coupled with a bottom plate 436 of the enclosure 304 tub. One or more bottom ribs 438 may also be coupled with the bottom plate 436 and base ring 440 (e.g., by a weld), which provides strength to the enclosure 304 sufficient to hold the weight of the flywheel 152.

In some implementations, the base ring 440 may be threaded on its interior or exterior to interact with a nut bearing holder 464, as described below. In some implementations, a retaining cap 804 may be coupled with the base ring 440 via one or more bolts, which bolts may provide adjustability to the rotation of the retaining cap 804 on the enclosure 304, as noted below.

In the depicted examples, a flywheel 152 and flywheel axle 608b are shown inside an enclosure 304. Although the flywheel positioning system could be used with a top axle 608b/the top of a flywheel, the illustrated examples of FIG.

7B illustrates the flywheel positioning mechanism used with a bottom axle 608b of the flywheel 152.

As shown, an axle 608b may interact with one or multiple bearings 466 held by a lower bearing holder 464. The lower bearing holder 464 may be a nut bearing holder 464 where the nut includes a bearing 466 holding portion, a tightening portion, and one or more threads, as described below. The bearing(s) 466 may support the axle 608b of the flywheel. In some instances, the bearing(s) 466 and/or nut bearing holder 464 may be held by a lower sleeve 808.

As illustrated in the example, the nut bearing holder 464 may hold the bearings 466 and may rotate (e.g., using threads) within a lower ring of the enclosure 304 tub to move the nut bearing holder 464 and bearing(s) 466 upward or downward relative to the enclosure 304, which may, in turn, move the flywheel upward or downward. For example, when in a shipping configuration, the nut bearing holder 464, bearing(s) 466, and flywheel 152 may be moved downward so that the bottom surface of the clamping plate 320b rests on the shipping ring 462, which may be a metal, plastic, or another material on which the flywheel 152 may rest to remove stress from the bearing(s) 466. In some instances, the flywheel 152 may rest directly on the bottom of the enclosure 304 tub when in a shipping or storage position.

Although other implementations are possible, a nut locking mechanism may include one or more of a cap 804, a hex lock 806, and/or a nut bearing holder 464, etc. In some implementations, as described in further detail below, a cap hex lock 806 may include various protrusions, recesses, or other structures, such as teeth 814 (e.g., defining a set of angles at which a nut may be held), that interact with the nut bearing holder 464 to prevent the nut bearing holder 464 from twisting relative to the enclosure 304, which may change the vertical position of the flywheel in the enclosure 304. The cap 804 hex lock 806 is described in further detail below.

In the depicted implementation, a retaining cap 804 is also shown. The retaining cap may be an implementation of a cap 442. The retaining cap 804 may include one or more O-rings or channels to seal the vacuum internal to the enclosure 304. Accordingly, when the retaining cap 804 is placed onto the enclosure 304 (e.g., after flywheel positioning), a vacuum may be maintained.

In some implementations, the retaining cap 804 may hold the cap hex lock 806 in position on the nut bearing holder 464, so that the nut bearing holder 464 cannot rotate when the retaining cap 804 is bolted to the enclosure 304 (e.g., the base ring 440). For example, when attaching the retaining cap 804, it may be rotated to mate up with the cap hex lock 806 to hold it in a specific position, causing the cap hex lock 806 to bridge the space between the nut bearing holder 464 and the retaining cap 804 and prevent the nut from rotating. It should be noted that although the cap hex lock 806 is described as a separate device from the retaining cap 804, it may be integrated with either the nut bearing holder 464 or the retaining cap 804 to simplify installation. Example implementations of the nut bearing holder 464, cap hex lock 806, and retaining cap 804 are described elsewhere in further detail below.

Accordingly, as an example procedure for changing the mode of the flywheel from a shipping position to an active position, a technician may rotate the nut bearing holder 464, so that it moves upward and lifts the flywheel internal to the enclosure 304 and off of the shipping ring 462. Once the flywheel 152 (e.g., a top clamping plate 320a) contacts a surface at the top of the enclosure 304, magnetic lift member 352, top bearing(s) 466, bumper, or other component, the technician may stop rotating the cap 804 hex lock 806 upward and may back it off slightly to relieve pressure on the top bearing 466 or contact with another component. The technician may then insert a cap hex lock 806 around the hex head of the nut bearing holder 464 to mesh the teeth 814 of the lock with the nut. The technician may then place the retaining cap 804 onto the base ring 440 and rotate it until it interacts with the cap hex lock 806 (as described below) to hold the cap hex lock 806 in a given orientation so that it does not rotate. The technician may then tighten bolts between the retaining cap 804 and the base ring 440 to seal the enclosure 304 and lock the nut bearing holder 464 in place.

Accordingly, the position of the flywheel 152 and lower bearing 466 may be adjusted to accommodate for shipping, variations in flywheel thickness, or other aspects. By locking in an adjustable vertical position of the flywheel 152, the flywheel positioning system prevents unintended movement of the nut bearing holder 464 during flywheel rotation or vibration. It also allows the position to be adjusted in the future for troubleshooting or maintenance, where adhesives or welds would not allow such access. Accordingly, the lock is secure, sealed, and accessible.

Although not visible in FIG. 8A, one or more sensors may also be located in the lower bearing assembly, such as in the base ring, adjacent to the bearings 466, in the retaining cap 804, or otherwise. The sensors may measure vibration, temperature, rotational velocity, or otherwise.

Figure 8B:
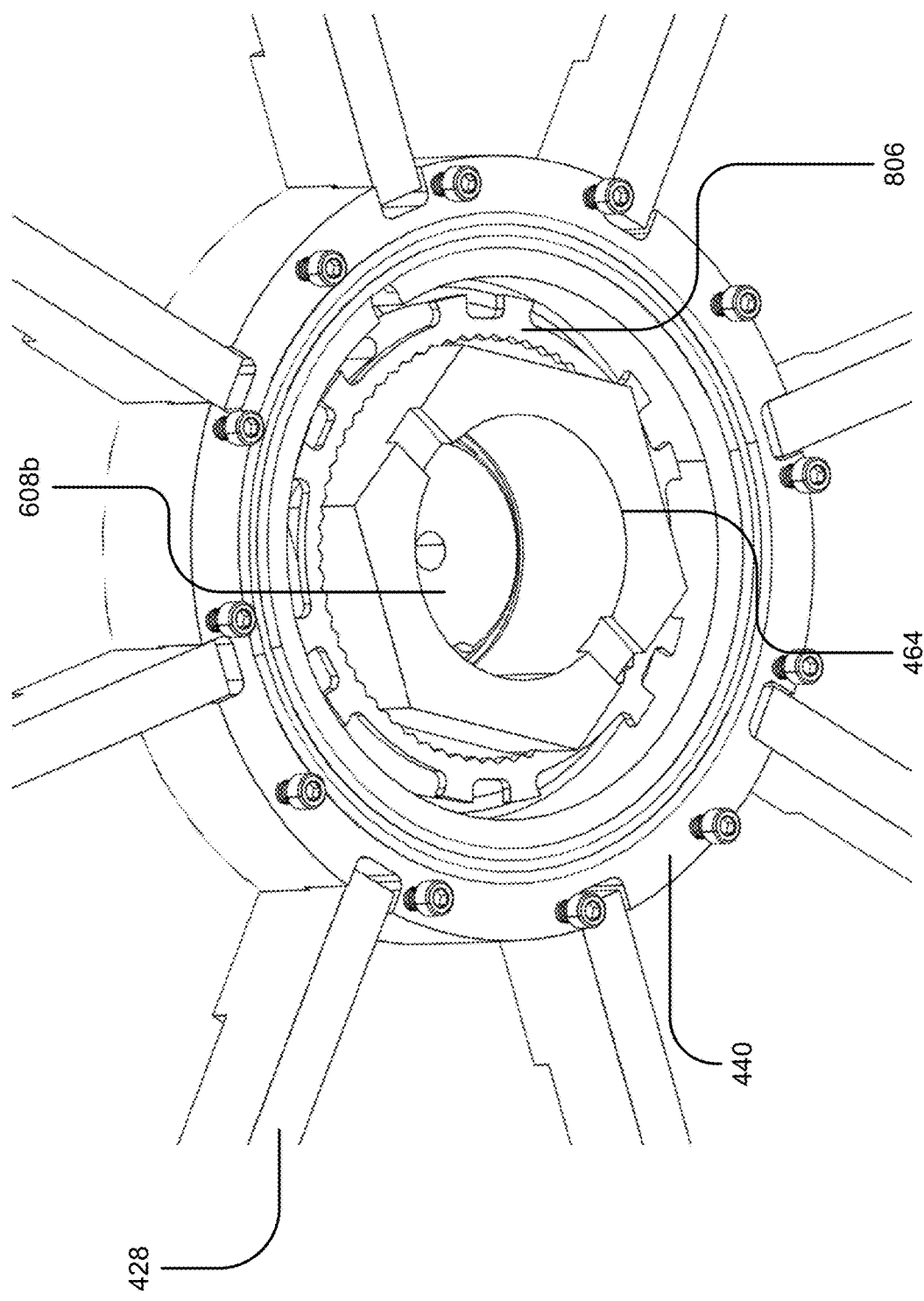
FIG. 8B illustrates a bottom-up view of an example nut bearing holder coupled with a flywheel enclosure.

FIG. 8B illustrates a bottom-up view of an example nut bearing holder 464 coupled with a flywheel enclosure 304 and a hex lock 806. As illustrated in the example of FIG. 8B, a nut bearing holder 464 is located in a base ring 440 and a retaining cap 804 is removed for visibility. As illustrated, the nut bearing holder 464 may be in a defined rotation that affects the height of the flywheel 152. Because small changes in the height of the flywheel 152 may affect its functioning (e.g., while it interacts with a magnetic lift member 352 or bearing(s) 466), a few degrees of rotation of the nut bearing holder 464 can significantly affect the longevity, etc., of the bearings 466. Accordingly, the hex lock 806 may include teeth 814 on a radially inward edge, any of which may interact with the sides of the nut bearing holder 464 in various rotational positions. As noted below, the hex lock 806 may interact with a retaining cap 804 to hold the hex lock 806 in place, so that the hex lock 806 bridges the gap and/or rotational difference between the nut bearing holder 464 and the retaining cap 804. Accordingly, when the retaining cap 804 is placed on it, the cap 804 and hex lock 806 combination captures the torque of the nut bearing holder 464, which may be otherwise disposed to rotate due to the rotation of the flywheels 152 and bearings 466.

Also, as illustrated in FIG. 8B, the nut bearing holder 464 may include a hex shape to interact with wrench or other tools of various sizes, although it may be a different shape to accommodate different tools. In some implementations, it may include one or more slots at the bottom, so that a flat tool or a rod can be used to tighten or loosen the nut.

FIG. 8B illustrates an example cap 804 or nut hex lock 806 (also referred to as a hex lock 806). As illustrated in the example of FIG. 8B, the hex lock 806 may be a ring that may extend around a hex nut, such as the nut bearing holder 464; although, it should be noted that it may extend only partially around the nut. The hex lock 806 may be a plate or disk of material that is formed, machined, or stamped (e.g., from steel) to have its features, as noted below.

In the depicted implementation, the hex lock 806 may include teeth 814 or other grooves, protrusions, recesses or other structures disposed around an inner edge of the ring. For instance, the angles of the teeth 814 may match the angle of the hex lock 806 (e.g., 120 degrees) and where the radius of the nut bearing holder 464 matches the radius of the corners of the teeth 814, so that when the hex lock 806 is placed on the nut, the teeth 814 hold the nut.

The quantity of teeth 814 of the hex lock 806 may be varied depending on the increments of angles at which the nut may be held and adjustability of the retaining cap 804. For instance, the teeth 814 may be larger and therefore fewer if the precise angle of adjustment of the nut is less important but smaller and greater in number of more precision is required for the application. Similarly, as noted elsewhere herein, the retention cap 804 may provide adjustability in its mounting to the enclosure 304 and/or interaction with the hex lock 806, so the teeth 814 may be made larger based on the retaining cap 804 adjustability.

The hex lock 806 may also include one or more protrusions 812 at an outer edge of the ring (e.g., a full or partial ring) that may interact with another structure to prevent the hex lock 806 from rotating. For instance, the hex lock 806 protrusions 812 may interact with corresponding protrusions or recesses of the retaining cap 804, as noted below, to hold the hex lock 806 in a position. The hex lock 806 may include various quantities of protrusions, such as the six pairs of protrusions illustrated in the example. The protrusions and their interaction with one or multiple positions and structures are described in further detail below.

It should be noted that, although nut interaction teeth 814 are illustrated in the inner edge of the ring and hex lock protrusions 812 are illustrated on the outside of the ring, other implementations are possible and contemplated herein. For instance, the hex lock 806 and/or retainer cap 804 may interact with an inner surface of the nut bearing holder 464 to keep it in place.

As noted below, in some implementations, the structure of the hex lock 806, such as the teeth 814, may be integrated with the retaining cap 804.

Figure 8C:
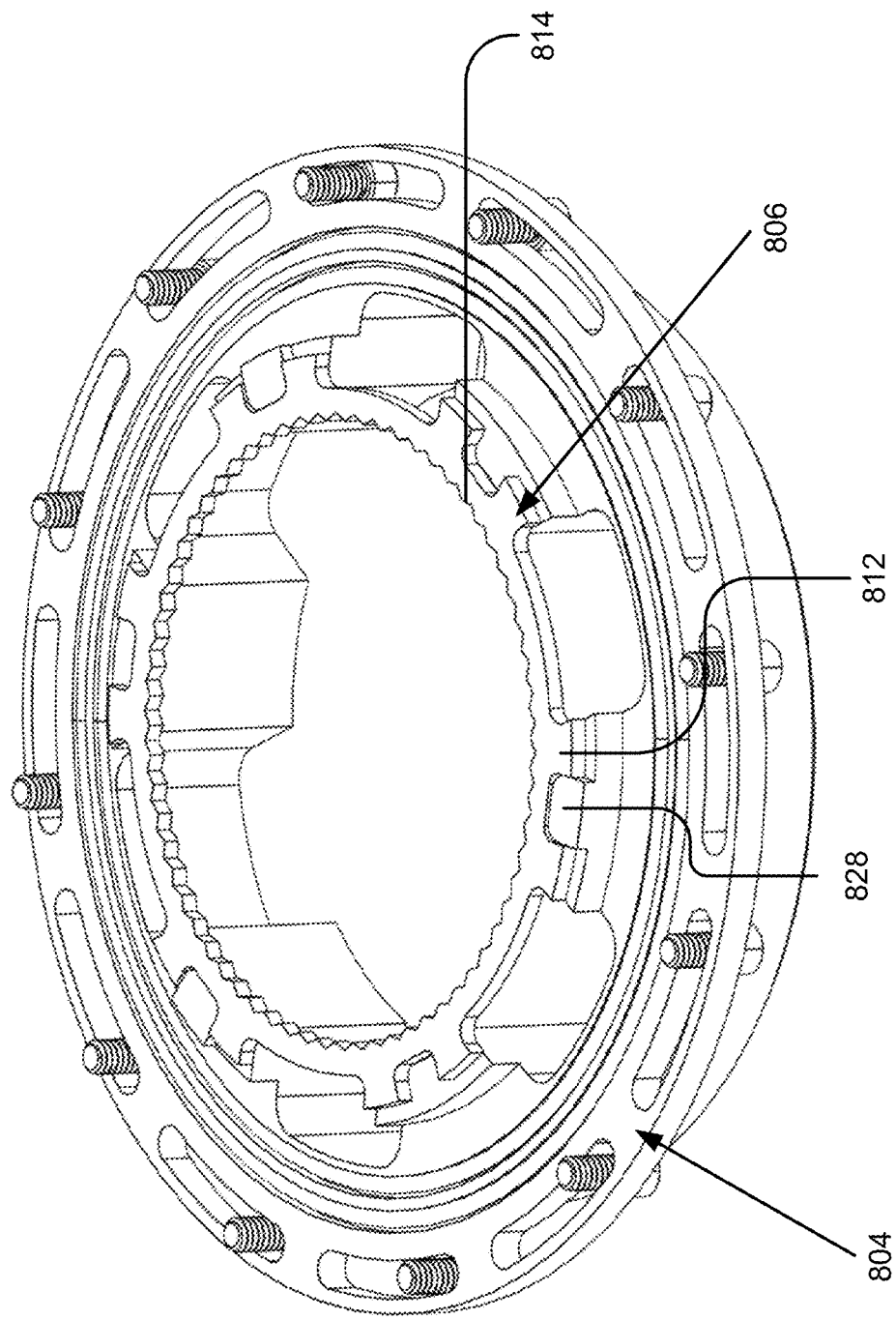
FIG. 8C illustrates a top view of an example retaining cap.

FIG. 8C illustrates a top view of an example retaining cap 804. As illustrated, the retaining cap 804 may include hex lock interaction elements 828. For instance, the interaction elements 828 may be raised above the body of the retaining cap 804 in order to extend upward into the space next to a nut bearing holder 464 and interact with the hex lock 806. For instance, the retaining cap 804 may include an equal or fewer number of hex lock interaction elements 828 as the hex lock 806 includes locking protrusions 812, so that these components interact with each other in order to rotationally couple the hex lock 806 to the retaining cap 804. As illustrated in the example, the hex lock 806 may include more locking protrusion 812 pairs than the retaining cap 804 includes interaction elements (e.g., a 2:1 ratio), so that the hex lock 806 can be locked into multiple positions relative to the retaining cap 804. In some instances, these positions may be offset at various angles to provide further adjustability to the interaction.

In some implementations, the retaining cap 804 may include raised areas 826 that contact the bottom of the hex lock 806 to hold it in place. For instance, the top of the hex lock 806 may press against another area of the nut bearing holder 464, base ring 440, or another area to keep it from falling off the hex lock interaction elements 828.

In some implementations, the retaining cap 804 and/or base ring 440 may include recesses or other areas that may hold seals (e.g., gaskets or O-rings) in order to seal the vacuum internal to the enclosure 304. For example, two grooves are illustrated as O-ring holders in FIG. 8C. In some implementations, the retaining cap 804 may include other components or structures, such as a vacuum hose adapter to which a vacuum hose may be attached to pull the vacuum in the enclosure 304.

In some implementations, the retaining cap 804 may include adjustable bolt holes or slots through which the retaining cap 804 may be bolted to the enclosure 304, such as the base ring 440 as noted above. For example, the retaining cap 804 may be bolted at various positions, which increases adjustability of the retaining cap 804, hex lock 806, and nut bearing holder 464 combination, so that more precise rotations and, therefore, heights may be locked.

As illustrated in the example, a nut bearing holder 464 may be rotated to move it upwards or downwards in the base ring 440 and/or lower sleeve 808. The nut bearing holder 464 may hold a bearing 466, which, in turn, holds the lower/bottom axle 608b of the flywheel 152. In some implementations, the nut bearing holder 464 may be open at a center/bottom so that the bottom axle 608b is visible, although other implementations are possible and contemplated herein. Once the nut bearing holder 464 is rotated to a correct rotation/height, the hex lock 806 and/or retaining cap 804 may be placed thereon to secure its rotation and therefore the vertical/Z height of the flywheel 152.

Figure 8D:
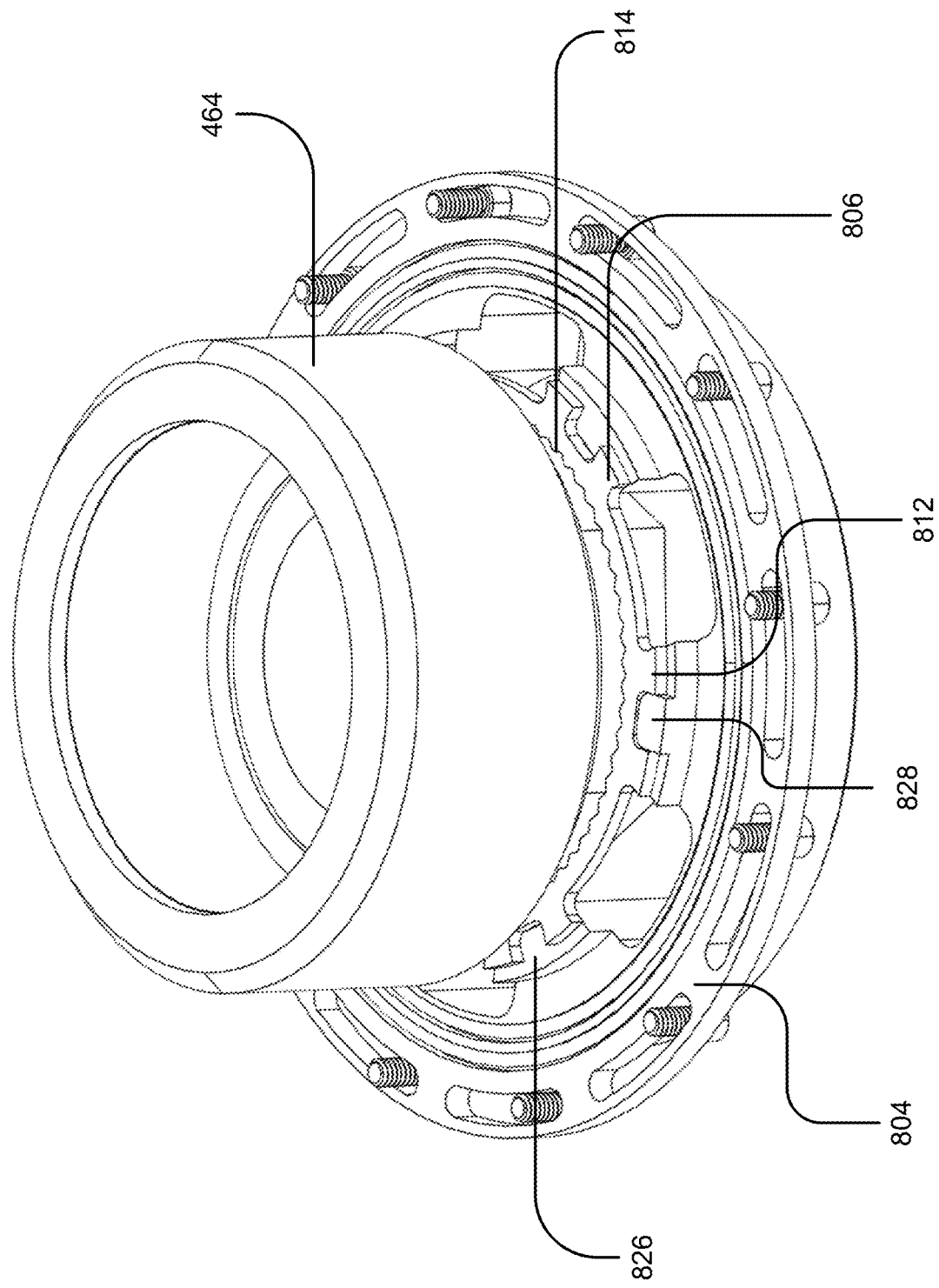
FIG. 8D illustrates a top view of an example nut bearing holder held by a hex lock and retaining cap.

FIG. 8D illustrates a top view of an example nut bearing holder 464. The example nut bearing holder 464 may have the illustrated configuration, although other configurations are possible. Additionally, the nut bearing holder 464 is illustrated without threads for clarity but, in some implementations, it may include threads on an outer face to allow it to be twisted up or down. The bearing(s) 466 are also removed from the bearing holder in order to illustrate an example structure of the nut bearing holder 464.

The nut bearing holder 464 may have a hex interface and/or notches to allow it to interact with tools and/or the hex lock 806. The hex interface may be located at the bottom of the nut bearing holder 464, for example, below the outer face and bearing holder 464.

The nut bearing holder 464 may have a bearing holder body with an outer face and a bearing holder portion on the inside that holds one or more bearings 466. For instance, the bearing holder body may be cylindrical with threads on a radially outward face and a hollowed-out core configured to hold one or more bearings 466. The core or center of the bearing holder portion may support vertical and/or horizontal bearings 466, such as on one or more bearing steps. In some implementations, the bearing holder body may include a cavity at a center, such as is illustrated, to hold the flywheel axle 608b or let it pass therethrough.

The nut bearing holder 464 may be resized, elongated, or widened based on the size of axle 608b and/or tightening tool being used. Furthermore, other configurations are possible and contemplated, such as where the nut bearing holder 464 additionally or alternatively holds a shipping ring 462, where the nut bearing holder 464 has a different shape, or otherwise.

The bearing(s) 466 may move upward or downward in an aperture of an enclosure 304 based on rotation of the nut bearing holder 464.

As shown, the bearings 466 may be held at the center of an aperture/hole in the enclosure 304 bottom. The enclosure 304 bottom may include a base ring 440 coupled with a bottom plate 436 and bottom rib 438 to provide strength to support the flywheel 152. In some implementations, the base ring 440 may include a lower sleeve 808 that is positioned between a portion of the nut bearing holder 464 and the base ring 440 to provide threads and/or reduce vibrations (e.g., from a space around the nut bearing holder 464). In some implementations, the base ring 440 or other components may be coupled with a bolt plate at the bottom of the enclosure 304 tub, which may securely hold the lower bearing 466 assembly in place.

In some implementations, the nut bearing holder 464, lower sleeve 808, space around the nut bearing holder 464, or other area of the lower bearing 466 assembly may include one or more sensors that relay bearing 466 or flywheel 152 health/status to the flywheel CPU/CNS/controller. For instance, a temperature sensor and an acceleration sensor may be placed at the bearing 466 to detect bearing 466 wear and/or failure or other anomalous conditions. Wiring for the sensors may pass through a retaining cap 804 or through the side of the enclosure 304, as illustrated elsewhere herein.

FIG. 8D illustrates a top view of an example cap hex lock 806, and nut bearing holder 464 in an assembled position, but with the flywheel 152 and flywheel enclosure 304 omitted for clarity.

The example raised area(s) 826 of the retaining cap 804 are illustrated supporting the cap hex lock 806 to keep it in place. Hex lock interaction element(s) 828 of the retaining cap 804 are also shown interacting with locking protrusions 812 of the hex lock 806. For instance, the interaction elements 828 are held in between pairs of the locking protrusions 812 around an outer edge of the cap hex lock 806. It should be noted that different configurations, such as pairs of protrusions being on the cap 804 instead of or in addition to the hex lock 806 are possible. Similarly, other structures in which the components are rotationally locked are possible and contemplated herein.

It should be noted that although the cap hex lock 806 and retaining cap 804 are illustrated as separate components, in some implementations, they may be integrated into a single component. For instance, an inner diameter of the retaining cap 804 may include teeth 814 configured as the hex lock 806. Accordingly, while separating these components may provide easier manufacturability and assembly, they may be combined into a single unit designed to hold the nut bearing holder 464 in place, for example, at various rotations and corresponding heights.

FIG. 8D illustrates a top view of an example retaining cap 804, cap hex lock 806, and nut bearing holder 464 in an assembled position, but with the flywheel 152 and flywheel enclosure 304 omitted for clarity. In the depicted example, the assembled retaining cap 804 and cap hex lock 806 are shown in a locking position to prevent the nut bearing holder 464 from rotating.

In addition to the interactions described above between the retaining cap 804 and the cap hex lock 806, the teeth 814 of the hex lock 806 are shown interacting with the corners of the hexagonal/hex interface of the nut bearing holder 464 to rotationally lock the hex lock 806 with the nut bearing holder 464.

The retaining cap 804 may be bolted with the base ring 440 or other component of the flywheel enclosure 304. For example, a technician may position the nut bearing holder 464 (e.g., as a correct height, as noted above), place the cap hex lock 806 in the retaining cap 804, and then place the retaining cap 804 onto the base ring 440 while rotating it slightly (e.g., using adjustability provided by the bolt holes/slots) until the teeth 814 of the hex lock 806 fall into place with the nut bearing holder 464. The bolts of the retaining cap 804 may then be tightened to the base ring 440 of the enclosure 304 to secure the entire assembly in the set position and, in some instances, seal an internal vacuum.

Figure 9A:
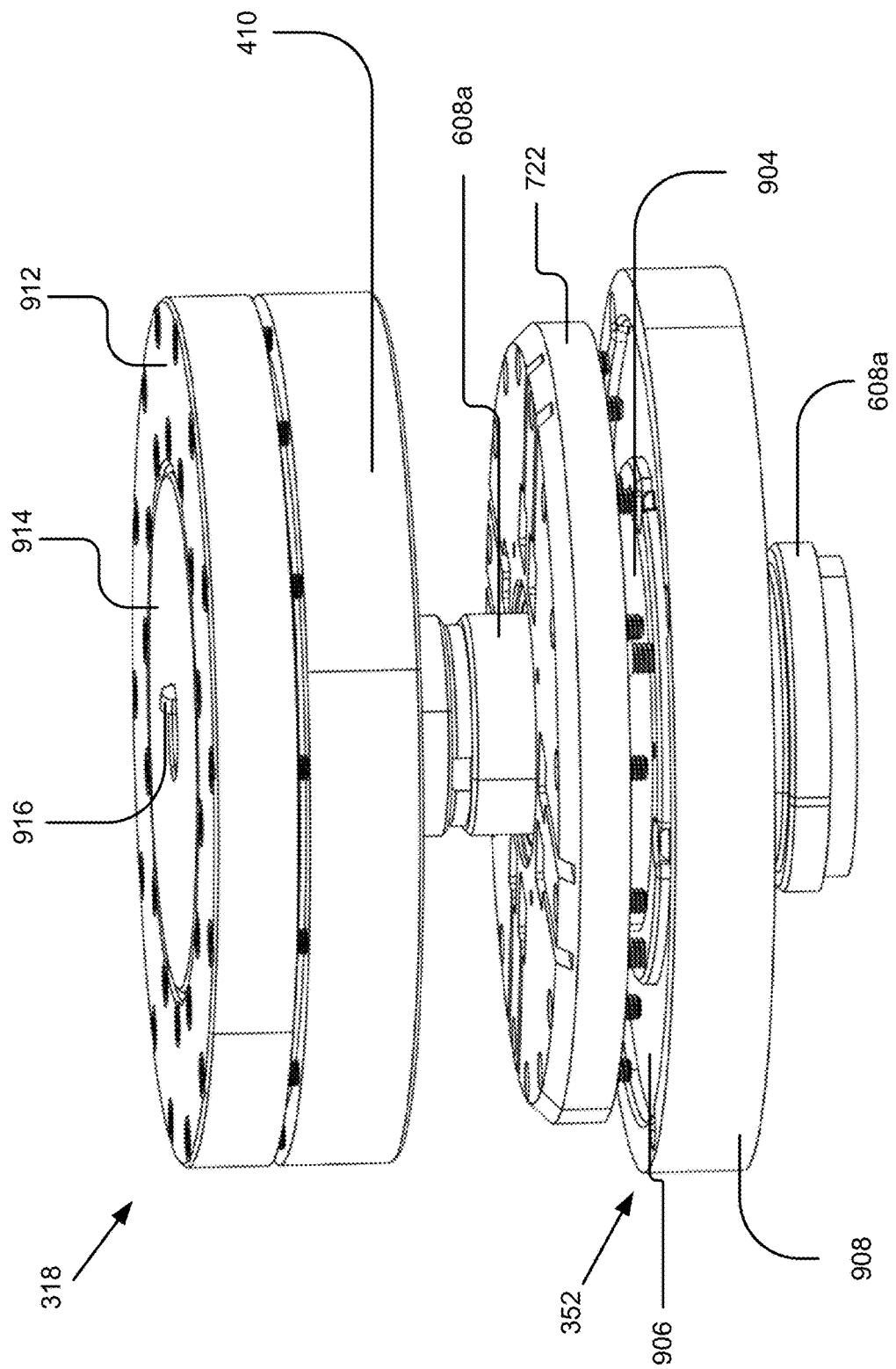
FIG. 9A illustrates an example assembly for an upper bearing of a flywheel assembly.

FIG. 9A illustrates an example assembly for an upper bearing of a flywheel assembly 150 including a magnetic motor coupling 318, top axle 608*a*, upper bearing seal/O-ring housing 722, and magnetic lift member 352. It should be noted that although these components are illustrated as being separate, they may be combined or further separated. For instance, a bearing housing 722 may be combined with the magnetic lift member 352 and/or the magnetic coupling 318.

As illustrated in the example of FIG. 9A, the top axle may pass through a magnetic lift member 352, and which may be a ring coupled to the lid of the flywheel enclosure 304 (e.g., to an underside thereof). For instance, the magnetic lift member 352 may be positioned at the bottom-most point of the upper bearing assembly in order to be as close as possible to the flywheel 152 (e.g., to the top clamping plate 320*a*) to maximize the magnetic pull. For instance, where a flywheel 152 weighs 1800 pounds, at a defined distance, the magnetic lift member 352 may pull with a force of 1500 pounds, so that a bottom bearing only holds 300 pounds. In another configuration, where a flywheel weighs 1800 pounds, the magnetic lift member may pull with a force of 2100 pounds, so that the top bearing holds 300 pounds pushing upwards.

The upper bearing O-ring housing 722 may hold one or more seals and/or one or more bearings 466. For instance, the bearings 466 and seals may interact with the top axle 608*a*. The bearings are described elsewhere herein and may prevent the top axle 608*a* from moving upwards (e.g., due to the magnetic lift member 352) and/or may keep the axle 608*a* from wobbling around an axis. The bearings 466 may be doubled for redundancy, as noted above. In some instances, the upper bearing O-ring housing 722 may also include one or more sensors that detect issues with the bearing(s).

The upper bearings 466 may be oriented to reduce friction and/or provide support horizontally and/or vertically. Although the bearings 466 may be doubled to tripled for redundancy, minimal pressure should be applied to the bearings by balancing the flywheel 152 and/or using support mechanisms, such as the magnetic lift member 352. The bearing(s) 466 may be ceramic/ceramic hybrid bearings and/or could use dry film lubricant.

The upper bearing O-ring housing 722 may additionally or alternatively house one or multiple seals that interact with a shaft of the top axle 608*a*, and/or seals may be incorporated with bearing(s) 466, as noted above. In some instances, the seals may be integrated with another component, such as a motor-generator housing, magnetic lift member 352, enclosure lid 328, and/or otherwise.

The upper bearing O-ring housing 722 may be coupled to a top of the enclosure lid 328, to the top of the magnetic lift member 352, to the bottom of the magnetic coupling 318, or to another component of the flywheel assembly 150.

The magnetic coupling 318 may be located near the motor-generator 310, for example, near an end of the top axle 608*a* in order to interact with the top axle 608*a*, for instance, a lid 328 may be located between the housing 722 and the magnetic lift member 352. As described elsewhere herein, the magnetic coupling 318 may interact with the shape, groove, machine key 916, or other components of the top axle 608*a* to transfer torque to/from it.

Example implementations of the magnetic coupling 318 are described below and may include various components, such as an external rotor top 912 and bottom 410, as well as an internal rotor top 914 and bottom (not visible) that may rotate within the external rotor top 912 and/or bottom 410. For instance, the external rotor top 912 and/or bottom 410 may be coupled (e.g., bolted) to a motor mount, upper bearing O-ring housing 722, enclosure lid 328, or otherwise, as described elsewhere herein.

As illustrated in FIG. 9A, the top axle 608a may include a machine key 916 that improves the connection with the magnetic coupling 318.

As illustrated in the example, the bearings 466 may be held at the center of the magnetic lift member 352, for example, by an upper bearing holder 904. The upper bearing holder 904 may be held by the magnetic lift member 352, the upper-bearing O-ring housing 722, an enclosure lid 328, etc. For example, the upper bearing holder 904 may be located within or above a ring of the magnetic lift member 352. The magnetic lift member 352 may be bolted to the bottom of the enclosure lid 328 (e.g., using the illustrated bolts).

Depending on the implementation, the magnetic lift member 352 may include a mag lev backer 906 (also referred to as a backer ring) to which magnets may be attached or otherwise supported, as described below. In some implementations, the magnetic lift member 352 may additionally or alternatively include a magnet holder 908 that may couple with the mag lev backer 906 and/or magnets. For instance, the magnet holder 908 may be a cap or structure that overlaps over the bottom of the magnets to help support them and/or is bolted to a mag lev backer 906.

As illustrated, a magnet holder 908 may extend under the magnets to protect them and/or hold them to the mag lev backer 906 or another component. In the illustrated example, an upper bearing holder 904 may be coupled (e.g., bolted or welded) to the magnetic lift member 352 and may provide horizontal and/or vertical support to the bearing(s) 466. The mag lev backer 906 may be a flat plate or disk with bolt holes to which the magnet holder 908 may attach. Similarly, the mag level backer 906 may bolt to a lid 328 of an enclosure 304 (not shown in FIG. 9A). The magnet holder 908 may support the magnets or merely cover them, although other implementations are possible. The magnet holder 908 and mag lev backer 906 may be circular, have protrusions (e.g., for bolts), or have other shapes. Similarly, these components may be bolted at a center, periphery or otherwise supported.

Figure 9B:
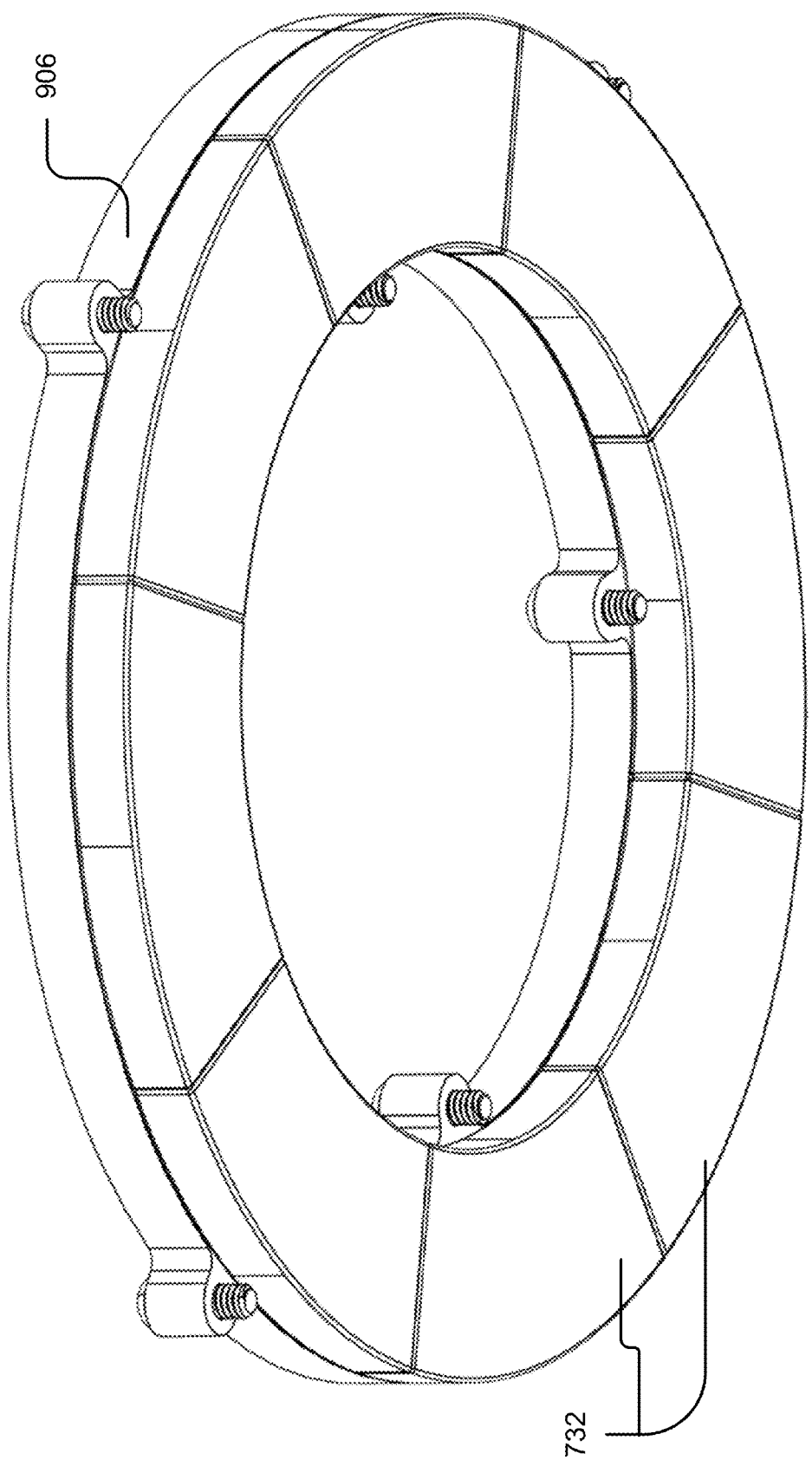
FIG. 9B illustrates a bottom view of example internal components of a magnetic lift member.

FIG. 9B illustrates a bottom view of example internal components of a magnetic lift member 352. As illustrated, the magnet holder 908 and upper bearing holder 904 have been omitted to show an example internal structure of the magnetic lift member 352. In the illustrated example, a magnetic lev backer 906 is shown coupled with a plurality of magnets 732. The magnets 732 may be glued to the mag lev backer 906 and/or held by a magnet holder 908, for example.

The mag lev backer 906 may be a strong ring (e.g., a steel ring), that holds the magnets 732. The ring may include bolt or other connection points that couple with an upper bearing holder 904, a magnet holder 908, and/or an enclosure 304 (e.g., the enclosure lid 328) as described and illustrated in the examples herein.

Bolts are illustrated extending through various components herein, such as in the mag lev backer 906. In some implementations, the bolts may be the same length as the bolt holes in which they are disposed, for example, to reduce gaps or other non-continuous structures, which may further cause inconsistencies with eddy currents, magnetic flux, or otherwise. For instance, the bolts may be trimmed to be the same size and length as the holes.

The magnets 732 may be wedge magnets disposed around the mag lev backer 906 with a flux pointing downward to maximize interaction with the flywheel 152. For example, as illustrated, the magnets 732 may be on a stationary component of the flywheel 152 instead of a rotating component because magnets may be constructed from weaker materials that may break under the stress of high rotational velocities. Additionally, by placing the magnets 732 on a stationary component, eddy currents and resulting forces may be reduced.

In some implementations, a top clamping plate 320a may be constructed from laminated cores of insulated sheets of metal, or made from a non-conductive material, to reduce eddy currents in the top clamping plate 320a, although other implementations are possible, as described elsewhere herein.

Figure 9C:
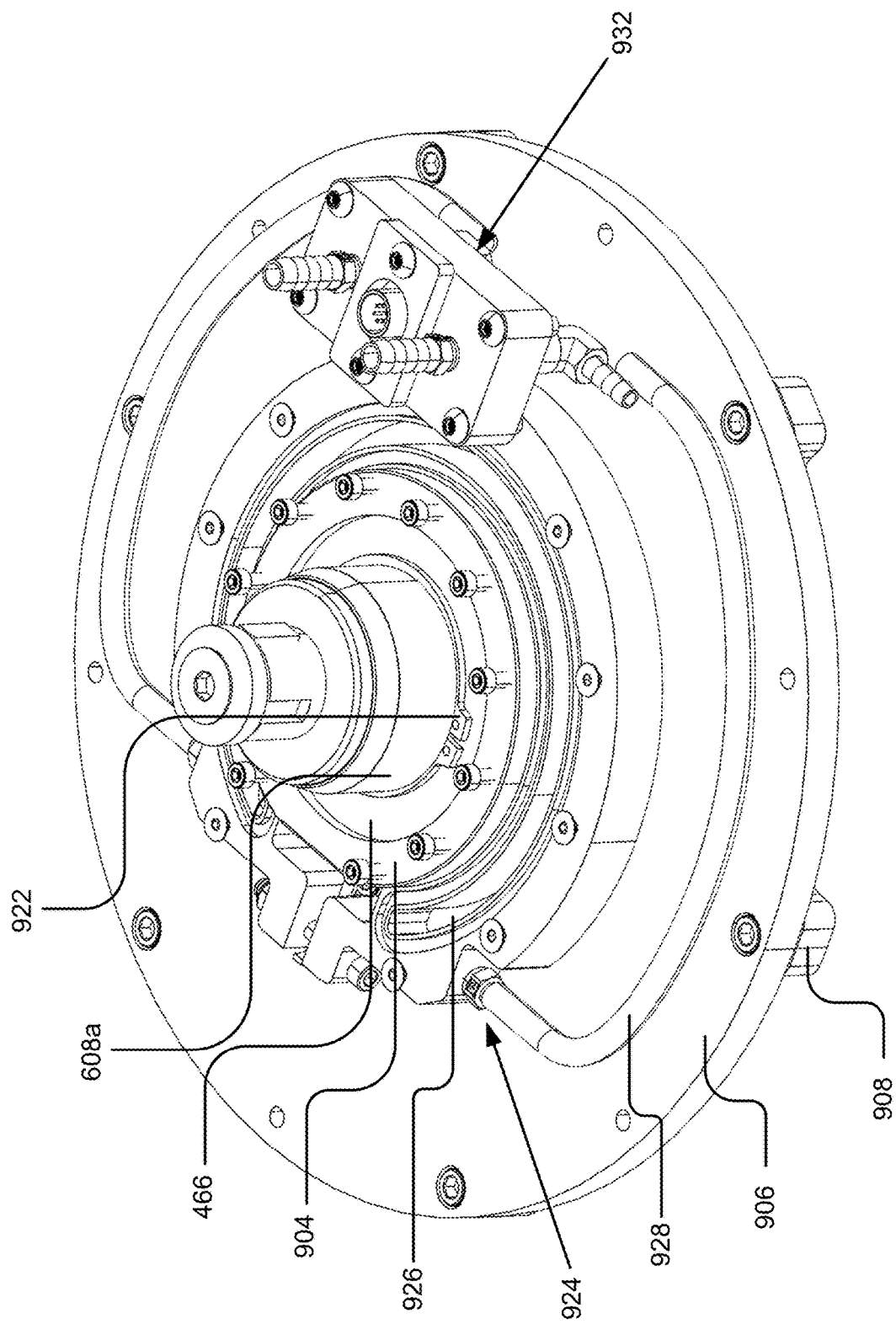
FIG. 9C illustrates a top-down view of an example magnetic lift member and bearing holder.

FIG. 9C illustrates a top-down view of another example magnetic lift member 352. In the depicted implementation, backer plate 906 and magnet holder 908 are shown. A bearing 466 held by an upper bearing holder 904 around an upper axle 608a is also shown. A retaining clip 922 is shown around the upper axle 608a is shown holding the bearing(s) 466 in place.

In the depicted example, a cooling assembly 924 is also shown around or integrated with the bearing holder 904. For instance, the cooling assembly 924 may have a chiller ring 926 that allows coolant to circulate around a bearing holder 904 or another component. The chiller ring 926 may be coupled with a coolant tube 928 that receives coolant, delivers it to the chiller ring 926, and removes it to a pump and/or radiator (not visible) external to these structures.

In the illustrated example, a connector assembly 932 or connector seal plate is also shown with barbed tube connectors and an electrical connection. The connector assembly 932 may receive pneumatic tubes for a vacuum assembly 308, pneumatic tubes for a chiller ring 926, an electrical connection for sensors, and/or other components. While the connector assembly 932 is illustrated floating above the magnetic lift member 308, it may be coupled or integrated with a lid 328 or various other components. Other components, such as support brackets, seals, motors, etc., are omitted from FIG. 9C for purposes of illustration.

Figure 9D:
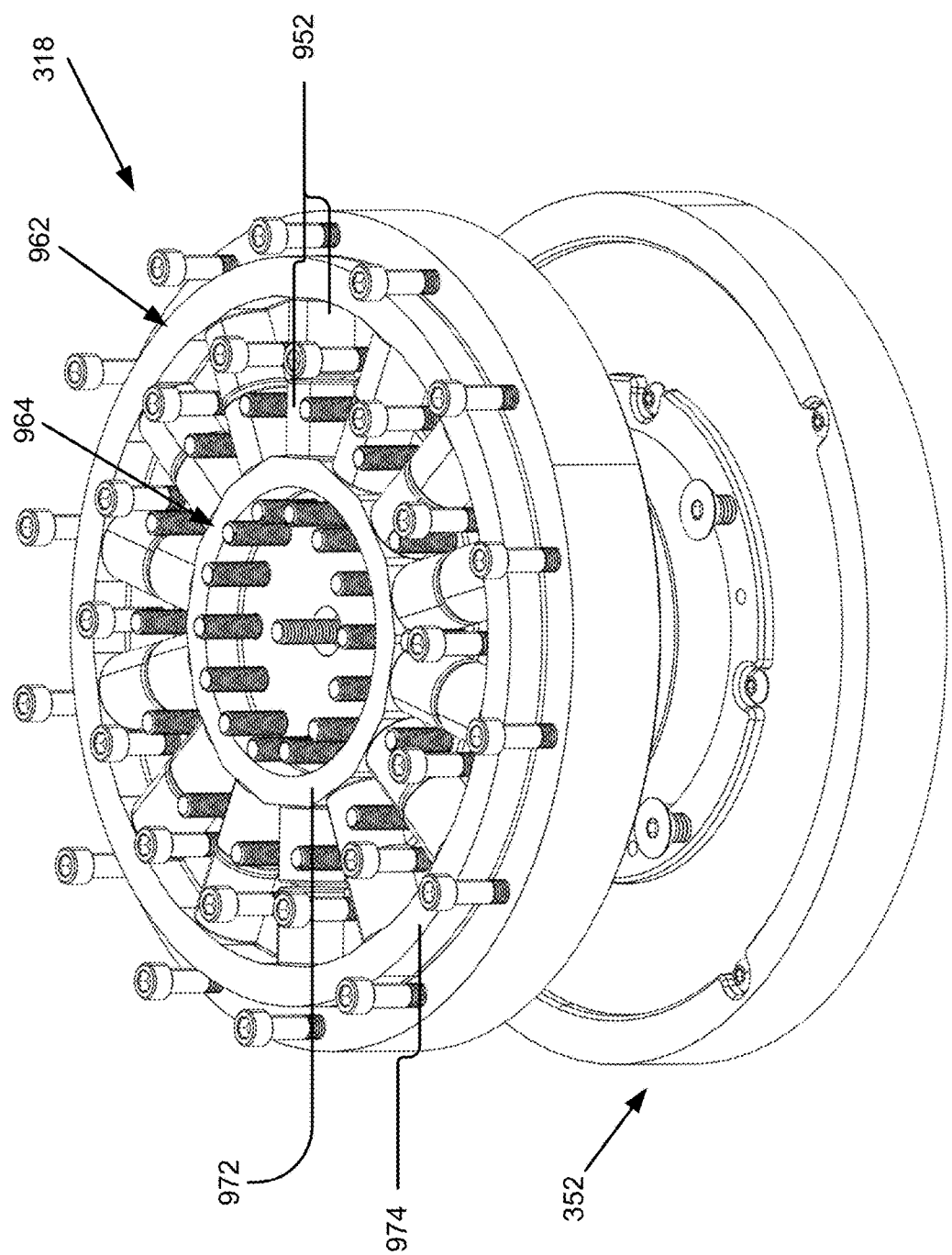
FIG. 9D illustrates example components of an example flywheel-motor coupling.

FIG. 9D illustrates example components and constructions of an example flywheel-motor coupling, such as a magnetic coupling 318 that couples the motor-generator 310 to the flywheel 152. Although a magnetic coupling 318 is described, it should be noted that a physical, direct coupling, a clutch, a gear or gearbox, etc., may be used. As illustrated, the magnetic coupling 318 may be positioned at the end of a top (or bottom, in other implementations) axle 608 to interact with the flywheel 152.

The magnetic coupling 318 may allow mechanical interaction between the motor-generator 310 and the flywheel 152. For example, as described below, an inner rotor 964 (which may include the inner rotor 914 noted above) and outer rotor 962 (which may include one or more of the top outer rotor 912 and bottom outer rotor 410 noted above) may each include magnets 952 that interact with each other, to transfer force. The magnetic coupling 318 may provide a dampening effect between the motor 310 and flywheel 152 to avoid transfer of vibration or of jerk. For example, alternating magnets 952 may be used, which serve as gears using the shear effect of the magnets 952 and may have a dampening effect.

As noted above, an example magnetic coupling 318 may be coupled with a top axle 608a, which passes through a magnetic lift member 352 and upper bearing housing 722, depending on the implementation. As illustrated, the magnetic coupling 318 may be located at the end of the top axle 608. The upper bearing O-ring housing 722 is also omitted from FIG. 9D to show other components.

In some implementations, a magnetic coupling 318 may be assembled in a single unit that may be bolted to a motor mount (e.g., 406) and/or to a flywheel enclosure 304. Accordingly, it can be pre-assembled, and the manufacturing process can be improved for both safety and speed.

FIG. 9D illustrates an example magnetic coupling 318 with an exterior rotor top (e.g., 912 and top component 914) removed to expose the internal structure of the magnetic coupling 318. As illustrated in the example implementation, a series of magnets 952 may be disposed at an internal rotor 964 and an external rotor 962. Cylindrical magnets (e.g., N52 neodymium magnets) may be used and placed in the rotors 964 and/or 962, so that their poles alternate, although other implementations are possible. In some implementations, the magnets 952 may be rectangular or another shape or configuration. Similarly, although the rotors 964 and 962 are radially located from each other, they may be vertically (e.g., where the magnets of opposing rotors are located vertically instead of radially) or otherwise oriented.

The magnets 952 may create a shearing force against each other that serves to couple the rotors 962 and 964 together. For example, opposite magnets could be north and south oriented, so that they pull towards each other. In some implementations, where the magnets 952 are offset from each other, a shear force may be maximized to couple the two rotors 962 and 964 together.

In some implementations, a seal or membrane may be placed between the two rotors 962 and 964 to maintain the vacuum internal to the enclosure 304.

As illustrated, the magnetic coupling 318 may include a number of bolts coupling various portions together. For instance, one or more bolts may couple the internal rotor 964 bottom and/or internal rotor shunt 972 (e.g., coupled or integrated with the internal rotor 964) to another component, such as a motor-generator 310 or a top axle 608a. Similarly, other bolts may couple together external rotor shunt(s) 974 (e.g., coupled or integrated with the internal rotor 962), and other components. The bolts may be used to adjust the positioning of the magnetic coupling 318.

As illustrated, the magnetic coupling 318 may include an internal shunt 972 and an external shunt 974 or backer rings (e.g., a steel backer ring) that provide structure and support to the magnets 952, and/or they may improve magnetic flux. For instance, the shunts or rings may cause the magnetic flux to be more controlled and focused. In some instances, these components also increase the strength of the assembly.

In some instances, the shunts 972/974 or other devices or lips that hold the magnets 952 in the rotors 962/964 may be reinforced as the rotors may not only experience hundreds or thousands (e.g., 2500 pounds) of force due to the magnetic pull but may also experience significant centrifugal force while the flywheel 152 is spinning (e.g., at 12,500 RPM). In order to reduce radial forces on the magnets 952, they may be placed near to the axis of rotation, as illustrated.

Although not illustrated, in some implementations a motor-generator may be coupled with the internal rotor top (e.g., at 914). In other implementations, the motor-generator may be directly coupled with the top axle 608a or via other mechanisms, as noted elsewhere herein. In some instances, the motor-generator 310 may be a synchronous reluctance motor that may decouple/freewheel/coast.

As illustrated, multiple internal rotor shunts 972 may be located radially inward from the magnets 952. In implementations where the magnets 952 are cylindrical, the internal rotor bottom 964 may include contours or other structures for holding the magnets 952 in place.

Although not shown, bar magnets 952 may be coupled with an internal rotor 964 and external rotor 962. As noted above, the magnetic coupling 318 may include shunts 972 or 974 that hold the magnets 952 and/or direct the magnetic field. In some implementations, an external rotor 962 body and/or internal rotor 964 body may each clamp over and/or around the magnets 952 to hold them in place. For instance, the internal rotor 964 body may include a lip that curves around a face of its magnets to hold them in place.

In the foregoing description, for purposes of explanation, numerous specific details are set forth in order to provide a thorough understanding of the technology. It will be apparent, however, that the technology described herein can be practiced without these specific details.

Reference in the specification to "one implementation", "an implementation", "some implementations", or "other implementations" means that a particular feature, structure, or characteristic described in connection with the implementation is included in at least one implementation of the disclosure. The appearances of the term "implementation" or "implementations" in various places in the specification are not necessarily all referring to the same implementation.

In addition, it should be understood and appreciated that variations, combinations, and equivalents of the specific implementations, implementations, and examples may exist, are contemplated, and are encompassed hereby. The invention should therefore not be limited by the above-described implementations, implementations, and examples, but by all implementations, implementations, and examples, and other equivalents within the scope and spirit of the invention as claimed.

What is claimed is:

1. A system comprising:
a flywheel including a rotatable mass component and one or more axles coupled with the rotatable mass component, the one or more axles extending from a top of the rotatable mass component and from a bottom of the rotatable mass component;
a bottom bearing assembly coupled with the one or more axles at the bottom of the rotatable mass component;
a top bearing assembly coupled with the one or more axles at the top of the rotatable mass component;
a support structure coupled with the top bearing assembly and the bottom bearing assembly, the support structure including a base portion and a lid, the lid including a magnetic lift member on a bottom of the lid and a bearing housing on a top of the lid between a motor and the magnetic lift member, the magnetic lift member lifting the rotatable mass component toward the bearing housing; and
the motor coupled with the one or more axles at the top bearing assembly.

2. The system of claim 1, wherein:
the motor is mounted to the support structure via one or more braces, the one or more braces providing a space between the support structure and the motor, the space being large enough to insert a top bearing between the motor and the support structure without removing the one or more braces.

3. The system of claim 1, wherein the support structure includes an enclosure having a cylindrical shape, the motor being mounted to the enclosure in line with an axis of rotation of the one or more axles.

4. The system of claim 1, wherein:
the top bearing assembly coupled with the one or more axles, the top bearing assembly including a top bearing coupling with the one or more axles and a magnet that applies a pulling force to the rotatable mass component.

5. The system of claim 4, wherein the bottom bearing assembly includes a positioning mechanism configured to raise and lower a bottom bearing, the bottom bearing coupling with the one or more axles.

6. The system of claim 1, wherein the support structure includes:
an enclosure tub having a bottom and one or more sides coupled with the bottom, the bottom including a perforation, the bottom bearing assembly being located inside the perforation in the bottom, the base portion including the enclosure tub.

7. The system of claim 6, wherein:
the lid is coupled with the one or more sides to form a top of the enclosure tub, the lid providing vertical support to the top bearing assembly.

8. The system of claim 7, wherein the top bearing assembly supports more than half of a weight of the rotatable mass component.

9. The system of claim 1, wherein the rotatable mass component includes a plurality of stacked plates.

10. The system of claim 9, wherein the plurality of stacked plates includes two clamping plates and two or more stacking plates located between the two clamping plates, the two clamping plates being pulled together by one or more fasteners to place a compressive force on the two or more stacking plates.

11. The system of claim 10, wherein the one or more axles include a top axle and a bottom axle, the top axle being separated from the bottom axle by the two or more stacking plates.

12. The system of claim 1, wherein:
the support structure includes the base portion and the lid, the bottom bearing assembly being coupled with the base portion and the top bearing assembly being coupled with the lid;
the motor is coupled with the lid via one or more braces; and
the lid includes an accessory mounting plate holding one or more of a vacuum pump and a supercapacitor.

13. The system of claim 12, wherein the lid includes a plurality of ribs separating a body of the lid from the accessory mounting plate, the plurality of ribs merging at a ring at a center of the lid, at least a portion of the top bearing assembly being located within a radius of the ring.

14. The system of claim 12, wherein the magnetic lift member includes:
a plurality of magnets mounted to a bottom surface of the lid, the plurality of magnets lifting the rotatable mass component to remove a vertical force from the bottom bearing assembly.

15. The system of claim 1, wherein the support structure includes a plurality of feet around a peripheral edge of the support structure.

16. The system of claim 1, wherein:
the support structure includes a cylindrical enclosure, the rotatable mass component being located inside the cylindrical enclosure;
the motor and a vacuum pump are mounted on top of the lid; and
a plurality of feet are located around a peripheral edge of the cylindrical enclosure.

17. A mechanical-energy storage unit comprising:
a flywheel including two clamping plates and two or more stacking plates located between the two clamping plates, the two clamping plates being pulled together by one or more fasteners to place a compressive force on the two or more stacking plates;
a top axle coupled with a top clamping plate of the two clamping plates,
a bottom axle coupled with a bottom clamping plate of the two clamping plates;
a top bearing coupled with the top axle;
a bottom bearing coupled with the bottom axle; and
a support structure coupled with the top bearing and the bottom bearing, the support structure including a base portion and a lid, the lid including a magnetic lift member on a bottom of the lid and a bearing housing on a top of the lid between a motor and the magnetic lift member, the magnetic lift member lifting the flywheel toward the bearing housing, the bearing housing holding the top bearing.

18. The mechanical-energy storage unit of claim 17, wherein:
the top axle is separated from the bottom axle by the two or more stacking plates;
the top axle is held at an axis of rotation by the top bearing; and
the bottom axle is held at the axis of rotation by the bottom bearing.

19. The mechanical-energy storage unit of claim 17, wherein the magnetic lift member includes:
a plurality of magnets mounted to the support structure, the plurality of magnets lifting the flywheel toward the top bearing.

20. A flywheel assembly comprising:
an enclosure having a top, a bottom, and an interior cavity, the top including a lid, the lid including magnetic lift member on a bottom of the lid and a bearing housing on a top of the lid between a motor and the magnetic lift member, the magnetic lift member lifting a flywheel toward the bearing housing;
the flywheel located in the interior cavity of the enclosure;
a bottom axle coupled with a bottom side of the flywheel;
a top axle coupled with a top side of the flywheel, the top axle being a separate component than the bottom axle;
a bottom bearing coupling the bottom axle with the bottom of the enclosure; and
a top bearing coupling the top axle with the top of the enclosure.

* * * * *